(12) United States Patent
Huang

(10) Patent No.: US 12,445,250 B2
(45) Date of Patent: Oct. 14, 2025

(54) INFORMATION TRANSMISSION METHOD AND APPARATUS, AND STORAGE MEDIUM

(71) Applicant: Datang Mobile Communications Equipment Co., Ltd., Beijing (CN)

(72) Inventor: Qiuping Huang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 389 days.

(21) Appl. No.: 18/040,975

(22) PCT Filed: Aug. 6, 2021

(86) PCT No.: PCT/CN2021/111283
§ 371 (c)(1),
(2) Date: Feb. 7, 2023

(87) PCT Pub. No.: WO2022/028599
PCT Pub. Date: Feb. 10, 2022

(65) Prior Publication Data
US 2023/0283432 A1   Sep. 7, 2023

(30) Foreign Application Priority Data
Aug. 7, 2020   (CN) .......................... 202010788475.7

(51) Int. Cl.
*H04L 5/00*       (2006.01)
*H04B 7/06*       (2006.01)
(Continued)

(52) U.S. Cl.
CPC ......... *H04L 5/0051* (2013.01); *H04B 7/0626* (2013.01); *H04W 72/1268* (2013.01); *H04W 72/232* (2023.01)

(58) Field of Classification Search
CPC ............ H04B 7/0626; H04W 72/1268; H04W 72/232; H04L 5/0051; H04L 5/0057;
(Continued)

(56) References Cited

U.S. PATENT DOCUMENTS

2019/0081737 A1    3/2019  Huang et al.
2019/0200380 A1*   6/2019  Park ..................... H04L 5/0046
(Continued)

FOREIGN PATENT DOCUMENTS

CN        109600208 A      4/2019
CN        110034886 A      7/2019
(Continued)

OTHER PUBLICATIONS

International Search Report and Written Opinion received in the corresponding International Application PCT/CN2021/111283, mailed Nov. 5, 2021.
(Continued)

*Primary Examiner* — Rownak Islam
(74) *Attorney, Agent, or Firm* — KILPATRICK TOWNSEND & STOCKTON LLP

(57) ABSTRACT

The present application provides an information transmission method and apparatus, and a storage medium. The method includes: determining whether at least one sounding reference signal (SRS) resource is used for multiple usages; determining, according to a first result, a bit width and/or a coding mode of SRS resource indicator (SRI), where the SRI is used to indicate an SRS resource corresponding to transmission of a physical uplink shared channel (PUSCH); the first result is that the at least one SRS resource is used for multiple usages, or, no SRS resource is used for multiple usages. Therefore, when transmitting an SRS of the SRS resource set, the terminal will perform the SRS transmission according to requirements of multiple usages, so the net-
(Continued)

work device can use the same SRS resource set to realize the measurement of multiple usages, thus improving resource utilization and reducing resource waste.

20 Claims, 4 Drawing Sheets

(51) Int. Cl.
*H04W 72/1268* (2023.01)
*H04W 72/232* (2023.01)

(58) Field of Classification Search
CPC . H04L 5/0044; H04L 5/0094; H04L 25/0224; H04L 5/0048; H04L 5/0053; H04L 5/0076
USPC .......................................................... 370/329
See application file for complete search history.

(56) References Cited

U.S. PATENT DOCUMENTS

| 2021/0111847 A1* | 4/2021 | Yang | H04L 5/0023 |
| 2022/0337373 A1* | 10/2022 | Wu | H04L 5/0091 |
| 2022/0338190 A1* | 10/2022 | Wu | H04W 72/23 |

FOREIGN PATENT DOCUMENTS

| CN | 110324071 A | 10/2019 |
| CN | 110536399 A | 12/2019 |
| CN | 110740020 A | 1/2020 |
| CN | 110945822 A | 3/2020 |
| CN | 111130742 A | 5/2020 |
| WO | 2020121528 A1 | 6/2020 |
| WO | 2022027310 A1 | 2/2022 |

OTHER PUBLICATIONS

First Office Action received in the corresponding Chinese Application 202010788475.7, mailed Jul. 5, 2022.
Second Office Action received in the corresponding Chinese Application 202010788475.7, mailed Nov. 29, 2022.
Huawei et al. "Maintenance of SRS for NR positioning", 3GPP TSG RAN WG1 Meeting #100-e R1-2000191, Mar. 6, 2020.
European Patent Office, Extended European Search Report Issued in Application No. 21854193.6, Jan. 24, 2024 Germany, 13 pages.
3GPP TS 38.212 V16.2.0, 3rd Generation Partnership Project; Technical Specification Group Radio Access Network; NR; Multiplexing and channel coding(Release 16), total 151 pages, Jun. 2020.
3GPP TS 38.214 V15.9.0, 3rd Generation Partnership Project; Technical Specification Group Radio Access Network; NR; Physical layer procedures for data (Release 15), total 107 pages, Mar. 2020.
Office Action of Corresponding EP Patent Application No. 21854193.6 Dated Feb. 18, 2025.
"3rd Generation Partnership Project; Technical Specification Group Radio Access Network; NR; Radio Resource Control (RRC) protocol specification (Release 16)", 3GPP Standard; Technical Specification; 3GPP TS 38.331, 3RD Generation Partnership Project (3GPP), Mobile Competence Centre; 650, Route Des D6 Lucioles; F-06921 Sophia-Antipolis Cedex; France, vol. RAN WG2, No. V16.1.0 Jul. 24, 2020 (Jul. 24, 2020), pp. 1-906, XP051925836.

* cited by examiner

INFORMATION TRANSMISSION METHOD AND APPARATUS, AND STORAGE MEDIUM

CROSS-REFERENCE TO RELATED APPLICATIONS

This application is a National Stage of International Application No. PCT/CN2021/111283, filed on Aug. 6, 2021, which claims the priority to Chinese patent application No. 202010788475.7, titled "INFORMATION TRANSMISSION METHOD AND APPARATUS, AND STORAGE MEDIUM" and filed with the China National Intellectual Property Administration on Aug. 7, 2020. The contents of the above applications are incorporated into this application by reference in their entireties.

FIELD

The present application relates to the field of communication technologies, and in particular, to an information transmission method and apparatus, and a storage medium.

BACKGROUND

In a 3rd Generation Partnership Project (3GPP) new radio (NR) system, a base station may configure one or more sounding reference signaling (SRS) resource sets for a user equipment (UE). Configuration information of each SRS resource set includes usage signaling. The usage signaling can be configured as codebook, nonCodebook, antennaSwitching, or beamManagement.

When the usage is configured as codebook, the SRS resource set can be used to acquire channel state information (CSI) of a codebook-based physical uplink share channel (PUSCH). When the usage is configured as nonCodebook, the SRS resource set can be used for CSI acquisition of anonCodebook PUSCH. When the usage is configured as antennaSwitching, the SRS resource set can be used for downlink CSI acquisition. When the usage is configured as beamManagement, the SRS resource set can be used for uplink beam management.

SUMMARY

The present application provides an information transmission method and apparatus, and a storage medium, which realize reuse of the SRS resource set, improve resource utilization and reduce resource waste.

In One Embodiment of the Present Application Provides an Information Transmission Method, Including:
  determining whether at least one sounding reference signal (SRS) resource is used for multiple usages;
  determining, according to a first result, a bit width and/or a coding mode of SRS resource indicator (SRI), where the SRI is used to indicate an SRS resource corresponding to transmission of a physical uplink shared channel (PUSCH); the first result is that the at least one SRS resource is used for multiple usages, or, no SRS resource is used for multiple usages.

In the method, the network device determines whether at least one SRS resource is used for multiple usages, and in a case that the SRS resource set is used for multiple usages, a bit width and/or a coding mode of new SRI are provided, to realize that when transmitting an SRS of the SRS resource set, the terminal will perform the SRS transmission according to requirements of multiple usages, so the network device can use the same SRS resource set to realize the measurement of multiple usages, thus improving resource utilization and reducing resource waste.

In a possible implementation, the method further includes:
  sending first information to a terminal, where the first information is used to indicate to the terminal that the at least one SRS resource is used for multiple usages, and the multiple usages include channel state information (CSI) acquisition of a specific type of physical uplink shared channel (PUSCH).

In the method, the network device uses the first information to indicate to the terminal that the SRS resource is used for multiple usages, to realize the reuse of the SRS resource set in terms of its usages.

In a possible implementation, the method further includes:
  sending configuration information for an SRS resource set to the terminal, where the configuration information includes a usage of the SRS resource set, and the SRS resource set is an SRS resource set including an SRS resource in the at least one SRS resource;
  where the first information indicates that the at least one SRS resource is used for the CSI acquisition in addition to the usage of the at least one SRS resource configured in the SRS resource set.

In a possible implementation, where sending the first information to the terminal includes:
  sending configuration information for an SRS resource set to the terminal, where there exists in the configuration information a configuration value indicating that the SRS resource set is used for multiple usages, the SRS resource set is an SRS resource set including an SRS resource in the at least one SRS resource, and the first information is the configuration information.

In a possible implementation, determining the bit width and/or the coding mode of the SRI includes:
  determining the bit width and/or the coding mode of the SRI according to at least one of a number of SRS resources in a first SRS resource set and a number of SRS resources in a second SRS resource set, where the first SRS resource set is an SRS resource set including an SRS resource in the at least one SRS resource, and the second SRS resource set is an SRS resource set having a usage parameter being only indicated for the CSI acquisition.

In the method, the network device determines the bit width and/or the coding mode of the SRI through the data of the SRS resource(s) in the SRS resource set whose usage includes the CSI acquisition, and the determined bit width and/or coding mode of the SRI can better meet actual measurement requirements.

In a possible implementation, the bit width of the SRI is a function of a number of SRS resources included in the first SRS resource set and/or a number of SRS resources included in the second SRS resource set; or
  the bit width of the SRI is a function of a number of SRS resources included in a resource set of the first SRS resource set and/or a number of SRS resources included in a resource set of the second SRS resource set; or
  the bit width of the SRI is a function of a number of SRS resources included in each of the first SRS resource set and/or a number of SRS resources included in each of the second SRS resource set; or
  the bit width of the SRI is a function of a maximum value of the number of SRS resources included in the first SRS resource set and the number of SRS resources included in the second SRS resource set; or the bit width of the SRI is a function of a maximum value of a number of SRS resources included in a resource set of the first SRS resource set and a number of SRS resources included in a resource set of the second SRS resource set; or the bit width of the SRI is a function of a maximum value of a number of SRS resources included in each of the first SRS resource set and/or a number of SRS resources included in each of the second SRS resource set.

In a possible implementation, the coding mode of the SRI includes:

the coding mode of the SRI including a reserved state, and any state other than the reserved state being used to indicate an SRS resource in the first SRS resource set; or any state in the coding mode of the SRI being used to indicate an SRS resource in the first SRS resource set; or the coding mode of the SRI including a reserved state, and any state other than the reserved state being used to indicate an SRS resource in the second SRS resource set; or any state in the coding mode of the SRI being used to indicate an SRS resource in the second SRS resource set; or the coding mode of the SRI including a reserved state, and any state other than the reserved state being used to indicate an SRS resource included in both of the first SRS resource set and the second SRS resource set; or any state in the coding mode of the SRI being used to indicate an SRS resource included in both of the first SRS resource set and the second SRS resource set; or the coding mode of the SRI including a reserved state, and any state other than the reserved state being used to indicate an SRS resource included in the first SRS resource set or in the second SRS resource set; or any state in the coding mode of the SRI being used to indicate an SRS resource included in the first SRS resource set or in the second SRS resource set.

In the method, the SRS resource set is indicated by the state in the coding mode of the SRI, to improve the processing efficiency.

In a possible implementation, the bit width of the SRI is $\lceil \log_2 N_1 \rceil$;
or, the bit width of the SRI is $\lceil \log_2 N_2 \rceil$;
or, the bit width of the SRI is $\lceil \log_2 N_3 \rceil$;
or, the bit width of the SRI is $\lceil \log_2 N_4 \rceil$;
or, the bit width of the SRI is $$\left\lceil \log_2\left( \sum_{k=1}^{\min(L_{max}, N_1)} C_{N_1}^k \right) \right\rceil;$$

or, the bit width of the SRI is $$\left\lceil \log_2\left( \sum_{k=1}^{\min(L_{max}, N_2)} C_{N_2}^k \right) \right\rceil;$$

or, the bit width of the SRI is $\max(\lceil \log_2(N_1) \rceil, \lceil \log_2(N_2) \rceil)$;
or, the bit width of the SRI is $\lceil \max(\log_2(N), \log_2(N_2)) \rceil$;
or, the bit width of the SRI is $\max(\lceil \log_2(N_3) \rceil, \lceil \log_2(N_4) \rceil)$;
or, the bit width of the SRI is $\lceil \max(\log_2(N_3), \log_2(N_4)) \rceil$;
or, the bit width of the SRI is $\max(\lceil \log_2(N_1) \rceil, \lceil \log_2(N_{2,1}) \rceil, \ldots, \lceil \log_2(N_{2,n}) \rceil)$;

or, the bit width of the SRI is $\lceil \max(\log_2(N_1), \log_2(N_{2,1}), \ldots, \log_2(N_{2,n})) \rceil$;
or, the bit width of the SRI is $\max(\lceil \log_2(N_{1,1}) \rceil, \ldots, \lceil \log_2(N_{1,m}) \rceil, \lceil \log_2(N_2) \rceil)$;
or, the bit width of the SRI is $\lceil \max(\log_2(N_{1,1}), \ldots, \log_2(N_{1,m}), \log_2(N_2)) \rceil$;
or, the bit width of the SRI is $\max(\lceil \log_2(N_{1,1}) \rceil, \ldots, \lceil \log_2(N_{1,m}) \rceil, \lceil \log_2(N_{2,1}) \rceil, \ldots, \lceil \log_2(N_{2,n}) \rceil)$; or, the bit width of the SRI is $\lceil \max(\log_2(N_{1,1}), \ldots, \log_2(N_{1,m}), \log_2(N_{2,1}), \ldots, \log_2(N_{2,n})) \rceil$;
or, the bit width of the SRI is $\lceil \log_2(N_{SRS}) \rceil$;
or, the bit width of the SRI is $$\left\lceil \log_2\left( \sum_{k=1}^{\min(L_{max}, N_{SRS})} C_{N_{SRS}}^k \right) \right\rceil;$$

where $N_{SRS} = \max(N_1, N_2)$;
or, $N_{SRS} = \max(N_3, N_4)$;
or, $N_{SRS} = \max(N_{1,1}, \ldots, N_{1,m}, N_2)$;
or, $N_{SRS} = \max(N_1, N_{2,1}, \ldots, N_{2,n})$;
or, $N_{SRS} = \max(N_{1,1}, \ldots, N_{1,m}, N_{2,1}, \ldots, N_{2,n})$;
max(k,l) represents a maximum value of k and l;
$\lceil \ \rceil$ represents rounding up;
$C_x^y$ represents a number of combinations for selecting y elements from x elements;
$N_1$ is a number of SRS resources in the first SRS resource set;
$N_2$ is a number of SRS resources in the second SRS resource set;
$N_3$ is a number of SRS resources included in one SRS resource set of the first SRS resource set when the first SRS resource set includes a plurality of SRS resource sets;
$N_4$ is a number of SRS resources included in one SRS resource set of the second SRS resource set when the second SRS resource set includes a plurality of SRS resource sets;
$L_{max}$ is a maximum number of layers configured for the terminal to allow transmission of a specific type of PUSCH or a maximum number of layers supported by the terminal for transmission of a specific type of PUSCH;
m is a number of SRS resource sets included in the first SRS resource set, $N_{1,m}$ isa number of SRS resources included in an m-th SRS resource set of the first SRS resource set, where m is greater than 1;
n is a number of SRS resource sets included in the second SRS resource set, $N_{2,n}$ is a number of SRS resources included in an n-th SRS resource set of the second SRS resource set, where n is greater than 1.

In a possible implementation, where determining the bit width and/or the coding mode of the SRI includes:

determining the bit width and/or the coding mode of the SRI according to a third SRS resource set, where the third SRS resource set is an SRS resource set transmitted in a latest transmission period in the SRS resource set used for CSI acquisition or last triggered in the SRS resource set used for CSI acquisition, before a physical downlink control channel (PDCCH) carrying downlink control information (DCI) of the PUSCH.

In the method, the network device determines the bit width and/or the coding mode of the SRI through the latest transmitted data of the SRS resource(s) in the SRS resource set whose usage includes the CSI acquisition, and the determined bit width and/or coding mode of the SRI can better meet actual measurement requirements.

In a possible implementation, the coding mode of the SRI includes:

the coding mode of the SRI including a reserved state, and any state other than the reserved state being used to indicate an SRS resource in the third SRS resource set; or any state in the coding mode of the SRI being used to indicate an SRS resource in the third SRS resource set.

In the method, the SRS resource set is indicated by the state in the coding mode of the SRI, to improve the processing efficiency.

In a possible implementation, where determining the bit width and/or the coding mode of the SRI according to the third SRS resource set includes: determining the bit width and/or the coding mode of the SRI according to a number and/or a type of SRS resources in the third SRS resource set.

In a possible implementation, when the third SRS resource set is an SRS resource set of the first SRS resource set, the bit width of the SRI is determined according to a number of SRS resources included in both of the third SRS resource set and the second SRS resource set;

where the first SRS resource set is an SRS resource set including an SRS resource in the at least one SRS resource, and the second SRS resource set is an SRS resource set having a usage parameter being only indicated for the CSI acquisition.

In a possible implementation, when the third SRS resource set is an SRS resource set of the second SRS resource set, the bit width of the SRI is determined according to a number of SRS resources included in the third SRS resource set, where the second SRS resource set is an SRS resource set having a usage parameter being only indicated for the CSI acquisition.

In a possible implementation, the method further includes:

sending a first signaling to the terminal, where the first signaling is used to indicate the bit width of the SRI.

In a possible implementation, the method further includes:

sending indication information of an SRS resource set corresponding to the transmission of the PUSCH to a terminal;

where determining the bit width and/or the coding mode of the SRI includes:

determining the bit width and/or the coding mode of the SRI according to a number of SRS resources included in the SRS resource set indicated by the indication information of the SRS resource set.

In a possible implementation, the coding mode includes:
a coded bit value i of the SRI representing an (i+1)-th SRS resource in a fourth SRS resource set; or
a coded bit value i of the SRI representing an i-th SRS resource in a fourth SRS resource set;
where the fourth SRS resource set is one of the following:
all SRS resource sets in the first SRS resource set; or
an SRS resource set of the first SRS resource set; or
all SRS resource sets in the second SRS resource set; or
an SRS resource set of the second SRS resource set; or
the first SRS resource set and the second SRS resource set; or
an SRS resource set indicated by the network device; or
an SRS resource set corresponding to the transmission of the PUSCH;
i is greater than or equal to 0;

the first SRS resource set is an SRS resource set including an SRS resource in the at least one SRS resource, and the second SRS resource set is an SRS resource set having a usage parameter being only indicated for the CSI acquisition.

In a possible implementation, numbering of SRS resources in the fourth SRS resource set is determined according to a sequence of transmission of the SRS resources;

or, numbering of SRS resources in the fourth SRS resource set is determined according to sizes of identifiers of the SRS resources;

or, numbering of SRS resources in the fourth SRS resource set is determined according to a sequence in which the SRS resources are configured.

In a possible implementation, the SRS resource set corresponding to the transmission of the PUSCH is determined according to a preset rule.

In a possible implementation, the SRS resource corresponding to the transmission of the PUSCH is an SRS resource used to determine an antenna port of the PUSCH.

In a possible implementation, the at least one SRS resource is at least one SRS resource with a specific number in an SRS resource set whose usage parameter is not configured for the CSI acquisition;

or, the at least one SRS resource is an SRS resource in an SRS resource set whose usage parameter is configured for a specific usage;

or, the at least one SRS resource is an SRS resource in an SRS resource set whose usage parameter in a specific time domain type is configured for a specific usage;

or, the at least one SRS resource is an SRS resource included both in an SRS resource set whose usage parameter is configured for a specific usage, and an SRS resource set whose usage is the CSI acquisition.

In one embodiment of the present application provides an information transmission method, including:

determining whether there exists at least one sounding reference signal (SRS) resource used for multiple usages;

determining, according to a second result, a bit width and/or a coding mode of SRS resource indicator (SRI), where the SRI is used to indicate an SRS resource corresponding to transmission of a physical uplink shared channel (PUSCH); the second result is that there exists at least one SRS resource used for multiple usages, or, there exists no SRS resource used for multiple usages.

In a possible implementation, the method further includes:

receiving first information from a network device, where the first information is used to indicate a terminal that the at least one SRS resource is used for multiple usages, and the multiple usages include channel state information (CSI) acquisition of a specific type of physical uplink shared channel (PUSCH).

In a possible implementation, the method further includes:

receiving configuration information for an SRS resource set from a network device, where the configuration information includes a usage of the SRS resource set, and the SRS resource set is an SRS resource set including an SRS resource in the at least one SRS resource;

where the first information indicates that the at least one SRS resource is used for the CSI acquisition in addition to the usage of the at least one SRS resource configured in the SRS resource set.

In a possible implementation, where receiving the first information from the network device includes:

receiving configuration information for an SRS resource set from a network device, where there exists in the configuration information a configuration value indicating that the SRS resource set is used for multiple usages, the SRS resource set is an SRS resource set including an SRS resource in the at least one SRS resource, and the first information is the configuration information.

In a possible implementation, where determining the bit width and/or the coding mode of the SRI includes:

determining the bit width and/or the coding mode of the SRI according to at least one of a number of SRS resources in a first SRS resource set and a number of SRS resources in a second SRS resource set, where the first SRS resource set is an SRS resource set including an SRS resource in the at least one SRS resource, and the second SRS resource set is an SRS resource set having a usage parameter being only indicated for the CSI acquisition.

In a possible implementation, the bit width of the SRI is a function of a number of SRS resources included in the first SRS resource set and/or a number of SRS resources included in the second SRS resource set; or the bit width of the SRI is a function of a number of SRS resources included in a resource set of the first SRS resource set and/or a number of SRS resources included in a resource set of the second SRS resource set; or the bit width of the SRI is a function of a number of SRS resources included in each of the first SRS resource set and/or a number of SRS resources included in each of the second SRS resource set; or the bit width of the SRI is a function of a maximum value of a number of SRS resources included in the first SRS resource set and a number of SRS resources included in the second SRS resource set; or the bit width of the SRI is a function of a maximum value of a number of SRS resources included in a resource set of the first SRS resource set and a number of SRS resources included in a resource set of the second SRS resource set; or the bit width of the SRI is a function of a maximum value of a number of SRS resources included in each of the first SRS resource set and/or a number of SRS resources included in each of the second SRS resource set.

In a possible implementation, the coding mode of the SRI includes:

the coding mode of the SRI including a reserved state, and any state other than the reserved state being used to indicate an SRS resource in the first SRS resource set; or any state in the coding mode of the SRI being used to indicate an SRS resource in the first SRS resource set; or the coding mode of the SRI including a reserved state, and any state other than the reserved state being used to indicate an SRS resource in the second SRS resource set; or any state in the coding mode of the SRI being used to indicate an SRS resource in the second SRS resource set; or the coding mode of the SRI including a reserved state, and any state other than the reserved state being used to indicate an SRS resource included in both of the first SRS resource set and the second SRS resource set; or any state in the coding mode of the SRI being used to indicate an SRS resource included in both of the first SRS resource set and the second SRS resource set; or the coding mode of the SRI including a reserved state, and any state other than the reserved state being used to indicate an SRS resource included in the first SRS resource set or in the second SRS resource set; or any state in the coding mode of the SRI being used to indicate an SRS resource included in the first SRS resource set or in the second SRS resource set.

In a possible implementation, the bit width of the SRI is $\lceil \log_2 N_1 \rceil$;

or, the bit width of the SRI is $\lceil \log_2 N_2 \rceil$;

or, the bit width of the SRI is $\lceil \log_2 N_3 \rceil$;

or, the bit width of the SRI is $\lceil \log_2 N_4 \rceil$;

or, the bit width of the SRI is $$\left\lceil \log_2 \left( \sum_{k=1}^{min(L_{max}, N_1)} C_{N_1}^k \right) \right\rceil;$$

or, the bit width of the SRI is $$\left\lceil \log_2 \left( \sum_{k=1}^{min(L_{max}, N_2)} C_{N_2}^k \right) \right\rceil;$$

or, the bit width of the SRI is $max(\lceil \log_2(N_1) \rceil, \lceil \log_2(N_2) \rceil)$;

or, the bit width of the SRI is $\lceil max(\log_2(N_1), \log_2(N_2)) \rceil$;

or, the bit width of the SRI is $max(\lceil \log_2(N_3) \rceil, \lceil \log_2(N_4) \rceil)$;

or, the bit width of the SRI is $\lceil max(\log_2(N_3), \log_2(N_4)) \rceil$;

or, the bit width of the SRI is $max(\lceil \log_2(N_1) \rceil, \lceil \log_2(N_{2,1}) \rceil, \ldots, \lceil \log_2(N_{2,n}) \rceil)$;

or, the bit width of the SRI is $\lceil max(\log_2(N_1), \log_2(N_{2,1}), \ldots, \log_2(N_{2,n})) \rceil$;

or, the bit width of the SRI is $max(\lceil \log_2(N_{1,1}) \rceil, \ldots, \lceil \log_2(N_{1,m}) \rceil, \lceil \log_2(N_2) \rceil)$;

or, the bit width of the SRI is $\lceil max(\log_2(N_{1,1}), \ldots, \log_2(N_{1,m}), \log_2(N_2)) \rceil$;

or, the bit width of the SRI is $max(\lceil \log_2(N_{1,1}) \rceil, \ldots, \lceil \log_2(N_{1,m}) \rceil, \lceil \log_2(N_{2,1}) \rceil, \ldots, \log_2(N_{2,n}) \rceil)$;

or, the bit width of the SRI is $\lceil max(\log_2(N_{1,1}), \ldots, \log_2(N_{1,m}), \log_2(N_{2,1}), \ldots, \log_2(N_{2,n})) \rceil$;

or, the bit width of the SRI is $\lceil \log_2(N_{SRS}) \rceil$;

or, the bit width of the SRI is $$\left\lceil \log_2 \left( \sum_{k=1}^{min(L_{max}, N_{SRS})} C_{N_{SRS}}^k \right) \right\rceil;$$

where $N_{SRS} = max(N_1, N_2)$;

or, $N_{SRS} = max(N_3, N_4)$;

or, $N_{SRS} = max(N_{1,1}, \ldots, N_{1,m}, N_2)$;

or, $N_{SRS} = max(N_1, N_{2,1}, \ldots, N_{2,n})$;

or, $N_{SRS} = max(N_{1,1}, \ldots, N_{1,m}, N_{2,1}, \ldots, N_{2,n})$;

$max(k,l)$ represents a maximum value of k and l;

$\lceil \ \rceil$ represents rounding up;

$C_x^y$ represents a number of combinations for selecting y elements from x elements;

$N_1$ is a number of SRS resources in the first SRS resource set;

$N_2$ is a number of SRS resources in the second SRS resource set;

$N_3$ is a number of SRS resources included in one SRS resource set of the first SRS resource set when the first SRS resource set includes a plurality of SRS resource sets;

$N_4$ is a number of SRS resources included in one SRS resource set of the second SRS resource set when the second SRS resource set includes a plurality of SRS resource sets;

$L_{max}$ is a maximum number of layers for transmission of a PUSCH configured by a network device for a terminal or a maximum number of layers supported by a terminal for uplink transmission;

m is a number of SRS resource sets included in the first SRS resource set, $N_{1,m}$ isa number of SRS resources included in an m-th SRS resource set of the first SRS resource set, where m is greater than 1;

n is a number of SRS resource sets included in the second SRS resource set, $N_{2,n}$ is a number of SRS resources included in an n-th SRS resource set of the second SRS resource set, where n is greater than 1.

In a possible implementation, where determining the bit width and/or the coding mode of the SRI includes:
determining the bit width and/or the coding mode of the SRI according to a third SRS resource set, where the third SRS resource set is an SRS resource set transmitted in a latest SRS transmission period in the SRS resource set used for CSI acquisition or last triggered in the SRS resource set used for CSI acquisition, before a physical downlink control channel (PDCCH) carrying downlink control information (DCI) of the PUSCH.

In a possible implementation, the coding mode of the SRI includes:
the coding state of the SRI including a reserved state, and any state other than the reserved state being used to indicate an SRS resource in the third SRS resource set; or
any state in the coding mode of the SRI being used to indicate an SRS resource in the third SRS resource set.

In a possible implementation, where determining the bit width and/or the coding mode of the SRI according to the third SRS resource set includes: determining the bit width and/or the coding mode of the SRI according to a number and/or a type of SRS resources in the third SRS resource set.

In a possible implementation, when the third SRS resource set is an SRS resource set of the first SRS resource set, the bit width of the SRI is determined according to a number of SRS resources included in both of the third SRS resource set and the second SRS resource set;
where the first SRS resource set is an SRS resource set including an SRS resource in the at least one SRS resource, and the second SRS resource set is an SRS resource set having a usage parameter being only indicated for the CSI acquisition.

In a possible implementation, when the third SRS resource set is an SRS resource set of the second SRS resource set, the bit width of the SRI is determined according to a number of SRS resources included in the third SRS resource set, where the second SRS resource set is an SRS resource set having a usage parameter being only indicated for the CSI acquisition.

In a possible implementation, the method further includes: receiving a first signaling from a network device, where the first signaling is used to indicate a bit width of the SRI.

In a possible implementation, the method further includes:
receiving indication information of an SRS resource set corresponding to the transmission of the PUSCH sent by a network device;
where determining the bit width and/or the coding mode of the SRI includes:
determining the bit width and/or the coding mode of the SRI according to a number of SRS resources included in the SRS resource set indicated by the indication information of the SRS resource set.

In a possible implementation, the coding mode includes:
a coded bit value i of the SRI representing an (i+1)-th SRS resource in the resource set corresponding to the transmission of the PUSCH; or
a coded bit value i of the SRI representing an i-th SRS resource in a fourth SRS resource set;
where the fourth SRS resource set is one of the following:
all SRS resource sets in the first SRS resource set; or
an SRS resource set of the first SRS resource set; or
all SRS resource sets in the second SRS resource set; or
an SRS resource set of the second SRS resource set; or
the first SRS resource set and the second SRS resource set; or
an SRS resource set indicated by a network device; or
an SRS resource set corresponding to the transmission of the PUSCH;
i is greater than or equal to 0;
the first SRS resource set is an SRS resource set including an SRS resource in the at least one SRS resource, and the second SRS resource set is an SRS resource set having a usage parameter being only indicated for the CSI acquisition.

In a possible implementation, numbering of SRS resources in the fourth SRS resource set is determined according to a sequence of transmission of the SRS resources;
or, numbering of SRS resources in the fourth SRS resource set is determined according to sizes of identifiers of the SRS resources;
or, numbering of SRS resources in the fourth SRS resource set is determined according to a sequence in which the SRS resources are configured.

In a possible implementation, the SRS resource set corresponding to the transmission of the PUSCH is determined according to a preset rule.

In a possible implementation, the SRS resource set corresponding to the transmission of the PUSCH is an SRS resource set used to determine an SRS resource set where an SRS resource of an antenna port of the PUSCH is located.

In a possible implementation, the at least one SRS resource is an SRS resource with a specific number in an SRS resource set whose usage parameter is not configured for the CSI acquisition;
or, the at least one SRS resource is an SRS resource in an SRS resource set whose usage parameter is configured for a specific usage;
or, the at least one SRS resource is an SRS resource in an SRS resource set whose usage parameter in a specific time domain type is configured for a specific usage;
or, the at least one SRS resource is an SRS resource included both in an SRS resource set whose usage parameter is configured for a specific usage, and an SRS resource set whose usage is the CSI acquisition.

In one embodiment of the present application provides an information transmission apparatus, including a memory, a transceiver, and a processor;

where the memory is configured to store a computer program; the transceiver is configured to send and receive data under control of the processor; and the processor is configured to read the computer program in the memory and execute following operations:

determining whether at least one sounding reference signal (SRS) resource is used for multiple usages;

determining, according to a first result, a bit width and/or a coding mode of SRS resource indicator (SRI), where the SRI is used to indicate an SRS resource corresponding to transmission of a physical uplink shared channel (PUSCH); the first result is that the at least one SRS resource is used for multiple usages, or, no SRS resource is used for multiple usages.

In a possible implementation, the processor further executes the following operations:

sending first information to a terminal, where the first information is used to indicate to the terminal that the at least one SRS resource is used for multiple usages, and the multiple usages include channel state information (CSI) acquisition of a specific type of physical uplink shared channel (PUSCH).

In a possible implementation, the processor executes the following operations:

sending configuration information for an SRS resource set to the terminal, where the configuration information includes a usage of the SRS resource set, and the SRS resource set is an SRS resource set including an SRS resource in the at least one SRS resource;

where the first information indicates that the at least one SRS resource is used for the CSI acquisition in addition to the usage of the at least one SRS resource configured in the SRS resource set.

In a possible implementation, the processor executes the following operations:

sending configuration information for an SRS resource set to the terminal, where there exists in the configuration information a configuration value indicating that the SRS resource set is used for multiple usages, the SRS resource set is an SRS resource set including an SRS resource in the at least one SRS resource, and the first information is the configuration information.

In a possible implementation, the processor executes the following operations:

determining the bit width and/or the coding mode of the SRI according to at least one of a number of SRS resources in a first SRS resource set and a number of SRS resources in a second SRS resource set, where the first SRS resource set is an SRS resource set including an SRS resource in the at least one SRS resource, and the second SRS resource set is an SRS resource set having a usage parameter being only indicated for the CSI acquisition.

In a possible implementation, the bit width of the SRI is a function of a number of SRS resources included in the first SRS resource set and/or a number of SRS resources included in the second SRS resource set; or the bit width of the SRI is a function of a number of SRS resources included in a resource set of the first SRS resource set and/or a number of SRS resources included in a resource set of the second SRS resource set; or the bit width of the SRI is a function of a number of SRS resources included in each of the first SRS resource set and/or a number of SRS resources included in each of the second SRS resource set; or the bit width of the SRI is a function of a maximum value of the number of SRS resources included in the first SRS resource set and the number of SRS resources included in the second SRS resource set; or the bit width of the SRI is a function of a maximum value of a number of SRS resources included in a resource set of the first SRS resource set and a number of SRS resources included in a resource set of the second SRS resource set; or the bit width of the SRI is a function of a maximum value of a number of SRS resources included in each of the first SRS resource set and/or a number of SRS resources included in each of the second SRS resource set.

In a possible implementation, the coding mode of the SRI includes:

the coding mode of the SRI including a reserved state, and any state other than the reserved state being used to indicate an SRS resource in the first SRS resource set; or any state in the coding mode of the SRI being used to indicate an SRS resource in the first SRS resource set; or the coding mode of the SRI including a reserved state, and any state other than the reserved state being used to indicate an SRS resource in the second SRS resource set; or any state in the coding mode of the SRI being used to indicate an SRS resource in the second SRS resource set; or the coding mode of the SRI including a reserved state, and any state other than the reserved state being used to indicate an SRS resource included in both of the first SRS resource set and the second SRS resource set; or any state in the coding mode of the SRI being used to indicate an SRS resource included in both of the first SRS resource set and the second SRS resource set; or the coding mode of the SRI including a reserved state, and any state other than the reserved state being used to indicate an SRS resource included in the first SRS resource set or in the second SRS resource set; or any state in the coding mode of the SRI being used to indicate an SRS resource included in the first SRS resource set or in the second SRS resource set.

In a possible implementation, the bit width of the SRI is $\lceil \log_2 N_1 \rceil$;

or, the bit width of the SRI is $\lceil \log_2 N_2 \rceil$;
or, the bit width of the SRI is $\lceil \log_2 N_3 \rceil$;
or, the bit width of the SRI is $\lceil \log_2 N_4 \rceil$;
or, the bit width of the SRI is $$\left\lceil \log_2 \left( \sum\nolimits_{k=1}^{min(L_{max}, N_1)} C_{N_1}^k \right) \right\rceil;$$

or, the bit width of the SRI is $$\left\lceil \log_2 \left( \sum\nolimits_{k=1}^{min(L_{max}, N_2)} C_{N_2}^k \right) \right\rceil;$$

or, the bit width of the SRI is $\max(\lceil \log_2(N_1) \rceil, \lceil \log_2(N_2) \rceil)$;

or, the bit width of the SRI is $\lceil \max(\log_2(N_1), \log_2(N_2)) \rceil$;
or, the bit width of the SRI is $\max(\lceil \log_2(N_3) \rceil, \lceil \log_2(N_4) \rceil)$;
or, the bit width of the SRI is $\lceil \max(\log_2(N_3), \log_2(N_4)) \rceil$;
or, the bit width of the SRI is $\max(\lceil \log_2(N_1) \rceil, \lceil \log_2(N_{2,1}) \rceil, \ldots, \lceil \log_2(N_{2,n}) \rceil)$;
or, the bit width of the SRI is $\lceil \max(\log_2(N_1), \log_2(N_{2,1}), \ldots, \log_2(N_{2,n})) \rceil$;
or, the bit width of the SRI is $\max(\lceil \log_2(N_{1,1}) \rceil, \ldots, \lceil \log_2(N_{1,m}) \rceil, \lceil \log_2(N_2) \rceil)$;
or, the bit width of the SRI is $\lceil \max(\log_2(N_{1,1}), \ldots, \log_2(N_{1,m}), \log_2(N_2)) \rceil$;
or, the bit width of the SRI is $\max(\lceil \log_2(N_{1,1}) \rceil, \ldots, \lceil \log_2(N_{1,m}) \rceil, \lceil \log_2(N_{2,1}) \rceil, \ldots, \lceil \log_2(N_{2,n}) \rceil)$;
or, the bit width of the SRI is $\lceil \max(\log_2(N_{1,1}), \ldots, \log_2(N_{1,m}), \log_2(N_{2,1}), \ldots, \log_2(N_{2,n})) \rceil$;
or, the bit width of the SRI is $\lceil \log_2(N_{SRS}) \rceil$;
or, the bit width of the SRI is $$\left\lceil \log_2\left(\sum_{k=1}^{\min(L_{max}, N_{SRS})} C_{N_{SRS}}^k\right) \right\rceil;$$

where $N_{SRS} = \max(N_1, N_2)$;
or, $N_{SRS} = \max(N_3, N_4)$;
or, $N_{SRS} = \max(N_{1,1}, \ldots, N_{1,m}, N_2)$;
or, $N_{SRS} = \max(N_1, N_{2,1}, \ldots, N_{2,n})$;
or, $N_{SRS} = \max(N_{1,1}, \ldots, N_{1,m}, N_{2,1}, \ldots, N_{2,n})$;
max(k,l) represents a maximum value of k and l;
$\lceil \ \rceil$ represents rounding up;
$C_x^y$ represents a number of combinations for selecting y elements from x elements;
$N_1$ is a number of SRS resources in the first SRS resource set;
$N_2$ is a number of SRS resources in the second SRS resource set;
$N_3$ is a number of SRS resources included in one SRS resource set of the first SRS resource set when the first SRS resource set includes a plurality of SRS resource sets;
$N_4$ is a number of SRS resources included in one SRS resource set of the second SRS resource set when the second SRS resource set includes a plurality of SRS resource sets;
$L_{max}$ is a maximum number of layers configured for the terminal to allow transmission of the specific type of PUSCH or a maximum number of layers supported by the terminal for transmission of the specific type of PUSCH;
m is a number of SRS resource sets included in the first SRS resource set, $N_{1,m}$ is a number of SRS resources included in an m-th SRS resource set of the first SRS resource set, where m is greater than 1;
n is a number of SRS resource sets included in the second SRS resource set, $N_{2,n}$ is a number of SRS resources included in an n-th SRS resource set of the second SRS resource set, where n is greater than 1.

In a possible implementation, the processor is configured to perform the following operations.

determining the bit width and/or the coding mode of the SRI according to a third SRS resource set, where the third SRS resource set is an SRS resource set transmitted in a latest transmission period in the SRS resource set used for CSI acquisition or last triggered in the SRS resource set used for the CSI acquisition, before a physical downlink control channel (PDCCH) carrying downlink control information (DCI) of the PUSCH.

In a possible implementation, the coding mode of the SRI includes:

the coding mode of the SRI including a reserved state, and any state other than the reserved state being used to indicate an SRS resource in the third SRS resource set; or any state in the coding mode of the SRI being used to indicate an SRS resource in the third SRS resource set.

In a possible implementation, the processor is configured to perform the following operations:

determining the bit width and/or the coding mode of the SRI according to a number and/or a type of SRS resources in the third SRS resource set.

In a possible implementation, when the third SRS resource set is an SRS resource set of the first SRS resource set, the bit width of the SRI is determined according to a number of SRS resources included in both of the third SRS resource set and the second SRS resource set;

where the first SRS resource set is an SRS resource set including an SRS resource in the at least one SRS resource, and the second SRS resource set is an SRS resource set having a usage parameter being only indicated for the CSI acquisition.

In a possible implementation, when the third SRS resource set is an SRS resource set of the second SRS resource set, the bit width of the SRI is determined according to a number of SRS resources included in the third SRS resource set, where the second SRS resource set is an SRS resource set having a usage parameter being only indicated for the CSI acquisition.

In a possible implementation, the processor is configured to perform the following operations:

sending a first signaling to the terminal, where the first signaling is used to indicate the bit width of the SRI.

In a possible implementation, the processor is configured to perform the following operations:

sending indication information of an SRS resource set corresponding to the transmission of the PUSCH to a terminal;

determining the bit width and/or the coding mode of the SRI according to a number of SRS resources included in the SRS resource set indicated by the indication information of the SRS resource set.

In a possible implementation, the coding mode includes:
a coded bit value i of the SRI representing an (i+1)-th SRS resource in a fourth SRS resource set; or
a coded bit value i of the SRI representing an i-th SRS resource in a fourth SRS resource set;
where the fourth SRS resource set is one of the following:
all SRS resource sets in the first SRS resource set; or
an SRS resource set of the first SRS resource set; or
all SRS resource sets in the second SRS resource set; or
an SRS resource set of the second SRS resource set; or
the first SRS resource set and the second SRS resource set; or
an SRS resource set indicated by the network device; or
an SRS resource set corresponding to the transmission of the PUSCH;
i is greater than or equal to 0;
the first SRS resource set is an SRS resource set including an SRS resource in the at least one SRS resource, and the second SRS resource set is an SRS resource set having a usage parameter being only indicated for the CSI acquisition.

In a possible implementation, numbering of SRS resources in the fourth SRS resource set is determined according to a sequence of transmission of the SRS resources;
or, numbering of SRS resources in the fourth SRS resource set is determined according to sizes of identifiers of the SRS resources;
or, numbering of SRS resources in the fourth SRS resource set is determined according to a sequence in which the SRS resources are configured.

In a possible implementation, the SRS resource set corresponding to the transmission of the PUSCH is determined according to a preset rule.

In a possible implementation, the SRS resource corresponding to the transmission of the PUSCH is an SRS resource used to determine an antenna port of the PUSCH.

In a possible implementation, the at least one SRS resource is at least one SRS resource with a specific number in an SRS resource set whose usage parameter is not configured for the CSI acquisition;
or, the at least one SRS resource is an SRS resource in an SRS resource set whose usage parameter is configured for a specific usage;
or, the at least one SRS resource is an SRS resource in an SRS resource set whose usage parameter in a specific time domain type is configured for a specific usage;
or, the at least one SRS resource is an SRS resource included both in an SRS resource set whose usage parameter is configured for a specific usage, and an SRS resource set whose usage is the CSI acquisition.

In one embodiment of the present application provides an information transmission apparatus, including a memory, a transceiver, and a processor;
where the memory is configured to store a computer program; the transceiver is configured to send and receive data under control of the processor; and the processor is configured to read the computer program in the memory and execute following operations:
determining whether there exists at least one sounding reference signal (SRS) resource used for multiple usages;
determining, according to a second result, a bit width and/or a coding mode of SRS resource indicator (SRI), where the SRI is used to indicate an SRS resource corresponding to transmission of a physical uplink shared channel (PUSCH); the second result is that there exists at least one SRS resource used for multiple usages, or, there exists no SRS resource used for multiple usages.

In a possible implementation, the processor further executes the following operations:
receiving first information from a network device, where the first information is used to indicate a terminal that the at least one SRS resource is used for multiple usages, and the multiple usages include channel state information (CSI) acquisition of a specific type of physical uplink shared channel (PUSCH).

In a possible implementation, the processor executes the following operations: receiving configuration information for an SRS resource set from a network device, where the configuration information includes a usage of the SRS resource set, and the SRS resource set is an SRS resource set including an SRS resource in the at least one SRS resource; where the first information indicates that the at least one SRS resource is used for the CSI acquisition in addition to the usage of the at least one SRS resource configured in the SRS resource set.

In a possible implementation, the processor executes the following operations: receiving configuration information for an SRS resource set from a network device, where there exists in the configuration information a configuration value indicating that the SRS resource set is used for multiple usages, the SRS resource set is an SRS resource set including an SRS resource in the at least one SRS resource, and the first information is the configuration information.

In a possible implementation, the processor executes the following operations:
determining the bit width and/or the coding mode of the SRI according to at least one of a number of SRS resources in a first SRS resource set and a number of SRS resources in a second SRS resource set, where the first SRS resource set is an SRS resource set including an SRS resource in the at least one SRS resource, and the second SRS resource set is an SRS resource set having a usage parameter being only indicated for the CSI acquisition.

In a possible implementation, the bit width of the SRI is a function of a number of SRS resources included in the first SRS resource set and/or a number of SRS resources included in the second SRS resource set; or
the bit width of the SRI is a function of a number of SRS resources included in a resource set of the first SRS resource set and/or a number of SRS resources included in a resource set of the second SRS resource set; or
the bit width of the SRI is a function of a number of SRS resources included in each of the first SRS resource set and/or a number of SRS resources included in each of the second SRS resource set; or
the bit width of the SRI is a function of a maximum value of a number of SRS resources included in the first SRS resource set and a number of SRS resources included in the second SRS resource set; or
the bit width of the SRI is a function of a maximum value of a number of SRS resources included in a resource set of the first SRS resource set and a number of SRS resources included in a resource set of the second SRS resource set; or
the bit width of the SRI is a function of a maximum value of a number of SRS resources included in each of the first SRS resource set and/or a number of SRS resources included in each of the second SRS resource set.

In a possible implementation, the coding mode of the SRI includes:
the coding mode of the SRI including a reserved state, and any state other than the reserved state being used to indicate an SRS resource in the first SRS resource set; or
any state in the coding mode of the SRI being used to indicate an SRS resource in the first SRS resource set; or
the coding mode of the SRI including a reserved state, and any state other than the reserved state being used to indicate an SRS resource in the second SRS resource set; or
any state in the coding mode of the SRI being used to indicate an SRS resource in the second SRS resource set; or
the coding mode of the SRI including a reserved state, and any state other than the reserved state being used to indicate an SRS resource included in both of the first SRS resource set and the second SRS resource set; or any state in the coding mode of the SRI being used to indicate an SRS resource included in both of the first SRS resource set and the second SRS resource set; or the coding mode of the SRI including a reserved state, and any state other than the reserved state being used to indicate an SRS resource included in the first SRS resource set or in the second SRS resource set; or any state in the coding mode of the SRI being used to indicate an SRS resource included in the first SRS resource set or in the second SRS resource set.

In a possible implementation, the bit width of the SRI is $\lceil \log_2 N_1 \rceil$;

or, the bit width of the SRI is $\lceil \log_2 N_2 \rceil$;
or, the bit width of the SRI is $\lceil \log_2 N_3 \rceil$;
or, the bit width of the SRI is $\lceil \log_2 N_4 \rceil$;
or, the bit width of the SRI is $$\left\lceil \log_2 \left( \sum\nolimits_{k=1}^{\min(L_{max}, N_1)} C_{N_1}^k \right) \right\rceil;$$

or, the bit width of the SRI is $$\left\lceil \log_2 \left( \sum\nolimits_{k=1}^{\min(L_{max}, N_2)} C_{N_2}^k \right) \right\rceil;$$

or, the bit width of the SRI is $\max(\lceil \log_2(N_1) \rceil, \lceil \log_2(N_2) \rceil)$;
or, the bit width of the SRI is $\lceil \max(\log_2(N_1), \log_2(N_2)) \rceil$;
or, the bit width of the SRI is $\max(\lceil \log_2(N_3) \rceil, \lceil \log_2(N_4) \rceil)$;
or, the bit width of the SRI is $\lceil \max(\log_2(N_3), \log_2(N_4)) \rceil$;
or, the bit width of the SRI is
$\max(\lceil \log_2(N_1) \rceil, \lceil \log_2(N_{2,1}) \rceil, \ldots, \lceil \log_2(N_{2,n}) \rceil)$;
or, the bit width of the SRI is
$\lceil \max(\log_2(N_1), \log_2(N_{2,1}), \ldots, \log_2(N_{2,n})) \rceil$;
or, the bit width of the SRI is
$\max(\lceil \log_2(N_{1,1}) \rceil, \ldots, \lceil \log_2(N_{1,m}) \rceil, \lceil \log_2(N_2) \rceil)$;
or, the bit width of the SRI is
$\lceil \max(\log_2(N_{1,1}), \ldots, \log_2(N_{1,m}), \log_2(N_2)) \rceil$;
or, the bit width of the SRI is
$\max(\lceil \log_2(N_{1,1}) \rceil, \ldots, \lceil \log_2(N_{1,m}) \rceil, \lceil \log_2(N_{2,1}) \rceil, \ldots, \lceil \log_2(N_{2,n}) \rceil)$;
or, the bit width of the SRI is
$\lceil \max(\log_2(N_{1,1}), \ldots, \log_2(N_{1,m}), \log_2(N_{2,1}), \ldots, \log_2(N_{2,n})) \rceil$;
or, the bit width of the SRI is $\lceil \log_2(N_{SRS}) \rceil$;
or, the bit width of the SRI is $$\left\lceil \log_2 \left( \sum\nolimits_{k=1}^{\min(L_{max}, N_{SRS})} C_{N_{SRS}}^k \right) \right\rceil;$$

where $N_{SRS} = \max(N_1, N_2)$;
or, $N_{SRS} = \max(N_3, N_4)$;
or, $N_{SRS} = \max(N_{1,1}, \ldots, N_{1,m}, N_2)$;
or, $N_{SRS} = \max(N_1, N_{2,1}, \ldots, N_{2,n})$;
or, $N_{SRS} = \max(N_{1,1}, \ldots, N_{1,m}, N_{2,1}, \ldots, N_{2,n})$;
$\max(k, l)$ represents a maximum value of k and l;
$\lceil \ \rceil$ represents rounding up;
$C_x^y$ represents a number of combinations for selecting y elements from x elements;
$N_1$ is a number of SRS resources in the first SRS resource set;

$N_2$ is a number of SRS resources in the second SRS resource set;

$N_3$ is a number of SRS resources included in one SRS resource set of the first SRS resource set when the first SRS resource set includes a plurality of SRS resource sets;

$N_4$ is a number of SRS resources included in one SRS resource set of the second SRS resource set when the second SRS resource set includes a plurality of SRS resource sets;

$L_{max}$ is a maximum number of layers for transmission of a PUSCH configured by a network device for a terminal or a maximum number of layers supported by a terminal for uplink transmission;

m is a number of SRS resource sets included in the first SRS resource set, $N_{1,m}$ is a number of SRS resources included in an m-th SRS resource set of the first SRS resource set, where m is greater than 1;

n is a number of SRS resource sets included in the second SRS resource set, $N_{2,n}$ is a number of SRS resources included in an n-th SRS resource set of the second SRS resource set, where n is greater than 1.

In a possible implementation, the processor is configured to execute the following operations:

determining the bit width and/or the coding mode of the SRI according to a third SRS resource set, where the third SRS resource set is an SRS resource set transmitted in a latest SRS transmission period in the SRS resource set used for CSI acquisition or last triggered in the SRS resource set used for the CSI acquisition, before a physical downlink control channel (PDCCH) carrying downlink control information (DCI) of the PUSCH.

In a possible implementation, the coding mode of the SRI includes:

the coding state of the SRI including a reserved state, and any state other than the reserved state being used to indicate an SRS resource in the third SRS resource set; or any state in the coding mode of the SRI being used to indicate an SRS resource in the third SRS resource set.

In a possible implementation, the processor is configured to execute the following operations:

determining the bit width and/or the coding mode of the SRI according to a number and/or a type of SRS resources in the third SRS resource set.

In a possible implementation, when the third SRS resource set is an SRS resource set of the first SRS resource set, the bit width of the SRI is determined according to a number of SRS resources included in both of the third SRS resource set and the second SRS resource set;

where the first SRS resource set is an SRS resource set including an SRS resource in the at least one SRS resource, and the second SRS resource set is an SRS resource set having a usage parameter being only indicated for the CSI acquisition.

In a possible implementation, when the third SRS resource set is an SRS resource set of the second SRS resource set, the bit width of the SRI is determined according to a number of SRS resources included in the third SRS resource set, where the second SRS resource set is an SRS resource set having a usage parameter being only indicated for the CSI acquisition.

In a possible implementation, the processor is configured to execute the following operations: receiving a first signaling from a network device, where the first signaling is used to indicate a bit width of the SRI.

In a possible implementation, the processor is configured to execute the following operations:
receiving indication information of an SRS resource set corresponding to the transmission of the PUSCH sent by a network device;
determining the bit width and/or the coding mode of the SRI according to a number of SRS resources included in the SRS resource set indicated by the indication information of the SRS resource set.

In a possible implementation, the coding mode includes:
a coded bit value i of the SRI representing an (i+1)-th SRS resource in a fourth SRS resource set; or
a coded bit value i of the SRI representing an i-th SRS resource in a fourth SRS resource set;
where the fourth SRS resource set is one of the following:
all SRS resource sets in the first SRS resource set; or
an SRS resource set of the first SRS resource set; or
all SRS resource sets in the second SRS resource set; or
an SRS resource set of the second SRS resource set; or
the first SRS resource set and the second SRS resource set; or
an SRS resource set indicated by a network device; or
an SRS resource set corresponding to the transmission of the PUSCH;
i is greater than or equal to 0;
the first SRS resource set is an SRS resource set including an SRS resource in the at least one SRS resource, and the second SRS resource set is an SRS resource set having a usage parameter being only indicated for the CSI acquisition.

In a possible implementation, numbering of SRS resources in the fourth SRS resource set is determined according to a sequence of transmission of the SRS resources;
or, numbering of SRS resources in the fourth SRS resource set is determined according to sizes of identifiers of the SRS resources;
or, numbering of SRS resources in the fourth SRS resource set is determined according to a sequence in which the SRS resources are configured.

In a possible implementation, the SRS resource set corresponding to the transmission of the PUSCH is determined according to a preset rule.

In a possible implementation, the SRS resource set corresponding to the transmission of the PUSCH is an SRS resource set used to determine an SRS resource set where an SRS resource of an antenna port of the PUSCH is located.

In a possible implementation, the at least one SRS resource is an SRS resource with a specific number in an SRS resource set whose usage parameter is not configured for the CSI acquisition;
or, the at least one SRS resource is an SRS resource in an SRS resource set whose usage parameter is configured for a specific usage;
or, the at least one SRS resource is an SRS resource in an SRS resource set whose usage parameter in a specific time domain type is configured for a specific usage;
or, the at least one SRS resource is an SRS resource included both in an SRS resource set whose usage parameter is configured for a specific usage, and an SRS resource set whose usage is the CSI acquisition.

In one embodiment of the present application provides an information transmission apparatus, including:
a first determining device, configured to determine whether at least one sounding reference signal (SRS) resource is used for multiple usages;
a second determining device, configured to determine, according to a first result, a bit width and/or a coding mode of SRS resource indicator (SRI), where the SRI is used to indicate an SRS resource corresponding to transmission of a physical uplink shared channel (PUSCH); the first result is that the at least one SRS resource is used for multiple usages, or, no SRS resource is used for multiple usages.

In a possible implementation, the apparatus further includes:
a first sending device, configured to send first information to a terminal, where the first information is used to indicate to the terminal that the at least one SRS resource is used for multiple usages, and the multiple usages include channel state information (CSI) acquisition of a specific type of physical uplink shared channel (PUSCH).

In a possible implementation, the first sending device is further configured to send configuration information for an SRS resource set to the terminal, where the configuration information includes a usage of the SRS resource set, and the SRS resource set is an SRS resource set including an SRS resource in the at least one SRS resource;
where the first information indicates that the at least one SRS resource is used for the CSI acquisition in addition to the usage of the at least one SRS resource configured in the SRS resource set.

In a possible implementation, the first sending device is configured to send configuration information for an SRS resource set to the terminal, where there exists in the configuration information a configuration value indicating that the SRS resource set is used for multiple usages, the SRS resource set is an SRS resource set including an SRS resource in the at least one SRS resource, and the first information is the configuration information.

In a possible implementation, the second determining unit is configured to determine the bit width and/or the coding mode of the SRI according to at least one of a number of SRS resources in a first SRS resource set and a number of SRS resources in a second SRS resource set, where the first SRS resource set is an SRS resource set including an SRS resource in the at least one SRS resource, and the second SRS resource set is an SRS resource set having a usage parameter being only indicated for the CSI acquisition.

In a possible implementation, the bit width of the SRI is a function of a number of SRS resources included in the first SRS resource set and/or a number of SRS resources included in the second SRS resource set; or
the bit width of the SRI is a function of a number of SRS resources included in a resource set of the first SRS resource set and/or a number of SRS resources included in a resource set of the second SRS resource set; or
the bit width of the SRI is a function of a number of SRS resources included in each of the first SRS resource set and/or a number of SRS resources included in each of the second SRS resource set; or
the bit width of the SRI is a function of a maximum value of the number of SRS resources included in the first SRS resource set and the number of SRS resources included in the second SRS resource set; or
the bit width of the SRI is a function of a maximum value of a number of SRS resources included in a resource set of the first SRS resource set and a number of SRS resources included in a resource set of the second SRS resource set; or
the bit width of the SRI is a function of a maximum value of a number of SRS resources included in each of the first SRS resource set and/or a number of SRS resources included in each of the second SRS resource set.

In a possible implementation, the coding mode of the SRI includes:

the coding mode of the SRI including a reserved state, and any state other than the reserved state being used to indicate an SRS resource in the first SRS resource set; or any state in the coding mode of the SRI being used to indicate an SRS resource in the first SRS resource set; or the coding mode of the SRI including a reserved state, and any state other than the reserved state being used to indicate an SRS resource in the second SRS resource set; or any state in the coding mode of the SRI being used to indicate an SRS resource in the second SRS resource set; or the coding mode of the SRI including a reserved state, and any state other than the reserved state being used to indicate an SRS resource included in both of the first SRS resource set and the second SRS resource set; or any state in the coding mode of the SRI being used to indicate an SRS resource included in both of the first SRS resource set and the second SRS resource set; or the coding mode of the SRI including a reserved state, and any state other than the reserved state being used to indicate an SRS resource included in the first SRS resource set or in the second SRS resource set; or any state in the coding mode of the SRI being used to indicate an SRS resource included in the first SRS resource set or in the second SRS resource set.

In a possible implementation, the bit width of the SRI is $\lceil \log_2 N_1 \rceil$;
or, the bit width of the SRI is $\lceil \log_2 N_2 \rceil$;
or, the bit width of the SRI is $\lceil \log_2 N_3 \rceil$;
or, the bit width of the SRI is $\lceil \log_2 N_4 \rceil$;
or, the bit width of the SRI is $$\left\lceil \log_2\left(\sum_{k=1}^{\min(L_{max},N_1)} C_{N_1}^k\right) \right\rceil;$$

or, the bit width of the SRI is $$\left\lceil \log_2\left(\sum_{k=1}^{\min(L_{max},N_2)} C_{N_2}^k\right) \right\rceil;$$

or, the bit width of the SRI is $\max(\lceil \log_2(N_1) \rceil, \lceil \log_2(N_2) \rceil)$;
or, the bit width of the SRI is $\lceil \max(\log_2(N_1), \log_2(N_2)) \rceil$;
or, the bit width of the SRI is $\max(\lceil \log_2(N_3) \rceil, \lceil \log_2(N_4) \rceil)$;
or, the bit width of the SRI is $\lceil \max(\log_2(N_3), \log_2(N_4)) \rceil$;
or, the bit width of the SRI is $\max(\lceil \log_2(N_1) \rceil, \lceil \log_2(N_{2,1}) \rceil, \ldots, \lceil \log_2(N_{2,n}) \rceil)$;
or, the bit width of the SRI is $\lceil \max(\log_2(N_1), \log_2(N_{2,1}), \ldots, \log_2(N_{2,n})) \rceil$;
or, the bit width of the SRI is $\max(\lceil \log_2(N_{1,1}) \rceil, \ldots, \lceil \log_2(N_{1,m}) \rceil, \lceil \log_2(N_2) \rceil)$;
or, the bit width of the SRI is $\lceil \max(\log_2(N_{1,1}), \ldots, \log_2(N_{1,m}), \log_2(N_2)) \rceil$;
or, the bit width of the SRI is $\max(\lceil \log_2(N_{1,1}) \rceil, \ldots, \lceil \log_2(N_{1,m}) \rceil, \lceil \log_2(N_{2,1}) \rceil, \ldots, \lceil \log_2(N_{2,n}) \rceil)$;
or, the bit width of the SRI is $\lceil \max(\log_2(N_{1,1}), \ldots, \log_2(N_{1,m}), \log_2(N_{2,1}), \ldots, \log_2(N_{2,n})) \rceil$;
or, the bit width of the SRI is $\lceil \log_2(N_{SRS}) \rceil$;
or, the bit width of the SRI is $$\left\lceil \log_2\left(\sum_{k=1}^{\min(L_{max},N_{SRS})} C_{N_{SRS}}^k\right) \right\rceil;$$

where $N_{SRS} = \max(N_1, N_2)$;
or, $N_{SRS} = \max(N_3, N_4)$;
or, $N_{SRS} = \max(N_{1,1}, \ldots, N_{1,m}, N_2)$;
or, $N_{SRS} = \max(N_1, N_{2,1}, \ldots, N_{2,n})$;
or, $N_{SRS} = \max(N_{1,1}, \ldots, N_{1,m}, N_{2,1}, \ldots, N_{2,n})$;
max(k,l) represents a maximum value of k and l;
$\lceil \ \rceil$ represents rounding up;
$C_x^y$ represents a number of combinations for selecting y elements from x elements;
$N_1$ is a number of SRS resources in the first SRS resource set;
$N_2$ is a number of SRS resources in the second SRS resource set;
$N_3$ is a number of SRS resources included in one SRS resource set of the first SRS resource set when the first SRS resource set includes a plurality of SRS resource sets;
$N_4$ is a number of SRS resources included in one SRS resource set of the second SRS resource set when the second SRS resource set includes a plurality of SRS resource sets;
$L_{max}$ is a maximum number of layers configured for the terminal to allow transmission of the specific type of PUSCH or a maximum number of layers supported by the terminal for transmission of the specific type of PUSCH;
m is a number of SRS resource sets included in the first SRS resource set, $N_{1,m}$ is a number of SRS resources included in an m-th SRS resource set of the first SRS resource set, where m is greater than 1;
n is a number of SRS resource sets included in the second SRS resource set, $N_{2,n}$ is a number of SRS resources included in an n-th SRS resource set of the second SRS resource set, where n is greater than 1.

In a possible implementation, the second determining device is configured to determine the bit width and/or the coding mode of the SRI according to a third SRS resource set, where the third SRS resource set is an SRS resource set transmitted in a latest transmission period in the SRS resource set used for the CSI acquisition or last triggered in the SRS resource set used for the CSI acquisition, before a physical downlink control channel (PDCCH) carrying downlink control information (DCI) of the PUSCH.

In a possible implementation, the coding mode of the SRI includes:

the coding mode of the SRI including a reserved state, and any state other than the reserved state being used to indicate an SRS resource in the third SRS resource set; or any state in the coding mode of the SRI being used to indicate an SRS resource in the third SRS resource set.

In a possible implementation, the second determining device is configured to determine the bit width and/or the coding mode of the SRI according to a number and/or a type of SRS resources in the third SRS resource set.

In a possible implementation, when the third SRS resource set is an SRS resource set of the first SRS resource set, the bit width of the SRI is determined according to a number of SRS resources included in both of the third SRS resource set and the second SRS resource set;
  where the first SRS resource set is an SRS resource set including an SRS resource in the at least one SRS resource, and the second SRS resource set is an SRS resource set having a usage parameter being only indicated for the CSI acquisition.

In a possible implementation, when the third SRS resource set is an SRS resource set of the second SRS resource set, the bit width of the SRI is determined according to a number of SRS resources included in the third SRS resource set, where the second SRS resource set is an SRS resource set having a usage parameter being only indicated for the CSI acquisition.

In a possible implementation, the apparatus further includes:
  a third sending device, configured to send a first signaling to the terminal, where the first signaling is used to indicate the bit width of the SRI.

In a possible implementation, the apparatus further includes:
  a second sending device, configured to send indication information of an SRS resource set corresponding to the transmission of the PUSCH to the terminal; the second determining device, configured to determine the bit width and/or the coding mode of the SRI according to a number of SRS resources included in the SRS resource set indicated by the indication information of the SRS resource set.

In a possible implementation, the coding mode includes:
a coded bit value i of the SRI representing an (i+1)-th SRS resource in a fourth SRS resource set; or
a coded bit value i of the SRI representing an i-th SRS resource in a fourth SRS resource set;
where the fourth SRS resource set is one of the following:
all SRS resource sets in the first SRS resource set; or
an SRS resource set of the first SRS resource set; or
all SRS resource sets in the second SRS resource set; or
an SRS resource set of the second SRS resource set; or
the first SRS resource set and the second SRS resource set; or
an SRS resource set indicated by the network device; or
an SRS resource set corresponding to the transmission of the PUSCH;
i is greater than or equal to 0;
the first SRS resource set is an SRS resource set including an SRS resource in the at least one SRS resource, and the second SRS resource set is an SRS resource set having a usage parameter being only indicated for the CSI acquisition.

In a possible implementation, numbering of SRS resources in the fourth SRS resource set is determined according to a sequence of transmission of the SRS resources;
  or, numbering of SRS resources in the fourth SRS resource set is determined according to sizes of identifiers of the SRS resources;
  or, numbering of SRS resources in the fourth SRS resource set is determined according to a sequence in which the SRS resources are configured.

In a possible implementation, the SRS resource set corresponding to the transmission of the PUSCH is determined according to a preset rule.

In a possible implementation, the SRS resource corresponding to the transmission of the PUSCH is an SRS resource used to determine an antenna port of the PUSCH.

In a possible implementation, the at least one SRS resource is at least one SRS resource with a specific number in an SRS resource set whose usage parameter is not configured for the CSI acquisition;
  or, the at least one SRS resource is an SRS resource in an SRS resource set whose usage parameter is configured for a specific usage;
  or, the at least one SRS resource is an SRS resource in an SRS resource set whose usage parameter in a specific time domain type is configured for a specific usage;
  or, the at least one SRS resource is an SRS resource included both in an SRS resource set whose usage parameter is configured for a specific usage, and an SRS resource set whose usage is the CSI acquisition.

In one embodiment of the present application provides an information transmission apparatus, including:
  a first determining device, configured to determine whether there exists at least one sounding reference signal (SRS) resource used for multiple usages;
  a second determining device, configured to determine, according to a second result, a bit width and/or a coding mode of SRS resource indicator (SRI), where the SRI is used to indicate an SRS resource corresponding to transmission of a physical uplink shared channel (PUSCH); the second result is that there exists at least one SRS resource used for multiple usages, or, there exists no SRS resource used for multiple usages.

In a possible implementation, the apparatus further includes:
  a first receiving device, configured to receive first information from a network device, where the first information is used to indicate a terminal that the at least one SRS resource is used for multiple usages, and the multiple usages include channel state information (CSI) acquisition of a specific type of physical uplink shared channel (PUSCH).

In a possible implementation, the first receiving device is configured to receive configuration information for an SRS resource set from a network device, where the configuration information includes a usage of the SRS resource set, and the SRS resource set is an SRS resource set including an SRS resource in the at least one SRS resource;
  where the first information indicates that the at least one SRS resource is used for the CSI acquisition in addition to the usage of the at least one SRS resource configured in the SRS resource set.

In a possible implementation, the first receiving device is configured to receive configuration information for an SRS resource set from a network device, where there exists in the configuration information a configuration value indicating that the SRS resource set is used for multiple usages, the SRS resource set is an SRS resource set including an SRS resource in the at least one SRS resource, and the first information is the configuration information.

In a possible implementation, the second determining device is configured to determine the bit width and/or the coding mode of the SRI according to at least one of a number of SRS resources in a first SRS resource set and a number of SRS resources in a second SRS resource set, where the first SRS resource set is an SRS resource set including an SRS resource in the at least one SRS resource, and the second SRS resource set is an SRS resource set having a usage parameter being only indicated for the CSI acquisition.

In a possible implementation, the bit width of the SRI is a function of a number of SRS resources included in the first SRS resource set and/or a number of SRS resources included in the second SRS resource set; or the bit width of the SRI is a function of a number of SRS resources included in a resource set of the first SRS resource set and/or a number of SRS resources included in a resource set of the second SRS resource set; or the bit width of the SRI is a function of a number of SRS resources included in each of the first SRS resource set and/or a number of SRS resources included in each of the second SRS resource set; or the bit width of the SRI is a function of a maximum value of a number of SRS resources included in the first SRS resource set and a number of SRS resources included in the second SRS resource set; or the bit width of the SRI is a function of a maximum value of a number of SRS resources included in a resource set of the first SRS resource set and a number of SRS resources included in a resource set of the second SRS resource set; or the bit width of the SRI is a function of a maximum value of a number of SRS resources included in each of the first SRS resource set and/or a number of SRS resources included in each of the second SRS resource set.

In a possible implementation, the coding mode of the SRI includes:

the coding mode of the SRI including a reserved state, and any state other than the reserved state being used to indicate an SRS resource in the first SRS resource set; or any state in the coding mode of the SRI being used to indicate an SRS resource in the first SRS resource set; or the coding mode of the SRI including a reserved state, and any state other than the reserved state being used to indicate an SRS resource in the second SRS resource set; or any state in the coding mode of the SRI being used to indicate an SRS resource in the second SRS resource set; or the coding mode of the SRI including a reserved state, and any state other than the reserved state being used to indicate an SRS resource included in both of the first SRS resource set and the second SRS resource set; or any state in the coding mode of the SRI being used to indicate an SRS resource included in both of the first SRS resource set and the second SRS resource set; or the coding mode of the SRI including a reserved state, and any state other than the reserved state being used to indicate an SRS resource included in the first SRS resource set or in the second SRS resource set; or any state in the coding mode of the SRI being used to indicate an SRS resource included in the first SRS resource set or in the second SRS resource set.

In a possible implementation, the bit width of the SRI is $\lceil \log_2 N_1 \rceil$;

or, the bit width of the SRI is $\lceil \log_2 N_2 \rceil$;
or, the bit width of the SRI is $\lceil \log_2 N_3 \rceil$;
or, the bit width of the SRI is $\lceil \log_2 N_4 \rceil$;
or, the bit width of the SRI is $$\left\lceil \log_2\left(\sum_{k=1}^{min(L_{max},N_1)} C_{N_1}^k\right)\right\rceil;$$

or, the bit width of the SRI is $$\left\lceil \log_2\left(\sum_{k=1}^{min(L_{max},N_2)} C_{N_2}^k\right)\right\rceil;$$

or, the bit width of the SRI is $\max(\lceil \log_2(N_1) \rceil, \lceil \log_2(N_2) \rceil)$;
or, the bit width of the SRI is $\lceil \max(\log_2(N_1), \log_2(N_2)) \rceil$;
or, the bit width of the SRI is $\max(\lceil \log_2(N_3) \rceil, \lceil \log_2(N_4) \rceil)$;
or, the bit width of the SRI is $\lceil \max(\log_2(N_3), \log_2(N_4)) \rceil$;
or, the bit width of the SRI is
$\max(\lceil \log_2(N_1) \rceil, \lceil \log_2(N_{2,1}) \rceil, \ldots, \lceil \log_2(N_{2,n}) \rceil)$;
or, the bit width of the SRI is
$\lceil \max(\log_2(N_1), \log_2(N_{2,1}), \ldots, \log_2(N_{2,n})) \rceil$;
or, the bit width of the SRI is
$\max(\lceil \log_2(N_{1,1}) \rceil, \ldots, \lceil \log_2(N_{1,m}) \rceil, \lceil \log_2(N_2) \rceil)$;
or, the bit width of the SRI is
$\lceil \max(\log_2(N_{1,1}), \ldots, \log_2(N_{1,m}), \log_2(N_2)) \rceil$;
or, the bit width of the SRI is
$\max(\lceil \log_2(N_{1,1}) \rceil, \ldots, \lceil \log_2(N_{1,m}) \rceil, \lceil \log_2(N_{2,1}) \rceil, \ldots, \lceil \log_2(N_{2,n}) \rceil)$;
or, the bit width of the SRI is
$\lceil \max(\log_2(N_{1,1}), \ldots, \log_2(N_{1,m}), \log_2(N_{2,1}), \ldots, \log_2(N_{2,n})) \rceil$;
or, the bit width of the SRI is $\lceil \log_2(N_{SRS}) \rceil$;
or, the bit width of the SRI is $$\left\lceil \log_2\left(\sum_{k=1}^{min(L_{max},N_{SRS})} C_{N_{SRS}}^k\right)\right\rceil;$$

where $N_{SRS} = \max(N_1, N_2)$;
or, $N_{SRS} = \max(N_3, N_4)$;
or, $N_{SRS} = \max(N_{1,1}, \ldots, N_{1,m}, N_2)$;
or, $N_{SRS} = \max(N_1, N_{2,1}, \ldots, N_{2,n})$;
or, $N_{SRS} = \max(N_{1,1}, \ldots, N_{1,m}, N_{2,1}, \ldots, N_{2,n})$;
max(k,l) represents a maximum value of k and l;
$\lceil \ \rceil$ represents rounding up;
$C_x^y$ represents a number of combinations for selecting y elements from x elements;
$N_1$ is a number of SRS resources in the first SRS resource set;
$N_2$ is a number of SRS resources in the second SRS resource set;
$N_3$ is a number of SRS resources included in one SRS resource set of the first SRS resource set when the first SRS resource set includes a plurality of SRS resource sets;
$N_4$ is a number of SRS resources included in one SRS resource set of the second SRS resource set when the second SRS resource set includes a plurality of SRS resource sets;
$L_{max}$ is a maximum number of layers for transmission of a PUSCH configured by a network device for a terminal or a maximum number of layers supported by a terminal for uplink transmission;
m is a number of SRS resource sets included in the first SRS resource set, $N_{1,m}$ is a number of SRS resources included in an m-th SRS resource set of the first SRS resource set, where m is greater than 1;
n is a number of SRS resource sets included in the second SRS resource set, $N_{2,n}$ is a number of SRS resources included in an n-th SRS resource set of the second SRS resource set, where n is greater than 1.

In a possible implementation, the second determining device is configured to determine the bit width and/or the coding mode of the SRI according to a third SRS resource set, where the third SRS resource set is an SRS resource set transmitted in a latest SRS transmission period in the SRS resource set used for CSI acquisition or last triggered in the SRS resource set used for CSI acquisition, before a physical downlink control channel (PDCCH) carrying downlink control information (DCI) of the PUSCH.

In a possible implementation, the coding mode of the SRI includes:
the coding state of the SRI including a reserved state, and any state other than the reserved state being used to indicate an SRS resource in the third SRS resource set; or
any state in the coding mode of the SRI being used to indicate an SRS resource in the third SRS resource set.

In a possible implementation, the second determining device is configured to determine the bit width and/or the coding mode of the SRI according to a number and/or a type of SRS resources in the third SRS resource set.

In a possible implementation, when the third SRS resource set is an SRS resource set of the first SRS resource set, the bit width of the SRI is determined according to a number of SRS resources included in both of the third SRS resource set and the second SRS resource set;
where the first SRS resource set is an SRS resource set including an SRS resource in the at least one SRS resource, and the second SRS resource set is an SRS resource set having a usage parameter being only indicated for the CSI acquisition.

In a possible implementation, when the third SRS resource set is an SRS resource set of the second SRS resource set, the bit width of the SRI is determined according to a number of SRS resources included in the third SRS resource set, where the second SRS resource set is an SRS resource set having a usage parameter being only indicated for the CSI acquisition.

In a possible implementation, the apparatus further includes:
a third receiving device, configured to receive a first signaling from a network device, where the first signaling is used to indicate a bit width of the SRI.

In a possible implementation, the apparatus further includes:
a second receiving device, configured to receive indication information of an SRS resource set corresponding to the transmission of the PUSCH sent by a network device;
the second determining device, configured to determine the bit width and/or the coding mode of the SRI according to a number of SRS resources included in the SRS resource set indicated by the indication information of the SRS resource set.

In a possible implementation, the coding mode includes:
a coded bit value i of the SRI representing an (i+1)-th SRS resource in a fourth SRS resource set; or
a coded bit value i of the SRI representing an i-th SRS resource in a fourth SRS resource set;
where the fourth SRS resource set is one of the following:
all SRS resource sets in the first SRS resource set; or
an SRS resource set of the first SRS resource set; or
all SRS resource sets in the second SRS resource set; or
an SRS resource set of the second SRS resource set; or
the first SRS resource set and the second SRS resource set; or
an SRS resource set indicated by a network device; or
an SRS resource set corresponding to the transmission of the PUSCH;
i is greater than or equal to 0;
the first SRS resource set is an SRS resource set including an SRS resource in the at least one SRS resource, and the second SRS resource set is an SRS resource set having a usage parameter being only indicated for the CSI acquisition.

In a possible implementation, numbering of SRS resources in the fourth SRS resource set is determined according to a sequence of transmission of the SRS resources;
or, numbering of SRS resources in the fourth SRS resource set is determined according to sizes of identifiers of the SRS resources;
or, numbering of SRS resources in the fourth SRS resource set is determined according to a sequence in which the SRS resources are configured.

In a possible implementation, the SRS resource set corresponding to the transmission of the PUSCH is determined according to a preset rule.

In a possible implementation, the SRS resource set corresponding to the transmission of the PUSCH is an SRS resource set used to determine an SRS resource set where an SRS resource of an antenna port of the PUSCH is located.

In a possible implementation, the at least one SRS resource is an SRS resource with a specific number in an SRS resource set whose usage parameter is not configured for the CSI acquisition;
or, the at least one SRS resource is an SRS resource in an SRS resource set whose usage parameter is configured for a specific usage;
or, the at least one SRS resource is an SRS resource in an SRS resource set whose usage parameter in a specific time domain type is configured for a specific usage;
or, the at least one SRS resource is an SRS resource included both in an SRS resource set whose usage parameter is configured for a specific usage, and an SRS resource set whose usage is the CSI acquisition.

In one embodiment of the present application provides a processor-readable storage medium, where the processor-readable storage medium has a computer program stored thereon, and the computer program is used to cause the processor to execute the method according to any implementation of the embodiments.

In one embodiment of the present application provides a processor-readable storage medium, where the processor-readable storage medium has a computer program stored thereon, and the computer program is used to cause the processor to execute the method according to any implementation of the embodiments.

The present application provides an information transmission method and apparatus, and a storage medium. In the method, the network device determines whether at least one SRS resource is used for multiple usages, and in a case that the SRS resource set is used for multiple usages, a bit width and/or a coding mode of new SRI are provided, to realize that when transmitting an SRS of the SRS resource set, the terminal will perform the SRS transmission according to the requirements of multiple usages, so the network device can use the same SRS resource set to realize the measurement of multiple usages, thus improving resource utilization and reduces resource waste.

It should be understood that what is described in the summary above is not intended to limit key or important features of embodiments of the present disclosure, nor is it intended to limit the scope of the present disclosure. Other features of the present disclosure will be easily understood through the following description.

BRIEF DESCRIPTION OF DRAWINGS

In order to describe the embodiments of the present application or prior art more clearly, in the following, drawings that need to be used in the description of the embodiments or prior art will be introduced briefly. The drawings described below are some embodiments of the present application.

DESCRIPTION OF EMBODIMENTS

The term "and/or" in the present application is an association relationship describing associated objects, and represents that there may be three relationships. For example, A and/or B may represent three situations: presence of A only, presence of both A and B, and presence of B only. The character "/" herein generally represents an "or" relationship between contextual objects. The term "plurality" in the present application refers to two or more than two, and other quantifiers are similar.

The embodiments of the present application will be described as follows clearly and completely in conjunction with accompanying drawings in the embodiments of the present application. Apparently, the described embodiments are merely a part rather than all of the embodiments of the present application. Based on the embodiments in the present application, all other embodiments obtained fall within the protection scope of the present application.

The embodiment of the present application provides an information transmission method and apparatus for realizing multiple usages of the same SRS resource set. The method and the apparatus are based on the same application concept. Since the method and the apparatus solve the problem with similar principles, reference can be made to each other for the implementation of the apparatus and the method, and the repetition is not repeated.

The embodiments of the present application can be applied to various systems, including but not limited to 5G systems, such as: an NR system, a 6G system, a global system of mobile communication (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunication system (UMTS), a worldwide interoperability for microwave access (WiMAX) system or other OFDM system, a DFT-S-OFDM system, etc. These various systems all include terminals and network devices. The system may also include a core network portion, such as an evolved packet system (EPS),a 5G system (5GS), etc.

Figure 1:
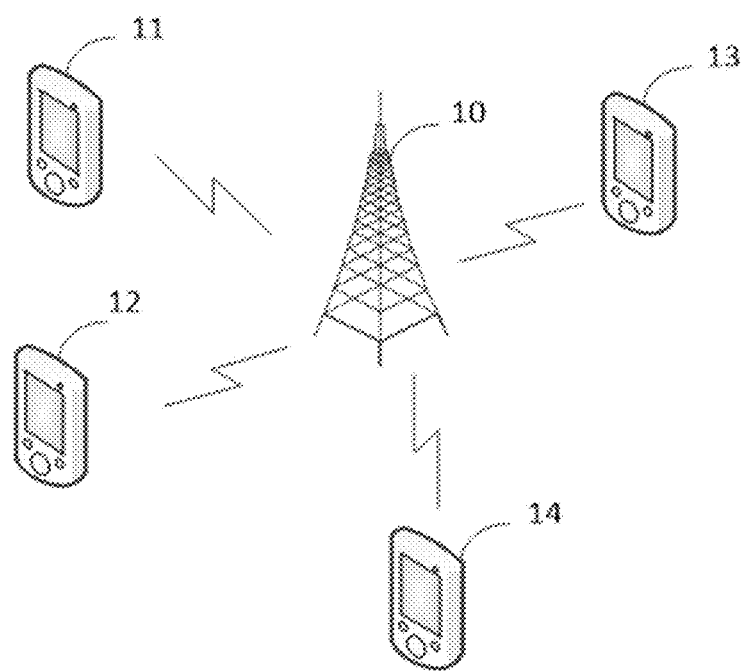
FIG. 1 is a schematic structural diagram of a communication system provided by an embodiment of the present application.

FIG. 1 is a schematic structural diagram of a communication system provided by an embodiment of the present application. As shown in FIG. 1, the communication system may include at least one network device 10 and at least one terminal located within the coverage area of the network device 10. The terminal device may be fixed or mobile. FIG. 1 is only a schematic diagram, and the communication system may include other devices, such as a core network device (not shown in FIG. 1). The network device is connected to the core network device wirelessly or in a wired means. The core network device and the network device may be separate physical devices, or functions of the core network device and logical functions of the network device may be integrated on the same physical device, or part of functions of the core network device and part of functions of the network device may be integrated on a physical device. In addition, the communication system may include other network devices, such as a wireless relay device and a wireless backhaul device, which are not shown in FIG. 1. The numbers of core network devices, network devices and terminals included in the communication system are not limited in the embodiments of the present application.

As shown in FIG. 1, communication between the network device 10 and the terminal is illustrated. Specifically, the network device 10, as a sender, can send downlink information to one or some of terminal device 11 to terminal device 14. Accordingly, the terminal device 11 to the terminal device 14 that are capable of communicating directly with the network device 10, may also send uplink information to the network device 10 respectively or simultaneously.

The terminal involved in the embodiments of the present application may be a device that provides voice and/or data connectivity to a user, a handheld device with a wireless connection function, or other processing devices connected to a wireless modem. The name of the terminal may also vary in different systems. For example, in a 5G system, the terminal may be called a user equipment (UE). A wireless terminal may communicate with one or more core networks (CN) via a radio access network (RAN). The wireless terminal may be a mobile terminal device, such as a cell phone (or "cellular" phone) and a computer with a mobile terminal device, for example, a portable, pocket-sized, hand-held, computer built-in, or vehicle-mounted mobile device, that exchanges language and/or data with the radio access network. For example, a personal communications system (PCS) terminal, a cordless phone, a session initiated protocol (SIP) phone, a wireless local loop (WLL) station, a (PDA) or other devices. The wireless terminal can also be called a system, a subscriber unit, a subscriber station, a mobile station, a mobile, a remote station, an access point, a remote terminal, an access terminal, a user terminal, a user agent, and a user device, which are not limited in the embodiments of the present application.

The network device involved in the embodiments of the present application may be a base station, which may include a plurality of cells providing services to the terminal. Depending on the specific application, the base station can also be called an access point, or a device in the access network that communicates with the wireless terminal device through one or more sectors on an air interface, or other names. The network device may be used to interchange a received air frame with an Internet protocol (IP) packet, and may act as a router between the wireless terminal device and the rest of the access network, the rest of the access network may include an Internet protocol (IP) communication network. The network device may also coordinate the management of attributes of the air interface. For example, the network device involved in the embodiments of the present application may be a base station (BTS) in a global system for mobile communications system (GSM) or code division multiple access (CDMA), or a network device (NodeB, NB) in a Wide-band Code Division Multiple Access (WCDMA) system, or an evolutional network device (evolutional Node B, eNB or eNodeB) in a long term evolution (LTE) system, or a 5G base station (gNB) in a 5G network architecture (next generation system), or a home evolved base station (HeNB), or a relay node, a home base station (femto), a pico base station (pico), etc., which are not limited in the embodiments of the present application. In some network structures, the network device may include a centralized unit (CU) node and a distributed unit (DU) node, and the centralized unit and the distributed unit may also be geographically separated.

The network device and the terminal device can use one or more antennas respectively for multi input multi output (MIMO) transmission, and the MIMO transmission can be single user MIMO (SU-MIMO) or multiple user MIMO (MU-MIMO). According to the shape and the number of antenna combinations, the MIMO transmission can be 2D-MIMO, 3D-MIMO, FD-MIMO or massive-MIMO, or can be diversity transmission, pre-coded transmission or beamforming transmission, etc.

In a 3GPP NR system, three time domain types of SRS resource sets are included. When the time domain type (resourceType) of the SRS resource set is periodic, the terminal may send SRS to the network device periodically based on the configuration information of the SRS resource set. When the time domain type of the SRS resource set is non-periodic, the terminal may send SRS to the network device based on triggering information of the SRS resource set, that is, the terminal sends the SRS only after receiving triggering signaling. When the time domain type of the SRS resource set is semi-persistent, the terminal may send SRS to the network device periodically based on activation signaling of the SRS resource set until de-activation signaling is received. After receiving SRS from the terminal, the network device can perform PUSCH scheduling, downlink scheduling and uplink beam management based on the measurement of the SRS.

In the 3GPP NR system, the network device can configure one or more SRS resource sets for the terminal. The configuration information of each SRS resource set includes usage signaling. The usage signaling can be configured as codebook, nonCodebook, antennaSwitching, or beamManagement. When the usage signaling of the SRS resource set is configured as codebook, the SRS resource set can be used for CSI acquisition of a codebook-based PUSCH. When the usage signaling of the SRS resource set is configured as nonCodebook, the SRS resource set can be used for CSI acquisition of a nonCodebook PUSCH. When the usage signaling of the SRS resource set is configured as antennaSwitching, the SRS resource set can be used for downlink CSI acquisition. When the usage signaling of the SRS resource set is configured as beamManagement, the SRS resource set can be used for uplink beam management. The configuration restrictions of SRS resource sets for different purposes are different.

The flow of the codebook-based uplink transmission scheme in the NR system includes:
  the terminal sends SRS for codebook-based uplink transmission to the network device;
  the network device performs uplink channel detection based on the SRS sent by the terminal, schedule resources for the terminal, determines an SRS resource corresponding to the uplink transmission, the number of layers and a pre-coding matrix for the uplink transmission, further determines a modulation and coding scheme (MCS) level of the uplink transmission according to the pre-coding matrix and the channel information, and then sends resource allocation for a PUSCH and the corresponding MCS, a transmit pre-coding matrix indicator (TPMI), the number of transmission layers and corresponding SRS resource indication information (SRS resource indicator, SRI) to the terminal, where a bit width of the SRI is determined according to the number of SRS resources included in the SRS resource set whose usage is codebook;
  the terminal modulates and codes data according to the MCS indicated by the network device, and uses the indicated SRI, TPMI, and the number of transmission layers to determine the pre-coding matrix and the number of transmission layers used for data transmission, and then precodes and sends the data.

The flow of the nonCodebook-based uplink transmission scheme in the NR system includes:
  the terminal measures a downlink reference signal, obtains candidate uplink pre-coding matrices, uses them to precode SRS for nonCodebook-based uplink transmission and sends the precoded SRS to the network device;
  the network device performs uplink channel detection based on the SRS sent by the terminal, performs resource scheduling for the terminal, determines an SRS resource corresponding to the uplink transmission and an MCS level of the uplink transmission, and sends them to the terminal, where the SRS resource corresponding to the uplink transmission is indicated to the terminal through SRI, and a bit width of the SRI is determined based on the number of SRS resources included in the SRS resource set whose usage is nonCodebook;
  the terminal modulates and codes data according to the MCS sent by the network device, and determines the pre-coding matrix and the number of transmission layers of the data by using the SRI, and sends the data after pre-coding the data.

In the above two processes, when the terminal is required to perform the codebook-based PUSCH transmission, an SRS resource set with usage of codebook must be configured for the terminal; when the terminal is required to perform the nonCodebook-based PUSCH transmission, an SRS resource set with usage of nonCodebook must be configured for the terminal. The existing protocol does not support the case that the terminal uses SRS resources of other usages for the codebook-based PUSCH transmission when there exists no SRS resource set with usage of codebook, nor does it support the case that the terminal uses SRS resources of other usages for the nonCodebook-based PUSCH transmission when there exists no SRS resource set with usage of nonCodebook.

Since there exists no scheme in the prior art that the SRS resources in the SRS resource set whose usage is not configured as codebook/nonCodebook are used for CSI acquisition of a PUSCH based on codebook/nonCodebook, that is, the SRS resource sets with different usages cannot be reused, when a network device wants to use the SRS to perform measurement for a certain usage, it must configure the SRS resource for the usage, resulting in a waste of SRS resources. For this reason, the present application proposes a scheme to realize that the same SRS resource set has multiple usages at the same time, and in the scheme in which the SRS resource set has multiple usages at the same time, the bit width and coding mode of SRI in the prior art are no longer applicable. Therefore, the present application also proposes a new method for determining the bit width and coding mode of the SRI.

It is noted that, in an implementation, the method provided by the present application can be applied to one carrier of a terminal. In an implementation, the method provided by the present application can be applied within a bandwidth part (BWP) of the terminal, for example, within an uplink activated BWP and/or a downlink activated BWP.

The method of the present application is described below in conjunction with specific embodiments.

Figure 2:
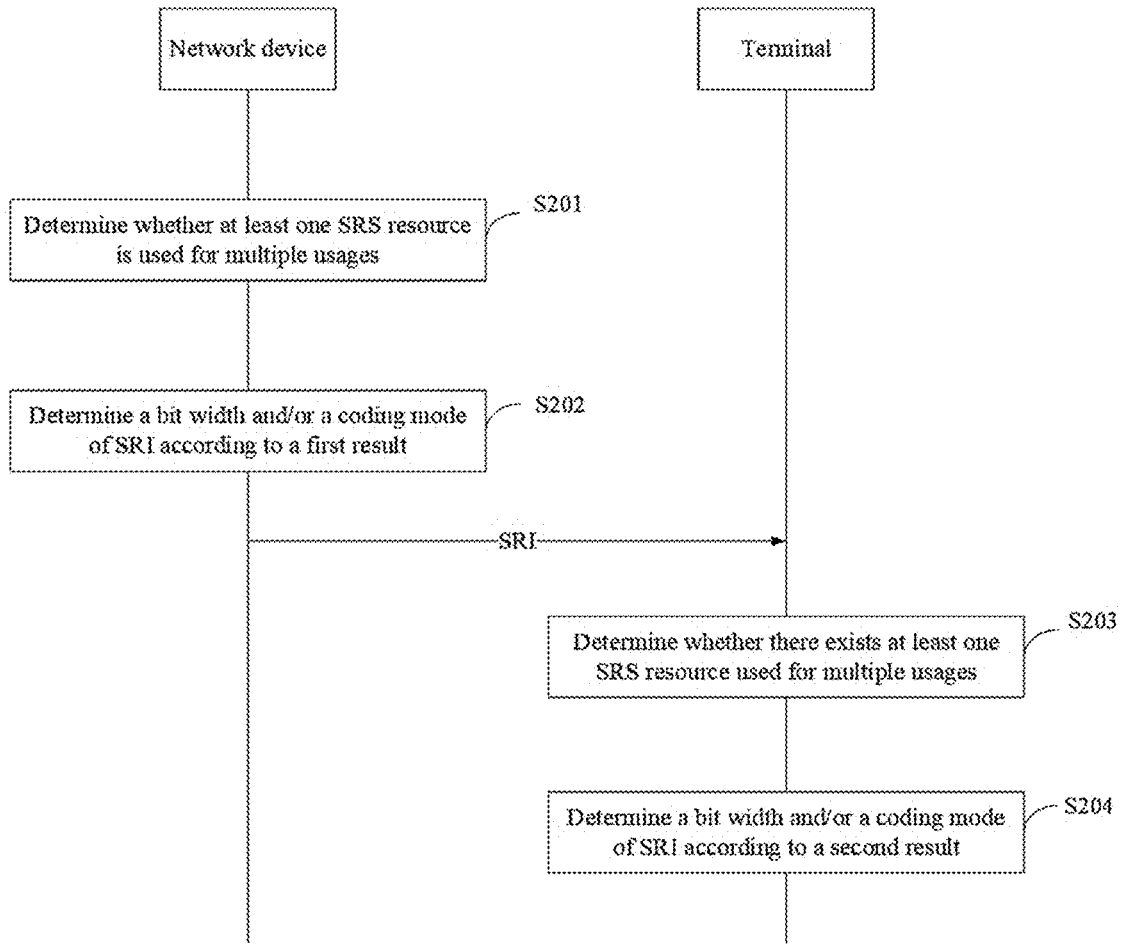
FIG. 2 is a schematic flowchart of an information transmission method provided by an embodiment of the present application.

FIG. 2 is a schematic flowchart of an information transmission method provided by an embodiment of the present application. As shown in FIG. 2, the method includes:

S201, a network device determines whether at least one sounding reference signal (SRS) resource is used for multiple usages.

In the embodiment, when configuring an SRS resource set for a terminal, the network device can configure at least one SRS resource in the SRS resource set for multiple usages, or can configure resources in the SRS resource set for a usage, that is, no SRS resource is used for multiple usages. The network device may determine whether at least one SRS resource is used for multiple usages according to measurement requirements, that is, determine that the SRS resource is used for one or more usages.

When the network device configures at least one SRS resource in the SRS resource set for multiple usages, the multiple usages of the at least one SRS resource may be any multiple usages of the usages of the SRS resource(s), which are not limited in the embodiment. Illustratively, the multiple usages may be several of the following: CSI acquisition of a codebook-based PUSCH, CSI acquisition of a non-Codebook-based PUSCH, downlink CSI acquisition, and uplink beam management.

S202, the network device determines a bit width and/or a coding mode of SRI according to a first result.

The SRI is used to indicate an SRS resource corresponding to transmission of a PUSCH, and the first result is that the at least one SRS resource is used for multiple usages, or, no SRS resource is used for multiple usages.

In an implementation, the SRS resource corresponding to the transmission of the PUSCH is an SRS resource used to determine an antenna port of the PUSCH. For example, an antenna port of the PUSCH uses the same antenna port as the antenna port of the SRS resource. Further, for example, the terminal uses the antenna port of the SRS resource as an antenna port of the PUSCH.

In an implementation, the SRS resource corresponding to the transmission of the PUSCH is an SRS resource used to determine a number of transmission streams and/or a pre-coding matrix of the PUSCH. In an implementation, the terminal determines the number of transmission streams and the pre-coding matrix of the PUSCH according to the SRS resource.

In an implementation, the SRS resource corresponding to the transmission of the PUSCH is an SRS resource used to determine a spatial filter coefficient of the PUSCH. In an implementation, the terminal uses a spatial filter coefficient of the SRS resource as the spatial filter coefficient of the PUSCH.

In an implementation, the SRS resource corresponding to the transmission of the PUSCH is an SRS resource used to determine a physical antenna of the PUSCH. In an implementation, the terminal sends the PUSCH using the physical antenna used when sending the SRS resource.

In an implementation, the SRS resource corresponding to the transmission of the PUSCH is an SRS resource that realizes the above multiple functions at the same time.

In an implementation, the SRS resource corresponding to the transmission of the PUSCH is an SRS resource used to determine scheduling information of the PUSCH. In an implementation, the terminal uses the SRS resource to determine scheduling information of the PUSCH.

It is noted that the SRS resource corresponding to the transmission of the PUSCH indicated by the network device via the SRI may be an SRS resource indicated directly by the network device, or may be an SRS resource indicated by the network device from the SRS resource set.

When the network device indicates the SRS resource from the SRS resource set, the SRS resource set is an SRS resource set corresponding to the transmission of the PUSCH. The SRS resource set corresponding to the transmission of the PUSCH may be determined according to a preset rule (for example, according to an SRS resource set stipulated in a protocol), or the SRS resource set is a specific SRS resource set in resource sets used for CSI acquisition of a PUSCH, or the SRS resource set is an SRS resource set indicated by the network device.

The network device determines whether at least one SRS resource is used for multiple usages according to the determined result, that is, the first result, to determine the bit width and/or the coding mode of the SRI.

When the network device determines that the SRS resource is used for one usage, that is, no SRS resource is used for multiple usages, the bit width and/or the coding mode of the SRI may be the same as those in the prior art. Illustratively, the SRS resource is used for CSI acquisition of a codebook-based PUSCH, and the bit width of the SRI is determined according to the number of SRS resources included in the SRS resource set whose usage is codebook. Illustratively, the SRS resource is used for CSI acquisition of a nonCodebook-based PUSCH, and the bit width of the SRI is determined according to the number of SRS resources included in the SRS resource set whose usage is nonCodebook.

When the network device determines that at least one SRS resource is used for multiple usages, the network device may determine the bit width and/or the coding mode of the SRI according to the SRS resource(s) in the resource set whose usage includes the CSI acquisition of the PUSCH.

It should be noted that, the network device may determine the bit width of the SRI according to the SRS resource(s) in the resource set whose usage includes the CSI acquisition of the PUSCH, while perform coding by using the same coding mode as that in the prior art. In one embodiment, the network device may determine the bit width of the SRI using the same method as that in the prior art, and determine the coding mode of the SRI according to the SRS resource(s) in the resource set whose usage includes the CSI acquisition of the PUSCH. In one embodiment, the network device may determine the bit width of the SRI and the coding mode of the SRI according to the SRS resource(s) in the resource set whose usage includes the CSI acquisition of the PUSCH. It is not limited in the embodiment.

In one embodiment, the network device determines the bit width of the SRI according to a preset value selection rule. Illustratively, the preset value selection rule can be a value selection rule of the bit width stipulated by a protocol, or the preset value selection rule can also be determined by the network device. The network device can determine the bit width of the SRI according to the preset value selection rule, and then send the determined bit width of the SRI to the terminal.

Corresponding to the network device, for the terminal:

S203, the terminal determines whether there exists at least one SRS resource used for multiple usages.

As already described in S201, when the network device configures an SRS resource set for the terminal, the network device may configure resources in the SRS resource set for a usage, or may configure at least one SRS resource in the SRS resource set for multiple usages. The terminal, in turn, may determine whether there exists an SRS resource for multiple usages according to received information which is sent by the network device when configuring SRS resource(s) for the terminal.

S204, the terminal determines a bit width and/or a coding mode of SRS resource indicator (SRI) according to a second result.

The SRI is used to indicate the SRS resource corresponding to the transmission of the PUSCH, and the second result is that there exists an SRS resource used for multiple usages, or, there exists no SRS resource used for multiple usages.

In an implementation, the SRS resource corresponding to the transmission of the PUSCH is an SRS resource used to determine an antenna port of the PUSCH. For example, an antenna port of the PUSCH uses the same antenna port as the antenna port of the SRS resource. Further, for example, the terminal uses the antenna port of the SRS resource as an antenna port of the PUSCH.

In an implementation, the SRS resource corresponding to the transmission of the PUSCH is an SRS resource used to determine a number of transmission streams and/or a pre-coding matrix of the PUSCH. In an implementation, the terminal determines the number of transmission streams and the pre-coding matrix of the PUSCH according to the SRS resource.

In an implementation, the SRS resource corresponding to the transmission of the PUSCH is an SRS resource used to determine a spatial filter coefficient of the PUSCH. In an implementation, the terminal uses a spatial filter coefficient of the SRS resource as the spatial filter coefficient of the PUSCH.

In an implementation, the SRS resource corresponding to the transmission of the PUSCH is an SRS resource used to determine a physical antenna of the PUSCH. In an implementation, the terminal sends the PUSCH using the physical antenna used when sending the SRS resource.

In an implementation, the SRS resource corresponding to the transmission of the PUSCH is an SRS resource that realizes the above multiple functions at the same time.

In an implementation, the SRS resource corresponding to the transmission of the PUSCH is an SRS resource used to determine scheduling information of the PUSCH. In an implementation, the terminal uses the SRS resource to determine scheduling information of the PUSCH.

The network device determines whether at least one SRS resource is used for multiple usages, the network device determines, according to the determined result, that is, the second result, the bit width and/or the coding mode of the SRI.

Similarly to S202, when the terminal determines that there exists no SRS resource for multiple usages, that is, when the SRS resources are used for one usage, the bit width and/or the coding mode of the SRI may be the same as those in the prior art, which will not be described herein.

When the terminal determines that at least one SRS resource is used for multiple usages, the terminal may determine the bit width and/or the coding mode of the SRI according to the SRS resource(s) in the resource set whose usage includes the CSI acquisition of the PUSCH.

Corresponding to S202, when the network device determines the bit width of the SRI according to the SRS resource(s) in the resource set whose usage includes the CSI acquisition of the PUSCH, and performs coding by using the same coding mode as that in the prior art, the terminal may determine the bit width of the SRI according to the SRS resource(s) in the resource set whose usage includes the CSI acquisition of the PUSCH, and performs decoding by using the same coding mode as that in the prior art. In one embodiment, when the network device determines the bit width of the SRI using the same method as that in the prior art, and determines the coding mode of the SRI according to the SRS resource(s) in the resource set whose usage includes the CSI acquisition of the PUSCH, the terminal may also determine the bit width of the SRI using the same method as that in the prior art, and determine the coding mode of the SRI according to the SRS resource(s) in the resource set whose usage includes the CSI acquisition of the PUSCH, to decode the SRI. In one embodiment, when the network device determines the bit width of the SRI and the coding mode of the SRI according to the SRS resource(s) in the resource set whose usage includes the CSI acquisition of the PUSCH, the terminal may also determine the bit width of the SRI and the coding mode of the SRI according to the SRS resource(s) in the resource set whose usage includes the CSI acquisition of the PUSCH.

In one embodiment, when the network device determines the bit width of the SRI according to a preset value selection rule, if the preset value selection rule is a value selection rule of a bit width stipulated by a protocol, the terminal likewise determines the bit width of the SRI according to the preset value selection rule. In one embodiment, the terminal receives the bit width of the SRI determined by the network device according to the preset value selection rule.

It is understood that when the first result determined by the network device is that at least one SRS resource is used for multiple usages, the second result determined by the terminal is that there exists an SRS resource used for multiple usages. When the first result determined by the network device is that no SRS resource is used for multiple usages, the second result determined by the terminal is that there exists no SRS resource used for multiple usages.

The information transmission method provided in the embodiment provides a method for determining the bit width and/or the coding mode of SRI when the network device indicates that the same SRS resource set has multiple usages at the same time. The reuse of the SRS resource set can be realized, by indicating that the SRS resource set is used for multiple usages at the same time. Since the existing method for determining a bit width and a coding mode of SRI is no longer applicable when there are multiple SRS resource sets in the system that can be used for multiple usages at the same time, the embodiment further provides a method for determining the bit width and the coding method of new SRI according to the usage of the SRS resource set. When transmitting an SRS of the SRS resource set, the terminal will perform the SRS transmission according to requirements of multiple usages, and the network device can use the same SRS resource set to realize the measurement of multiple usages, thus improving resource utilization and reducing resource waste.

When the network device determines that the at least one SRS resource is used for multiple usages, an indication to the terminal is required. The following describes how the network device indicates to the terminal that the at least one SRS resource is used for multiple usages: the network device sends first information to the terminal, where the first information is used to indicate to the terminal that the at least one SRS resource is used for multiple usages; the multiple usages include channel state information (CSI) acquisition of a specific type of physical uplink shared channel (PUSCH).

In a possible implementation, the specific type of PUSCH may be a PUSCH whose transmission mode is codebook-based.

In a possible implementation, the specific type of PUSCH may be a PUSCH whose transmission mode is nonCodebook.

In a possible implementation, the specific type of PUSCH may be a PUSCH whose transmission mode is codebook or nonCodebook.

In a possible implementation, the specific type of PUSCH may be a PUSCH whose transmission mode transmits diversity.

In a possible implementation, the network device sends configuration information for an SRS resource set to the terminal, where the configuration information includes a usage of the SRS resource set, the SRS resource set is an SRS resource set including an SRS resource in the at least one SRS resource. In the implementation, the network device indicates through the first information that the at least one SRS resource is used for the CSI acquisition of a specific type of PUSCH in addition to the usage for which it is configured in the SRS resource set. Upon receiving the first information, the terminal determines, according to the first information, that the at least one SRS resource is used for the CSI acquisition of the specific type of PUSCH in addition to the usage for which it is configured in the SRS resource set.

Illustratively, in the configuration information for the SRS resource set sent by the network device to the terminal, the usage signaling of the SRS resource set is antennaSwitching, and the first information indicates that a resource set whose usage signaling is antennaSwitching is also used for the CSI acquisition of a codebook-based PUSCH.

In an implementation, the at least one SRS resource used for multiple usages indicated by the first information may be an SRS resource in a specific SRS resource set, or a specific SRS resource in an SRS resource set.

Illustratively, the at least one SRS resource is at least one SRS resource with a specific number in the SRS resource set whose usage parameter is not configured for the CSI acquisition, for example, the first s SRS resources with smallest numbers in the SRS resource set whose usage is antennaSwitching.

Illustratively, the at least one SRS resource is an SRS resource in the SRS resource set whose usage parameter is configured for a specific usage. Illustratively, the SRS resource set used for the specific usage may be an SRS resource set whose usage is antennaSwitching, or the SRS resource set used for the specific usage may be an SRS resource set whose usage is beamManagement. For example, the at least one SRS resource is an SRS resource of one SRS resource set among a plurality of SRS resource sets whose usages are antennaSwitching.

Illustratively, the at least one SRS resource is an SRS resource set used for a specific usage determined according to a preset rule, for example, an SRS resource set with a specific number in the SRS resource set whose usage is antennaSwitching.

Illustratively, the at least one SRS resource is an SRS resource in the SRS resource set whose usage parameter in a specific time domain type is configured for a specific usage. Illustratively, the specific time domain type may be periodic, non-periodic or semi-persistent, which is not limited in the present application. For example, the at least one SRS resource is an SRS resource in the SRS resource set whose usage is antennaSwitching, the time domain type of the usage is non-periodic.

Illustratively, the at least one SRS resource is an SRS resource included both in an SRS resource set whose usage parameter is configured for a specific usage, and an SRS resource set whose usage is the CSI acquisition.

It should be noted that, in the implementation, there exists no limitation on the order in which the network device sends the configuration information for the SRS resource set and the first information to the terminal. For example, the network device may send the configuration information for the SRS resource set to the terminal first and then send the first information; or, the network device may send the first information to the terminal first and then send the configuration information for the SRS resource set; or, the network device may simultaneously send the configuration information for the SRS resource set and the first information to the terminal.

In another possible implementation, where the network device sends the first information to the terminal includes: the network device sending configuration information for an SRS resource set to the terminal, where there exists in the configuration information a configuration value indicating that the SRS resource set is used for multiple usages, the SRS resource set is an SRS resource set including an SRS resource in the at least one SRS resource. In the implementation, the first information is the configuration information for the SRS resource set. The configuration value in the configuration information for the SRS resource set may be a configuration value existing in the prior art, or may be a newly defined configuration value. The terminal receives the configuration information sent by the network device and determines the at least one SRS resource used for multiple usages according to the configuration information.

Illustratively, in the configuration information for the SRS resource set, if the configuration value of the usage signaling is codebook/antennaSwitching or antennaSwitching/codebook, it indicates that the at least one SRS resource of the SRS resource set can be used for both downlink CSI acquisition and the CSI acquisition of a codebook-based PUSCH.

Illustratively, in the configuration information for the SRS resource set, if the configuration value of the usage signaling is nonCodebook/antennaSwitching or antennaSwitching/nonCodebook, it indicates that the at least one SRS resource of the SRS resource set can be used for both downlink CSI acquisition and the CSI acquisition of a nonCodebook-based PUSCH.

Illustratively, in the configuration information for the SRS resource set, if the configuration value of the usage signaling is ulCsi/antennaSwitching or antennaSwitching/ulCsi, it indicates that that the at least one SRS resource of the SRS resource set can be used for both uplink CSI acquisition and downlink CSI acquisition, where the ulCsi is a newly defined configuration value indicating a usage of uplink CSI acquisition.

In the following, in a scenario where the at least one SRS resource is used for multiple usages, the methods for the network device and the terminal to determine the bit width and/or the coding mode of the SRI will be described respectively.

Manner 1

The bit width and/or the coding mode of the SRI is determined according to at least one of the number of SRS resources in a first SRS resource set and the number of SRS resources in a second SRS resource set.

The first SRS resource set is an SRS resource set including an SRS resource in the at least one SRS resource used for multiple usages, and the first SRS resource set may refer to one or more SRS resource sets. Illustratively, the usage signaling in the configuration information for the first SRS resource set is antennaSwitching, and the network device sends the first information indicating that the resource set whose usage signaling is antennaSwitching is also used for CSI acquisition of a codebook-based PUSCH.

The second SRS resource set is an SRS resource set whose usage parameter is only indicated for the CSI acquisition, and the second resource set may refer to one or more SRS resource sets. Illustratively, the usage signaling in the configuration information for the second SRS resource set may be codebook or nonCodebook.

In a first possible implementation of Manner 1, the bit width of the SRI is a function of the number of SRS resources included in the first SRS resource set and/or the number of SRS resources included in the second SRS resource set, or the bit width of the SRI is calculated according to the number of SRS resources included in the first SRS resource set and/or the number of SRS resources included in the second SRS resource set. Description will be provided in conjunction with specific embodiments.

Embodiment 1

The network device sends first information to the terminal, where the first information indicates that an SRS resource set whose usage is antennaSwitching is used for CSI acquisition of a codebook-based PUSCH.

The network device sends configuration information for the SRS resource set to the terminal, where the configuration information indicates that the network device configures one or more SRS resource sets whose usages are antennaSwitching and one or more SRS resource sets whose usages are codebook for the terminal. The one or more SRS resource sets whose usages are antennaSwitching are the first resource set, and the one or more SRS resource sets whose usages are codebook are the second resource set.

The network device determines scheduling information of the PUSCH according to the SRS transmission of the SRS resource set whose usage is codebook. The scheduling information includes SRI, and a bit width of the SRI is determined according to the number of SRS resources included in the second resource set, that is, the SRS resource set whose usage is codebook.

For example, the bit width of the SRI may be calculated by using the following formula: $\lceil \log_2 N_2 \rceil$;

in one embodiment, the bit width of the SRI may be calculated by using the following equation:

$$\left\lceil \log_2 \left( \sum_{k=1}^{\min(L_{max}, N_2)} C_{N_2}^k \right) \right\rceil;$$

where $N_2$ is the number of SRS resources in the second SRS resource set, and in the embodiment, $N_2$ is the number of SRS resources in the SRS resource set whose usage is codeBook; $L_{max}$ is a maximum number of layers configured for the terminal to allow transmission of the specific type of PUSCH or a maximum number of layers supported by the terminal for transmission of the specific type of PUSCH; $\lceil\ \rceil$ represents rounding up; and $C_{N_2}^k$ represents the number of combinations for selecting k elements from $N_2$ elements.

In the embodiment, after determining the bit width of the SRI, the network device may code the SRI by using the following coding mode:

| Coded bit value of the SRI | SRI resource |
| --- | --- |
| 0 | 0 |
| ... | ... |
| $N_2$-1 | $N_2$-1 |

The coded bit value i of the SRI represents an i-th SRS resource in the second SRS resource set, where i=0, 1, ..., $N_2$-1.

In one embodiment,

| Coded bit value of the SRI | SRI resource |
| --- | --- |
| 0 | 1 |
| ... | ... |
| $N_2$-1 | $N_2$ |

The coded bit value i of the SRI represents an (i+1)-th SRS resource in the second SRS resource set, where i=0, 1, ..., $N_2$-1.

In an implementation, the coding mode of the SRI includes a reserved state, and any state other than the reserved state is used to indicate an SRS resource in the second SRS resource set. In one embodiment, any state in the coding mode of the SRI is used to indicate an SRS resource in the second SRS resource set.

Embodiment 2

The network device sends first information to the terminal, where the first information indicates that an SRS resource set whose usage is antennaSwitching is used for CSI acquisition of a codebook-based PUSCH.

The network device sends configuration information for the SRS resource set to the terminal, where the configuration information indicates that the network device configures one or more SRS resource sets whose usages are antennaSwitching and one or more SRS resource sets whose usages are codebook for the terminal. The one or more SRS resource sets whose usages are antennaSwitching are the first resource set, and the one or more SRS resource sets whose usages are codebook are the second resource set.

The network device determines scheduling information of the PUSCH according to the SRS transmission of the SRS resource set whose usage is antennaSwitching. The scheduling information includes SRI, and a bit width of the SRI is determined according to the number of SRS resources included in the first resource set, that is, the SRS resource set whose usage is antennaSwitching.

For example, the bit width of the SRI may be calculated by using the following formula: $\lceil \log_2 N_1 \rceil$;

in one embodiment, the bit width of the SRI may be calculated by using the following equation:

$$\left\lceil \log_2\left(\sum_{k=1}^{\min(L_{max},N_1)} C_{N_1}^k\right)\right\rceil;$$

where $N_1$ is the number of SRS resources in the first SRS resource set, and in the embodiment, $N_1$ is the number of SRS resources in the SRS resource set whose usage is antennaSwitching; $L_{max}$ is a maximum number of layers configured for the terminal to allow transmission of the specific type of PUSCH or a maximum number of layers supported by the terminal for transmission of the specific type of PUSCH; $\lceil\ \rceil$ represents rounding up; and $C_{N_1}^k$ represents the number of combinations for selecting k elements from $N_1$ elements.

In the embodiment, after determining the bit width of the SRI, the network device may code the SRI by using the following coding mode:

| Coded bit value of the SRI | SRI resource |
|---|---|
| 0 | 0 |
| ... | ... |
| $N_1$-1 | $N_1$-1 |

The coded bit value i of the SRI represents an i-th SRS resource in the first SRS resource set, where i=0, 1, . . . , $N_1$-1.

In one embodiment,

| Coded bit value of the SRI | SRI resource |
|---|---|
| 0 | 1 |
| ... | ... |
| $N_1$-1 | $N_1$ |

The coded bit value i of the SRI represents an (i+1)-th SRS resource in the first SRS resource set, where i=0, 1, . . . , $N_1$-1.

In addition, according to different situations of the SRS resource set whose usage is antennaSwitching:

if the network device configures one or two SRS resource sets whose usage is antennaSwitching for the terminal, and each SRS resource set includes 2 SRS resources with 1 antenna port for each SRS resource, the coded bit value i of the SRI represents an (i+1)-th SRS resource in a latest transmitted SRS resource set, whose usage is antennaSwitching, before a physical downlink control channel (PDCCH) carrying downlink control information (DCI) of the PUSCH;

if the network device configures one or two SRS resource sets whose usage is antennaSwitching for the terminal, and each SRS resource set includes 2 SRS resources with 1 antenna port for each SRS resource, the coded bit value i of the SRI represents an (i+1)-th SRS resource in a latest transmitted non-periodic SRS resource set, whose usage is antennaSwitching, before a PDCCH carrying DCI of the PUSCH.

if the network device configures one or two SRS resource sets whose usage is antennaSwitching for the terminal, and each SRS resource set includes 1 or 2 SRS resources with 2 antenna ports for each SRS resource, the coded bit value i of the SRI represents the (i+1)-th SRS resource in the latest transmitted SRS resource set, whose usage is antennaSwitching, before a PDCCH carrying DCI of the PUSCH.

if the network device configures one or two SRS resource sets whose usage is antennaSwitching for the terminal, and each SRS resource set includes 1 or 2 SRS resources with 2 antenna ports for each SRS resource, the coded bit value i of the SRI represents the (i+1)-th SRS resource in the non-periodic SRS resource set whose usage is antennaSwitching, before a PDCCH carrying DCI of the PUSCH.

if the network device configures one or two SRS resource sets whose usage is antennaSwitching for the terminal, each SRS resource set includes 1 SRS resource, and each SRS resource includes 1, 2 or 4 antenna ports, SRI=i represents an SRS resource in an (i+1)-th SRS resource set in the non-periodic SRS resource set whose usage is antennaSwitching.

It should be noted that the latest transmitted SRS resource set, whose usage is antennaSwitching, in the embodiment refers to: an SRS resource set, whose usage is antennaSwitching, sent in a latest transmission period or last triggered. For example, for an SRS resource set whose time domain type is periodic, the latest transmitted SRS resource set whose usage is antennaSwitching is the SRS resource set whose usage is antennaSwitching transmitted in a latest transmission period; for an SRS resource set whose time domain type is non-periodic, the latest transmitted SRS resource set whose usage is antennaSwitching is a latest triggered SRS resource set whose usage is antennaSwitching; for an SRS resource set whose time domain type is semi-persistent, the latest transmitted SRS resource set whose usage is antennaSwitching is the SRS resource set whose usage is antennaSwitching sent in a latest transmission period when last triggered.

In an implementation, the coding mode of the SRI includes a reserved state, and any state other than the reserved state is used to indicate an SRS resource in the first SRS resource set. In one embodiment, any state in the coding mode of the SRI is used to indicate an SRS resource in the first SRS resource set.

Embodiment 3

The network device sends first information to the terminal, where the first information indicates that the SRS resource set whose usage is antennaSwitching is used for CSI acquisition of a codebook-based PUSCH.

The network device sends configuration information for the SRS resource set to the terminal, where the configuration information indicates that the network device configures one or more SRS resource sets whose usages are antennaSwitching and one or more SRS resource sets whose usages are codebook for the terminal. The one or more SRS resource sets whose usages are antennaSwitching are the first resource set, and the one or more SRS resource sets whose usages are codebook are the second resource set.

The network device determines scheduling information of the PUSCH according to SRS transmission of the SRS resource set whose usage is antennaSwitching or the SRS resource set whose usage is codebook. The scheduling information includes SRI, and the bit width of the SRI is determined according to the number of SRS resources included in the SRS resource set whose usage is antennaSwitching, and the number of SRS resources included in the SRS resource set whose usage is codebook.

Illustratively, the bit width of the SRI may be calculated by using the following formula:

$$\max(\lceil \log_2(N_1) \rceil, \lceil \log_2(N_2) \rceil);$$

When the formula is used, first calculate a logarithm of data of the SRS resources in the first resource set and the second resource set, and determine a maximum value after rounding up.

In one embodiment, the bit width of the SRI may be calculated by using the following equation:

$$\lceil \max(\log_2(N_1), \log_2(N_2)) \rceil;$$

When the formula is used, first calculate a logarithm of data of the SRS resources in the first resource set and the second resource set, and round up after determining a maximum value.

Among them, $N_1$ is the number of SRS resources in the first SRS resource set; $N_2$ is the number of SRS resources in the second SRS resource set; max(k, l) represents a maximum value of k and l; $\lceil \ \rceil$ represents rounding up.

In the embodiment, after determining the bit width of the SRI, the network device may code the SRI by using the following coding mode:

| Coded bit value of the SRI | SRI resource |
|---|---|
| 0 | 0 |
| ... | ... |
| N-1 | N-1 |

The coded bit value i of the SRI represents an i-th SRS resource in the fourth SRS resource set, where i=0, 1, ..., N.

In one embodiment,

| Coded bit value of the SRI | SRI resource |
|---|---|
| 0 | 1 |
| ... | ... |
| N-1 | N |

The coded bit value i of the SRI represents an (i+1)-th SRS resource in the fourth SRS resource set, where i=0, 1, ..., N-1.

N is the number of resources in the fourth SRS resource set. The fourth SRS resource set is an SRS resource set corresponding to the transmission of the PUSCH.

In an implementation, the SRS resource set corresponding to the transmission of the PUSCH may be determined according to a preset rule (for example, according to an SRS resource set stipulated in a protocol), or the SRS resource set is a specific SRS resource set in resource sets used for CSI acquisition of a PUSCH, or the SRS resource set is an SRS resource set indicated by the network device.

In an implementation, the SRS resource set corresponding to the transmission of the PUSCH refers to that the antenna port of the PUSCH is the same as the antenna port of at least one SRS resource in the SRS resource set.

In an implementation, the coding mode of the SRI includes a reserved state, and any state other than the reserved state is used to indicate an SRS resource included in both of the first SRS resource set and the second SRS resource set.

In one embodiment, any state in the coding mode of the SRI is used to indicate an SRS resource included in both of the first SRS resource set and the second SRS resource set.

In one embodiment, the coding mode of the SRI includes a reserved state, and any state other than the reserved state is used to indicate an SRS resource included in the first SRS resource set or in the second SRS resource set.

In one embodiment, any state of the coding mode of the SRI is used to indicate an SRS resource included in the first SRS resource set or in the second SRS resource set.

In a second possible implementation of Manner 1, the bit width of the SRI is a function of the number of SRS resources included in a resource set of the first SRS resource set and/or the number of SRS resources included in a resource set of the second SRS resource set, or, the bit width of the SRI is calculated according to the number of SRS resources included in a resource set of the first SRS resource set and/or the number of SRS resources included in a resource set of the second SRS resource set. Description will be provided in conjunction with specific embodiments.

Embodiment 4

The network device sends first information to the terminal, where the first information indicates that the SRS resource set whose usage is antennaSwitching is used for CSI acquisition of a codebook-based PUSCH.

The network device sends configuration information for the SRS resource set to the terminal, where the configuration information indicates that the network device configures one or more SRS resource sets whose usages are antennaSwitching and one or more SRS resource sets whose usages are codebook for the terminal. The one or more SRS resource sets whose usages are antennaSwitching are the first resource set, and the one or more SRS resource sets whose usages are codebook are the second resource set.

The network device determines scheduling information of the PUSCH according to SRS transmission of the SRS resource set whose usage is antennaSwitching or the SRS resource set whose usage is codebook. The scheduling information includes SRI, and a bit width of the SRI is determined according to the number of SRS resources included in one SRS resource set of the second SRS resource set, that is, an SRS resource set whose usage is codebook.

Illustratively, the bit width of the SRI may be calculated by using the following formula: $\lceil \log_2 N_4 \rceil$;

where $N_4$ is the number of SRS resources included in one of the SRS resource sets when a plurality of SRS resource sets are included in the second SRS resource set; max(k, l) represents a maximum value of k and l; $\lceil \ \rceil$ represents rounding up.

In the embodiment, after determining the bit width of the SRI, the network device may code the SRI by using the following coding mode:

| Coded bit value of the SRI | SRI resource |
|---|---|
| 0 | 0 |
| ... | ... |
| $N_4$-1 | $N_4$-1 |

The coded bit value i of the SRI represents an i-th SRS resource in a resource set of the second SRS resource set, where i=0, 1, ..., $N_4$-1.

In one embodiment,

| Coded bit value of the SRI | SRI resource |
|---|---|
| 0 | 1 |
| ... | ... |
| $N_4$-1 | $N_4$ |

The coded bit value i of the SRI represents an (i+1)-th SRS resource in a resource set of the second SRS resource set, where i=0, 1, . . . , $N_4$-1.

In an implementation, the coding mode of the SRI includes a reserved state, and any state other than the reserved state is used to indicate an SRS resource in a resource set of the second SRS resource set.

In one embodiment, any state in the coding mode of the SRI is used to indicate an SRS resource in a resource set of the second SRS resource set.

Embodiment 5

The network device sends first information to the terminal, where the first information indicates that the SRS resource set whose usage is antennaSwitching is used for CSI acquisition of a codebook-based PUSCH.

The network device sends configuration information for the SRS resource set to the terminal, where the configuration information indicates that the network device configures one or more SRS resource sets whose usages are antennaSwitching and one or more SRS resource sets whose usages are codebook for the terminal. The one or more SRS resource sets whose usages are antennaSwitching are the first resource set, and the one or more SRS resource sets whose usages are codebook are the second resource set.

The network device determines scheduling information of the PUSCH according to SRS transmission of the SRS resource set whose usage is antennaSwitching or the SRS resource set whose usage is codebook. The scheduling information includes SRI, and a bit width of the SRI is determined according to the number of SRS resources included in one SRS resource set of the first SRS resource set, that is, an SRS resource set whose usage is antennaSwitching.

Illustratively, the bit width of the SRI may be calculated by using the following formula: $\lceil \log_2 N_3 \rceil$;

where $N_3$ is the number of SRS resources included in one of the SRS resource sets when a plurality of SRS resource sets are included in the first SRS resource set; max(k, l) represents a maximum value of k and l; $\lceil \ \rceil$ represents rounding up.

In the embodiment, after determining the bit width of the SRI, the network device may code the SRI by using the following coding mode:

| Coded bit value of the SRI | SRI resource |
|---|---|
| 0 | 0 |
| ... | ... |
| $N_3$-1 | $N_3$-1 |

The coded bit value i of the SRI represents an i-th SRS resource in the first SRS resource set, where i=0, 1, . . . , $N_3$-1.

In one embodiment,

| Coded bit value of the SRI | SRI resource |
|---|---|
| 0 | 1 |
| ... | ... |
| $N_3$-1 | $N_3$ |

The coded bit value i of the SRI represents an (i+1)-th SRS resource in a resource set of the first SRS resource set, where i=0, 1, . . . , $N_3$-1.

In an implementation, the coding mode of the SRI includes a reserved state, and any state other than the reserved state is used to indicate an SRS resource in a resource set of the first SRS resource set.

In one embodiment, any state in the coding mode of the SRI is used to indicate an SRS resource in a resource set of the first SRS resource set.

Embodiment 6

The network device sends first information to the terminal, where the first information indicates that the SRS resource set whose usage is antennaSwitching is used for CSI acquisition of a codebook-based PUSCH.

The network device sends configuration information for the SRS resource set to the terminal, where the configuration information indicates that the network device configures one or more SRS resource sets whose usages are antennaSwitching and one or more SRS resource sets whose usages are codebook for the terminal. The one or more SRS resource sets whose usages are antennaSwitching are the first resource set, and the one or more SRS resource sets whose usages are codebook are the second resource set.

The network device determines scheduling information of the PUSCH according to SRS transmission of the SRS resource set whose usage is antennaSwitching or the SRS resource set whose usage is codebook. The scheduling information includes SRI, and a bit width of the SRI is determined according to the number of SRS resources included in one SRS resource set of the first SRS resource set (that is, an SRS resource set whose usage is antennaSwitching) and the number of SRS resources included in one SRS resource set of the second SRS resource set (that is, an SRS resource set whose usage is codebook).

Illustratively, the bit width of the SRI may be calculated by using the following formula:

$\max(\lceil \log_2(N_3) \rceil, \lceil \log_2(N_4) \rceil)$.

In one embodiment, the bit width of the SRI may be calculated by using the following equation:

$\lceil \max(\log_2(N_3), \log_2(N_4)) \rceil$.

Among them, $N_3$ is the number of SRS resources included in one of the SRS resource sets when a plurality of SRS resource sets are included in the first SRS resource set; $N_4$ is the number of SRS resources included in one of the SRS resource sets when a plurality of SRS resource sets are included in the second SRS resource set; max(k,l) represents a maximum value of k and l; $\lceil \ \rceil$ represents rounding up.

In the embodiment, after determining the bit width of the SRI, the network device may code the SRI by using the following coding mode:

| Coded bit value of the SRI | SRI resource |
|---|---|
| 0 | 0 |
| ... | ... |
| N'-1 | N'-1 |

The coded bit value i of the SRI represents an i-th SRS resource in the fourth SRS resource set, where i=0, 1, ..., N'-1.

In one embodiment,

| Coded bit value of the SRI | SRI resource |
|---|---|
| 0 | 1 |
| ... | ... |
| $N_3$-1 | $N_3$ |

The coded bit value i of the SRI represents an (i+1)-th SRS resource in one resource set of the fourth SRS resource set, where i=0, 1, ..., N'-1.

The fourth SRS resource set is a resource set of the first SRS resource set and/or a resource set of the second SRS resource set, and N' is the number of SRS resources in the fourth SRS resource set.

In an implementation, the coding mode of the SRI includes a reserved state, and any state other than the reserved state is used to indicate an SRS resource in a resource set of the first SRS resource set, and/or an SRS resource in a resource set of the second SRS resource set.

In one embodiment, any state of the coding mode of the SRI is used to indicate an SRS resource in a resource set of the first SRS resource set, and/or an SRS resource in a resource set of the second SRS resource set.

In a third possible implementation of Manner 1, the bit width of the SRI is a function of the number of SRS resources included in each resource set of the first SRS resource set and/or the number of SRS resources included in each resource set of the second SRS resource set, or, the bit width of the SRI is calculated according to the number of SRS resources included in each resource set of the first SRS resource set and/or the number of SRS resources included in each resource set of the second SRS resource set. Description will be provided in conjunction with specific embodiments.

Embodiment 7

The network device sends first information to the terminal, where the first information indicates that the SRS resource set whose usage is antennaSwitching is used for CSI acquisition of a codebook-based PUSCH.

The network device sends configuration information for the SRS resource set to the terminal, where the configuration information indicates that the network device configures one or more SRS resource sets whose usages are antennaSwitching and one or more SRS resource sets whose usages are codebook for the terminal. The one or more SRS resource sets whose usages are antennaSwitching are the first resource set, and the one or more SRS resource sets whose usages are codebook are the second resource set.

The network device determines scheduling information of the PUSCH according to SRS transmission of the SRS resource set whose usage is codebook. The scheduling information includes SRI, and a bit width of the SRI is determined according to a function of the number of SRS resources included in each SRS resource set of the first SRS resource set and/or the number of SRS resources included in each SRS resource set of the second SRS resource set.

Illustratively, the bit width of the SRI may be calculated by using the following formula:

$$\max(\lceil \log_2(N_{1,1}) \rceil, \ldots, \lceil \log_2(N_{1,m} \text{ n}) \rceil, \log_2(N_2) \rceil).$$

In one embodiment, the bit width of the SRI may be calculated by using the following equation:

$$\lceil \max(\log_2(N_{1,1}), \ldots, \log_2(N_{1,m}), \log_2(N_2)) \rceil.$$

In one embodiment, the bit width of the SRI may be calculated by using the following equation:

$$\max(\lceil \log_2(N_1) \rceil, \lceil \log_2(N_{2,1}) \rceil, \ldots, \lceil \log_2(N_{2,n}) \rceil)$$

In one embodiment, the bit width of the SRI may be calculated by using the following equation:

$$\lceil \max(\log_2(N_1), \log_2(N_{2,1}), \ldots, \log_2(N_{2,n})) \rceil.$$

In one embodiment, the bit width of the SRI may be calculated by using the following equation:

$$\max(\lceil \log_2(N_{1,1}) \rceil, \ldots, \lceil \log_2(N_{1,m}) \rceil, \lceil \log_2(N_{2,1}) \rceil, \ldots, \lceil \log_2(N_{2,n}) \rceil).$$

In one embodiment, the bit width of the SRI may be calculated by using the following equation:

$$\lceil \max(\log_2(N_{1,1}), \ldots, \log_2(N_{1,m}), \log_2(N_{2,1}), \ldots, \log_2(N_{2,n})) \rceil.$$

Among them, max(k,l) represents a maximum value of k and l; ⌈ ⌉ represents rounding up; $N_1$ is the number of SRS resources in the first SRS resource set; $N_2$ is the number of SRS resources in the second SRS resource set; m is the number of SRS resource sets included in the first SRS resource set, $N_{1,m}$ is the number of SRS resources included in an m-th SRS resource set of the first SRS resource set, and m is greater than 1; n is the number of SRS resource sets included in the second SRS resource set, $N_{2,n}$ is the number of SRS resources included in an n-th SRS resource set of the second SRS resource set, and n is greater than 1.

In the embodiment, after determining the bit width of the SRI, the network device may code the SRI by using the following coding mode:

| Coded bit value of the SRI | SRI resource |
|---|---|
| 0 | 0 |
| ... | ... |
| N'-1 | N'-1 |

The coded bit value i of the SRI represents an i-th SRS resource in the fourth SRS resource set, where i=0, 1, ..., N'-1.

In one embodiment,

| Coded bit value of the SRI | SRI resource |
|---|---|
| 0 | 1 |
| ... | ... |
| N'-1 | N' |

The coded bit value i of the SRI represents an (i+1)-th SRS resource in one resource set of the fourth SRS resource set, where i=0, 1, ..., N'-1.

The fourth SRS resource set is a resource set of the first SRS resource set and/or a resource set of the second SRS resource set, and N' is the number of SRS resources in the fourth SRS resource set.

In an implementation, the coding mode of the SRI includes a reserved state, and any state other than the reserved state is used to indicate an SRS resource in a resource set of the first SRS resource set, and/or an SRS resource in a resource set of the second SRS resource set.

In one embodiment, any state in the coding mode of the SRI is used to indicate an SRS resource in a resource set of the first SRS resource set, and/or an SRS resource in a resource set of the second SRS resource set.

In a fourth possible implementation of Manner 1, the bit width of the SRI is a function of a maximum value of the number of SRS resources included in the first SRS resource set and the number of SRS resources included in the second SRS resource set, or the bit width of the SRI is calculated according to a maximum value of the number of SRS resources included in the first SRS resource set and the number of SRS resources included in the second SRS resource set.

In a fifth possible implementation of Manner 1, the bit width of the SRI is a function of a maximum value of the number of SRS resources included in a resource set of the first SRS resource set and the number of SRS resources included in a resource set of the second SRS resource set, or the bit width of the SRI is calculated according to a maximum value of the number of SRS resources included in a resource set of the first SRS resource set and the number of SRS resources included in a resource set of the second SRS resource set.

In a sixth possible implementation of Manner 1, the bit width of the SRI is a function of a maximum value of the number of SRS resources included in each resource set of the first SRS resource set and/or the number of SRS resources included in each resource set of the second SRS resource set, or, the bit width of the SRI is calculated according to a maximum value of the number of SRS resources included in each resource set of the first SRS resource set and/or the number of SRS resources included in each resource set of the second SRS resource set.

These three possible implementations will be described in conjunction with specific embodiments.

Embodiment 8

The network device sends first information to the terminal, where the first information indicates that the SRS resource set whose usage is antennaSwitching is used for CSI acquisition of a codebook-based PUSCH.

The network device sends configuration information for the SRS resource set to the terminal, where the configuration information indicates that the network device configures one or more SRS resource sets whose usages are antennaSwitching and one or more SRS resource sets whose usages are codebook for the terminal. The one or more SRS resource sets whose usages are antennaSwitching are the first resource set, and the one or more SRS resource sets whose usages are codebook are the second resource set.

The network device determines scheduling information of the PUSCH according to SRS transmission of the SRS resource set whose usage is antennaSwitching or the SRS resource set whose usage is codebook. The scheduling information includes SRI, and a bit width of the SRI is determined by using the fourth, the fifth, or the sixth possible implementation of Manner 1 above.

Illustratively,
the bit width of the SRI may be calculated by using the following formula: the bit width is $\lceil \log_2(N_{SRS}) \rceil$.

In one embodiment, the bit width of the SRI may be calculated by using the following formula:

$$\left\lceil \log_2\left(\sum_{k=1}^{\min(L_{max}, N_{SRS})} C_{N_{SRS}}^k \right) \right\rceil.$$

Among them, in the fourth possible implementation $N_{SRS} = \max(N_1, N_2)$;
in the fifth possible implementation $N_{SRS} = \max(N_3, N_4)$;
in the sixth possible implementation $N_{SRS} = \max(N_{1,1}, \ldots, N_{1,m}, N_2)$;
or, $N_{SRS} = \max(N_1, N_{2,1}, \ldots, N_{2,n})$;
or, $N_{SRS} = \max(N_{1,1}, \ldots, N_{1,m}, N_{2,1}, \ldots, N_{2,n})$;
where $\lceil \ \rceil$ represents rounding up; $C_{N_{SRS}}^k$ represents the number of combinations for selecting k elements from $N_{SRS}$ elements; $N_1$ is the number of SRS resources in the first SRS resource set; $N_1$ is the number of SRS resources in the second SRS resource set; $N_3$ is the number of SRS resources included in one of the SRS resource sets when a plurality of SRS resource sets are included in the first SRS resource set; $N_4$ is the number of SRS resources included in one of the SRS resource sets when a plurality of SRS resource sets are included in the second SRS resource set; $L_{max}$ is a maximum number of layers configured for the terminal to allow transmission of the specific type of PUSCH or a maximum number of layers supported by the terminal for transmission of the specific type of PUSCH; m is the number of SRS resource sets included in the first SRS resource set, $N_{1,m}$ is the number of SRS resources included in an m-th SRS resource set of the first SRS resource set, and m is greater than 1; n is the number of SRS resource sets included in the second SRS resource set, $N_2$, is the number of SRS resources included in an n-th SRS resource set of the second SRS resource set, and n is greater than 1.

In the embodiment, after determining the bit width of the SRI, the network device may code the SRI by using the following coding mode:

| Coded bit value of the SRI | SRI resource |
|---|---|
| 0 | 0 |
| ... | ... |
| $N_{SRS}$-1 | $N_{SRS}$-1 |

The coded bit value i of the SRI represents an i-th SRS resource in the fourth SRS resource set, where i=0, 1, ..., $N_{SRS}$-1.

In one embodiment,

| Coded bit value of the SRI | SRI resource |
|---|---|
| 0 | 1 |
| ... | ... |
| $N_{SRS}$-1 | $N_{SRS}$ |

The coded bit value i of the SRI represents an (i+1)-th SRS resource in the fourth SRS resource set, where i=0, 1, ..., $N_{SRS}$-1.

The fourth resource set is an SRS resource set or all SRS resources of the first SRS resource set or the second SRS resource set.

Manner 2

Determine a bit width and/or a coding mode of the SRI according to a third SRS resource set, where the third SRS resource set is an SRS resource set transmitted in a latest transmission period or last triggered in the SRS resource set(s) used for the CSI acquisition of the PUSCH, before a physical downlink control channel (PDCCH) carrying downlink control information (DCI) of the PUSCH.

Illustratively, for an SRS resource set whose time domain type is periodic, the third SRS resource set is an SRS resource set sent in a last transmission period in the SRS resource set(s) used for the CSI acquisition of the PUSCH; for an SRS resource set whose time domain type is non-periodic, the third SRS resource set is a latest triggered SRS resource set in the SRS resource set(s) used for the CSI acquisition of the PUSCH; for an SRS resource set whose time domain type is semi-persistent, the third SRS resource set is an SRS resource set sent in a last transmission period in the SRS resource set(s) used for the CSI acquisition of the PUSCH when last triggered. The third SRS resource set may refer to one or more SRS resource sets. Description will be provided in conjunction with specific embodiments.

Embodiment 9

The network device sends first information to the terminal, where the first information indicates that the SRS resource set whose usage is antennaSwitching is used for CSI acquisition of a codebook-based PUSCH.

The network device sends configuration information for the SRS resource set to the terminal, where the configuration information indicates that the network device configures one or more SRS resource sets whose usages are antennaSwitching for the terminal.

The network device determines scheduling information of the PUSCH according to the third SRS resource set. The scheduling information includes SRI, and a bit width of the SRI is determined according to the number of SRS resources in the third SRS resource set.

Illustratively, the third SRS resource set refers to a plurality of latest triggered SRS resource sets in the SRS resource sets used for the CSI acquisition of the PUSCH. For example, the third SRS resource set refers to a plurality of non-periodic SRS resource sets whose usages are antennaSwitching. For example, if the network device configures two non-periodic SRS resource sets whose usages are antennaSwitching for the terminal, each SRS resource set includes 2 SRS resources, the bit width of the SRI is calculated by using the following formula: $\lceil \log_2 N_5 \rceil = 2$, where $N_5$ is the number of SRS resources in the third SRS resource set, $N_5$ is 4. For another example, if the network device configures one non-periodic SRS resource set whose usage is antennaSwitching for the terminal, the SRS resource set includes 2 SRS resources, the bit width of the SRI is calculated by using the following formula: $\lceil \log_2 N_5 \rceil = 1$, where $N_5$ is 2.

Illustratively, the third SRS resource set is a latest triggered SRS resource in the SRS resource set(s) used for the CSI acquisition of the PUSCH. For example, the third SRS resource set is a non-periodic SRS resource whose usage is antennaSwitching. For example, if the network device configures an SRS resource set whose usage is antennaSwitching for the terminal, and SRS resource set includes 2 SRS resources, then the bit width of the SRI is calculated by using the following formula: $\lceil \log_2 N_5 \rceil = 2$, where $N_5$ is 2. For another example, if the network device configures an SRS resource set whose usage is antennaSwitching for the terminal, the SRS resource set includes 3 SRS resources, the bit width of the SRI is calculated by using the following formula: $\lceil \log_2 N_5 \rceil = 2$, where $N_5$ is 3.

After determining the bit width of the SRI, the network device may code the SRI by using the following coding mode:

| Coded bit value of the SRI | SRI resource |
|---|---|
| 0 | 0 |
| ... | ... |
| $N_5-1$ | $N_5-1$ |

The coded bit value i of the SRI represents an i-th SRS resource in the third SRS resource set, where $i = 0, 1, \ldots, N_5-1$.

In one embodiment,

| Coded bit value of the SRI | SRI resource |
|---|---|
| 0 | 1 |
| ... | ... |
| $N_5-1$ | $N_5$ |

The coded bit value i of the SRI represents an (i+1)-th SRS resource in the third SRS resource set, where $i = 0, 1, \ldots, N_5-1$.

In an implementation, the coding mode of the SRI includes a reserved state, and any state other than the reserved state is used to indicate an SRS resource in the third SRS resource set; or, any state in the coding mode of the SRI is used to indicate an SRS resource in the third SRS resource set.

Embodiment 10

The network device sends first information to the terminal, where the first information indicates that the SRS resource set whose usage is antennaSwitching is used for CSI acquisition of a codebook-based PUSCH.

The network device sends configuration information for the SRS resource set to the terminal, where the configuration information indicates that the network device configures one or more SRS resource sets whose usages are codebook and one or more SRS resource sets whose usages are antennaSwitching for the terminal.

The network device determines scheduling information of the PUSCH according to the third SRS resource set. The scheduling information includes SRI, and the bit width of the SRI is determined according to types of SRS resources in the third SRS resource set.

In an implementation, when the third SRS resource set is an SRS resource set of the first SRS resource set, the bit width of the SRI is determined according to the number of SRS resources included in both of the third SRS resource set and the second SRS resource set. It should be noted that, if the network device does not configure any second SRS resource set for the terminal, when the third SRS resource set is an SRS resource set of the first SRS resource set, the bit width of the SRI is determined according to the number of SRS resources included in the third SRS resource set.

In an implementation, when the third SRS resource set is an SRS resource set of the second SRS resource set, the bit width of the SRI is determined according to the number of SRS resources included in the third SRS resource set.

The definitions of the first SRS resource set and the second SRS resource set are the same as those in the preceding embodiments and will not be repeated herein.

Illustratively, the third SRS resource set is an SRS resource set whose usage is antennaSwitching, and there are L SRS resources in the SRS resource set that are the same as the SRS resources in the SRS resource set whose usage is codebook, and the bit width of the SRI may be calculated by using the following formula: $\lceil \log_2(L) \rceil$. In an implementation, the network device codes the SRI by using the following coding mode:

| Coded bit value of the SRI | SRI resource |
|---|---|
| 0 | 0 |
| ... | ... |
| L-1 | L-1 |

Where the coded bit value i of the SRI indicates an i-th SRS resource in the SRS resources, which are the same as those in the SRS resource set whose usage is codebook, in the SRS resource set whose usage is antennaSwitching, i=0, 1, ..., L-1.

In one embodiment,

| Coded bit value of the SRI | SRI resource |
|---|---|
| 0 | 1 |
| ... | ... |
| L-1 | L |

Where the coded bit value i of the SRI indicates an (i+1)-th SRS resource in the SRS resources, which are the same as those in the SRS resource set whose usage is codebook, in the SRS resource set whose usage is antennaSwitching, i=0, 1, ..., L-1.

The coding mode of the SRI includes a reserved state, and any state other than the reserved state is used to indicate an SRS resource in the third SRS resource set; or, any state in the coding mode of the SRI is used to indicate an SRS resource in the third SRS resource set.

Illustratively, the third SRS resource set is an SRS resource set whose usage is codebook, and the SRS resource set includes $N_S$ SRS resources, and the bit width of the SRI may be calculated by using the following formula: $\lceil \log_2(N_S) \rceil$. In an implementation, the network device may code the SRI by using the following coding mode:

| Coded bit value of the SRI | SRI resource |
|---|---|
| 0 | 0 |
| ... | ... |
| $N_S$-1 | $N_S$-1 |

Where SRI=i indicates an (i+1)-th SRS resource in the SRS resource set whose usage is codebook, and i=0, 1, ..., $N_S$-1.

In one embodiment,

| Coded bit value of the SRI | SRI resource |
|---|---|
| 0 | 1 |
| ... | ... |
| $N_S$-1 | $N_S$ |

Where the coded bit value i of the SRI represents an (i+1)-th SRS resource in the SRS resource set whose usage is codebook, and i=0, 1, ..., $N_S$-1.

In an implementation, the coding mode of the SRI includes a reserved state, and any state other than the reserved state is used to indicate an SRS resource in the third SRS resource set; or, any state in the coding mode of the SRI is used to indicate an SRS resource in the third SRS resource set.

In the foregoing Embodiment 1 to Embodiment 10, the network device codes the SRI based on the bit width of the SRI, and then sends the DCI for scheduling the PUSCH to the terminal, where the DCI includes the coded SRI.

In an implementation, the network device determines, based on the bit width of the SRI, the bit width of the DCI for scheduling the PUSCH, and sends the DCI for scheduling the PUSCH to the terminal.

The terminal determines the bit width of the SRI in the same manner as the network device according to the information of the resource set corresponding to the transmission of the PUSCH, performs blind detection on the DCI to obtain the DCI, and then decodes the SRI according to the coding mode to obtain the SRS resource corresponding to the transmission of the PUSCH indicated by the SRI.

Manner 3

The network device sends first signaling to the terminal, where the first signaling is used to indicate a bit width of the SRI, and the bit width of the SRI is determined according to a preset value selection rule.

In this manner, the network device indicates the bit width of the SRI to the terminal by the first signaling, and a value of the first signaling may indicate a specific bit width. The network device may determine the value of the bit width of the SRI according to a preset value selection rule stipulated by a protocol, or the network device may determine the bit width of the SRI according to a preset value selection rule defined by the network device. In this manner, the terminal determines the bit width of the SRI according to the value indicated by the received first signaling.

Manner 4

The network device sends indication information of an SRS resource set corresponding to the transmission of the PUSCH to the terminal, and determines the bit width and/or the coding mode of the SRI according to the number of SRS resources included in the SRS resource set indicated by the indication information of the SRS resource set. Description will be provided in conjunction with specific embodiments.

Embodiment 11

The network device sends first information to the terminal, where the first information indicates that the SRS resource set whose usage is antennaSwitching is used for CSI acquisition of a codebook-based PUSCH.

The network device sends configuration information for the SRS resource set to the terminal, where the configuration information indicates that the network device configures one or more SRS resource sets whose usages are codebook and one or more SRS resource sets whose usages are antennaSwitching for the terminal.

The network device determines scheduling information of the PUSCH according to SRS transmission of the SRS resource set whose usage is antennaSwitching or the SRS resource set whose usage is codebook. The scheduling information includes SRI. The network device sends indication information of an SRS resource set corresponding to the transmission of the PUSCH to the terminal, and a bit width of the SRI is determined according to the number of SRS resources included in the SRS resource set indicated by the indication information of the SRS resource set.

In an implementation, in the embodiment, the network device codes the indication information of the SRS resource set by using the following coding mode:

| Value of indication information of the SRS resource set | SRS resource set |
|---|---|
| 0 | SRS resource set whose usage is codebook |
| 1 | SRS resource set whose usage is antennaSwitching |

In an implementation, in the embodiment, the network device codes the SRI by using the following coding mode:

| Coded bit value of the SRI | SRI resource |
|---|---|
| 0 | 0 |
| ... | ... |
| P-1 | P-1 |

Where SRI=i is an i-th SRS resource in the SRS resource set indicated by the indication information of the SRS resource set, and i=0, 1, . . . , P-1.

In one embodiment,

| Coded bit value of the SRI | SRI resource |
|---|---|
| 0 | 1 |
| ... | ... |
| P-1 | P |

Where SRI=i is an (i+1)-th SRS resource in the SRS resource set indicated by the indication information of the SRS resource set, and i=0, 1, . . . , P-1.

P is the number of SRS resources in the SRS resource set indicated by the indication information of the SRS resource set.

In the embodiment, the network device codes the SRI based on the bit width of the SRI, and then sends the DCI for scheduling the PUSCH to the terminal, where the DCI includes the coded SRI.

In an implementation, the network device determines the bit width of the DCI for scheduling the PUSCH based on the bit width of the SRI, and sends the DCI for scheduling the PUSCH to the terminal.

The terminal determines the SRS resource set according to the indication information of the SRS resource set and determines the bit width of the SRI in the same manner as the network device, performs blind detection on the DCI to obtain the DCI, and then decodes the SRI according to the coding mode in the above table to obtain the SRS resource corresponding to the transmission of the PUSCH indicated by the SRI.

In any of the above embodiments, when the SRI is coded, numbering of the SRS resources in the first resource set, the second resource set, the third resource set, or the fourth resource set is determined according to a sequence of transmission of the SRS resources; or, according to sizes of identifiers of the SRS resources; or, according to a sequence in which the SRS resources are configured.

In any of the above embodiments, the new bit width and/or the coding mode of the SRI is determined according to multiple usages of the SRS resource set, and when transmitting an SRS of the SRS resource set, the terminal will perform the SRS transmission according to requirements of multiple usages. Therefore, the network device can use the same SRS resource set to realize the measurement of multiple usages, thus improving resource utilization and reducing resource waste.

Figure 3:
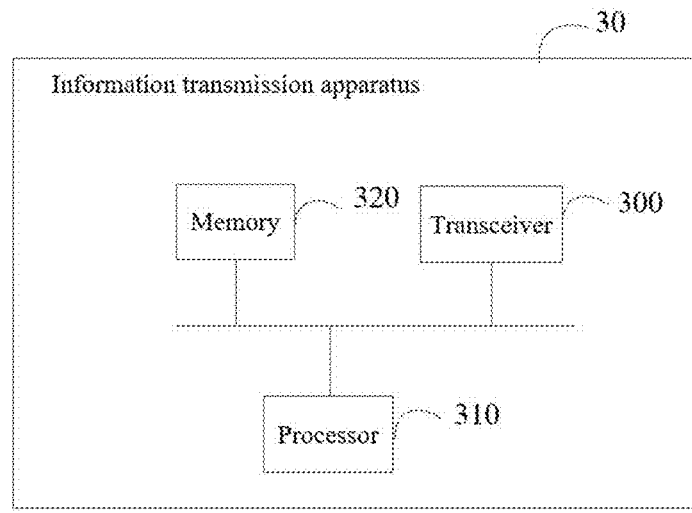
FIG. 3 is a first schematic structural diagram of an information transmission apparatus provided by an embodiment of the present application.

FIG. 3 is a schematic structural diagram of an information transmission apparatus provided by an embodiment of the present application. As shown in FIG. 3, an information transmission apparatus 30 includes a transceiver 300, a processor 310, and a memory 320.

The transceiver 300 is configured to receive and send data under control of the processor 310.

In FIG. 3, the bus architecture may include any number of interconnected buses and bridges, specifically linked together by various circuits of one or more processors represented by the processor 310 and one or more memories represented by the memory 320. The bus architecture may also link various other circuits together, such as peripherals, voltage regulators, and power management circuits, which are well known in the art and therefore will not be further described herein. The bus interface provides an interface. The transceiver 300 may be a plurality of elements, that is, including a transmitter and a receiver, and provides a device for communicating with various other apparatuses over a transmission medium, which includes a transmission medium such as a wireless channel, a wired channel, a fiber optic cable, etc. The processor 310 is responsible for managing the bus architecture and usual processing, and the memory 320 may store data used by the processor 310 when performing operations.

The processor 310 may be a central processing unit (CPU), an application specific integrated circuit (ASIC), a field-programmable gate array (FPGA), or a complex programmable logic device (CPLD). The processor may also have a multi-core architecture.

The processor 310 is configured to execute any method performed by the network device in the embodiment of the present application according to the obtained executable instruction by calling a computer program stored in the memory 320. The processor 310 and the memory 320 may also be physically separately arranged.

The processor 310 performs the following operations:
  determining whether at least one sounding reference signal (SRS) resource is used for multiple usages;
  determining, according to a first result, a bit width and/or a coding mode of SRS resource indicator (SRI), where the SRI is used to indicate an SRS resource corresponding to transmission of a physical uplink shared channel (PUSCH); the first result is that the at least one SRS resource is used for multiple usages, or, no SRS resource is used for multiple usages.

In an implementation, the SRS resource corresponding to the transmission of the PUSCH is an SRS resource used to determine an antenna port of the PUSCH. For example, an antenna port of the PUSCH uses the same antenna port as the antenna port of the SRS resource. Further, for example, the terminal uses the antenna port of the SRS resource as an antenna port of the PUSCH.

In an implementation, the SRS resource corresponding to the transmission of the PUSCH is an SRS resource used to determine a number of transmission streams and/or a pre-coding matrix of the PUSCH. In an implementation, the terminal determines the number of transmission streams and the pre-coding matrix of the PUSCH according to the SRS resource.

In an implementation, the SRS resource corresponding to the transmission of the PUSCH is an SRS resource used to determine a spatial filter coefficient of the PUSCH. In an implementation, the terminal uses a spatial filter coefficient of the SRS resource as the spatial filter coefficient of the PUSCH.

In an implementation, the SRS resource corresponding to the transmission of the PUSCH is an SRS resource used to determine a physical antenna of the PUSCH. In an implementation, the terminal sends the PUSCH using the physical antenna used when sending the SRS resource.

In an implementation, the SRS resource corresponding to the transmission of the PUSCH is an SRS resource that realizes the above multiple functions at the same time.

In an implementation, the SRS resource corresponding to the transmission of the PUSCH is an SRS resource used to determine scheduling information of the PUSCH. In an implementation, the terminal uses the SRS resource to determine scheduling information of the PUSCH.

In a possible implementation, the processor 310 may further execute the following operations:
  sending first information to a terminal, where the first information is used to indicate to the terminal that the at least one SRS resource is used for multiple usages, and the multiple usages include channel state information (CSI) acquisition of a specific type of physical uplink shared channel (PUSCH).

In a possible implementation, the processor 310 may execute the following operations:
  sending configuration information for an SRS resource set to the terminal, where the configuration information includes a usage of the SRS resource set, and the SRS resource set is an SRS resource set including an SRS resource in the at least one SRS resource;
  where the first information indicates that the at least one SRS resource is used for the CSI acquisition in addition to the usage of the at least one SRS resource configured in the SRS resource set.

In a possible implementation, the processor 310 may execute the following operations:
  sending configuration information for an SRS resource set to the terminal, where there exists in the configuration information a configuration value indicating that the SRS resource set is used for multiple usages, the SRS resource set is an SRS resource set including an SRS resource in the at least one SRS resource, and the first information is the configuration information for the SRS resource set.

In a possible implementation, the processor 310 may execute the following operations:
  determining the bit width and/or the coding mode of the SRI according to at least one of a number of SRS resources in a first SRS resource set and a number of SRS resources in a second SRS resource set, where the first SRS resource set is an SRS resource set including an SRS resource in the at least one SRS resource, and the second SRS resource set is an SRS resource set having a usage parameter being only indicated for the CSI acquisition.

In a possible implementation, the bit width of the SRI is a function of a number of SRS resources included in the first SRS resource set and/or a number of SRS resources included in the second SRS resource set; or
  the bit width of the SRI is a function of a number of SRS resources included in a resource set of the first SRS resource set and/or a number of SRS resources included in a resource set of the second SRS resource set; or
  the bit width of the SRI is a function of a number of SRS resources included in each of the first SRS resource set and/or a number of SRS resources included in each of the second SRS resource set; or
  the bit width of the SRI is a function of a maximum value of the number of SRS resources included in the first SRS resource set and the number of SRS resources included in the second SRS resource set; or
  the bit width of the SRI is a function of a maximum value of a number of SRS resources included in a resource set of the first SRS resource set and a number of SRS resources included in a resource set of the second SRS resource set; or
  the bit width of the SRI is a function of a maximum value of a number of SRS resources included in each of the first SRS resource set and/or a number of SRS resources included in each of the second SRS resource set.

In a possible implementation, the coding mode of the SRI includes:
  the coding mode of the SRI including a reserved state, and any state other than the reserved state being used to indicate an SRS resource in the first SRS resource set; or
  any state in the coding mode of the SRI being used to indicate an SRS resource in the first SRS resource set; or
  the coding mode of the SRI including a reserved state, and any state other than the reserved state being used to indicate an SRS resource in the second SRS resource set; or
  any state in the coding mode of the SRI being used to indicate an SRS resource in the second SRS resource set; or
  the coding mode of the SRI including a reserved state, and any state other than the reserved state being used to indicate an SRS resource included in both of the first SRS resource set and the second SRS resource set; or
  any state in the coding mode of the SRI being used to indicate an SRS resource included in both of the first SRS resource set and the second SRS resource set; or
  the coding mode of the SRI including a reserved state, and any state other than the reserved state being used to indicate an SRS resource included in the first SRS resource set or in the second SRS resource set; or
  any state in the coding mode of the SRI being used to indicate an SRS resource included in the first SRS resource set or in the second SRS resource set.

In a possible implementation, the bit width of the SRI is $\lceil \log_2 N_1 \rceil$;
  or, the bit width of the SRI is $\lceil \log_2 N_2 \rceil$;
  or, the bit width of the SRI is $\lceil \log_2 N_3 \rceil$;
  or, the bit width of the SRI is $\lceil \log_2 N_4 \rceil$;
  or, the bit width of the SRI is $$\left\lceil \log_2 \left( \sum_{k=1}^{\min(L_{max}, N_1)} C_{N_1}^k \right) \right\rceil;$$

or, the bit width of the SRI is $$\left\lceil \log_2 \left( \sum_{k=1}^{\min(L_{max}, N_2)} C_{N_2}^k \right) \right\rceil;$$

or, the bit width of the SRI is $\max(\lceil \log_2(N_1) \rceil, \lceil \log_2(N_2) \rceil)$;

or, the bit width of the SRI is $\lceil \max(\log_2(N_1), \log_2(N_2))\rceil$;
or, the bit width of the SRI is $\max(\lceil \log_2(N_3)\rceil, \lceil \log_2(N_4)\rceil)$;
or, the bit width of the SRI is $\lceil \max(\log_2(N_3), \log_2(N_4))\rceil$;
or, the bit width of the SRI is $\max(\lceil \log_2(N_1)\rceil, \lceil \log_2(N_{2,1})\rceil, \ldots, \lceil \log_2(N_{2,n})\rceil)$;
or, the bit width of the SRI is $\lceil \max(\log_2(N_1), \log_2(N_{2,1}), \ldots, \log_2(N_{2,n}))\rceil$;
or, the bit width of the SRI is $\max(\lceil \log_2(N_{1,1})\rceil, \ldots, \lceil \log_2(N_{1,m})\rceil, \lceil \log_2(N_2)\rceil)$;
or, the bit width of the SRI is $\lceil \max(\log_2(N_{1,1}), \ldots, \log_2(N_{1,m}), \log_2(N_2))\rceil$;
or, the bit width of the SRI is $\max(\lceil \log_2(N_{1,1})\rceil, \ldots, \lceil \log_2(N_{1,m})\rceil, \lceil \log_2(N_{2,1})\rceil, \ldots, \lceil \log_2(N_{2,n})\rceil)$;
or, the bit width of the SRI is $\lceil \max(\log_2(N_{1,1}), \ldots, \log_2(N_{1,m}), \log_2(N_{2,1}), \ldots, \log_2(N_{2,n}))\rceil$;
or, the bit width of the SRI is $\lceil \log_2(N_{SRS})\rceil$;
or, the bit width of the SRI is $$\left\lceil \log_2\left(\sum_{k=1}^{\min(L_{max}, N_{SRS})} C_{N_{SRS}}^k\right)\right\rceil;$$

where $N_{SRS}=\max(N_1, N_2)$;
or, $N_{SRS}=\max(N_3, N_4)$;
or, $N_{SRS}=\max(N_{1,1}, \ldots, N_{1,m}, N_2)$;
or, $N_{SRS}=\max(N_1, N_{2,1}, \ldots, N_{2,n})$;
or, $N_{SRS}=\max(N_{1,1}, \ldots, N_{1,m}, N_{2,1}, \ldots, N_{2,n})$;
max(k,l) represents a maximum value of k and l;
$\lceil\ \rceil$ represents rounding up;
$C_x^y$ represents a number of combinations for selecting y elements from x elements;
$N_1$ is a number of SRS resources in the first SRS resource set;
$N_2$ is a number of SRS resources in the second SRS resource set;
$N_3$ is a number of SRS resources included in one SRS resource set of the first SRS resource set when the first SRS resource set includes a plurality of SRS resource sets;
$N_4$ is a number of SRS resources included in one SRS resource set of the second SRS resource set when the second SRS resource set includes a plurality of SRS resource sets;
$L_{max}$ is a maximum number of layers configured for the terminal to allow transmission of the specific type of PUSCH or a maximum number of layers supported by the terminal for transmission of the specific type of PUSCH;
m is a number of SRS resource sets included in the first SRS resource set, $N_{1,m}$ isa number of SRS resources included in an m-th SRS resource set of the first SRS resource set, where m is greater than 1;
n is a number of SRS resource sets included in the second SRS resource set, $N_{2,n}$ is a number of SRS resources included in an n-th SRS resource set of the second SRS resource set, where n is greater than 1.

In a possible implementation, the processor 310 may execute the following operations:
determining the bit width and/or the coding mode of the SRI according to a third SRS resource set; where the third SRS resource set is an SRS resource set transmitted in a latest transmission period in the SRS resource set used for CSI acquisition or last triggered in the SRS resource set used for CSI acquisition, before a physical downlink control channel (PDCCH) carrying downlink control information (DCI) of the PUSCH.

In a possible implementation, the coding mode of the SRI includes:
the coding mode of the SRI including a reserved state, and any state other than the reserved state being used to indicate an SRS resource in the third SRS resource set; or
any state in the coding mode of the SRI being used to indicate an SRS resource in the third SRS resource set.

In a possible implementation, the processor 310 may execute the following operations:
determining the bit width and/or the coding mode of the SRI according to a number and/or a type of SRS resources in the third SRS resource set.

In a possible implementation, when the third SRS resource set is an SRS resource set of the first SRS resource set, the bit width of the SRI is determined according to a number of SRS resources included in both of the third SRS resource set and the second SRS resource set;
where the first SRS resource set is an SRS resource set including an SRS resource in the at least one SRS resource, and the second SRS resource set is an SRS resource set having a usage parameter being only indicated for the CSI acquisition.

In a possible implementation, when the third SRS resource set is an SRS resource set of the second SRS resource set, the bit width of the SRI is determined according to a number of SRS resources included in the third SRS resource set, where the second SRS resource set is an SRS resource set having a usage parameter being only indicated for the CSI acquisition.

In a possible implementation, the processor 310 may execute the following operations:
sending a first signaling to the terminal, where the first signaling is used to indicate the bit width of the SRI.

In a possible implementation, the processor 310 may execute the following operations:
sending indication information of an SRS resource set corresponding to the transmission of the PUSCH to the terminal;
determining the bit width and/or the coding mode of the SRI according to a number of SRS resources included in the SRS resource set indicated by the indication information of the SRS resource set.

In a possible implementation, the coding mode includes:
a coded bit value i of the SRI representing an (i+1)-th SRS resource in a fourth SRS resource set; or
a coded bit value i of the SRI representing an i-th SRS resource in a fourth SRS resource set;
where the fourth SRS resource set is one of the following:
all SRS resource sets in the first SRS resource set; or
an SRS resource set of the first SRS resource set; or
all SRS resource sets in the second SRS resource set; or
an SRS resource set of the second SRS resource set; or
the first SRS resource set and the second SRS resource set; or
an SRS resource set indicated by the network device; or
an SRS resource set corresponding to the transmission of the PUSCH;
i is greater than or equal to 0;
where the first SRS resource set is an SRS resource set including an SRS resource in the at least one SRS resource; and the second SRS resource set is an SRS resource set having a usage parameter being only indicated for the CSI acquisition.

In a possible implementation, numbering of SRS resources in the fourth SRS resource set is determined according to a sequence of transmission of the SRS resources;

or, numbering of SRS resources in the fourth SRS resource set is determined according to sizes of identifiers of the SRS resources;

or, numbering of SRS resources in the fourth SRS resource set is determined according to a sequence in which the SRS resources are configured.

In a possible implementation, the SRS resource set corresponding to the transmission of the PUSCH is determined according to a preset rule.

In a possible implementation, the SRS resource corresponding to the transmission of the PUSCH is an SRS resource used to determine an SRS resource of an antenna port of the PUSCH.

In a possible implementation, the at least one SRS resource is at least one SRS resource with a specific number in an SRS resource set whose usage parameter is not configured for the CSI acquisition;

or, the at least one SRS resource is an SRS resource in an SRS resource set whose usage parameter is configured for a specific usage;

or, the at least one SRS resource is an SRS resource in an SRS resource set whose usage parameter in a specific time domain type is configured for a specific usage;

or, the at least one SRS resource is an SRS resource included both in an SRS resource set whose usage parameter is configured for a specific usage, and an SRS resource set whose usage is the CSI acquisition.

Figure 4:
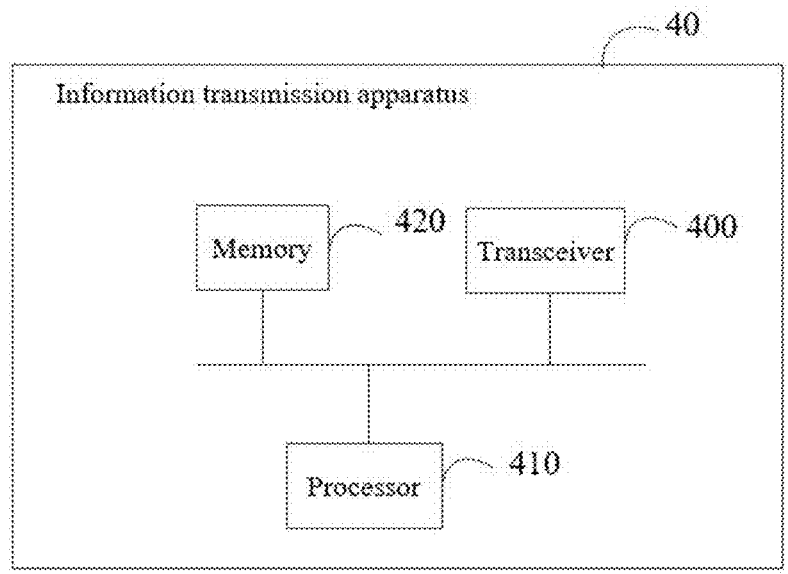
FIG. 4 is a second schematic structural diagram of an information transmission apparatus provided by an embodiment of the present application.

FIG. 4 is a second schematic structural diagram of an information transmission apparatus provided by an embodiment of the present application. As shown in FIG. 4, an information transmission apparatus 40 includes: a transceiver 400, a processor 410, and a memory 420.

The transceiver 400 is configured to receive and send data under control of the processor 410.

In FIG. 4, the bus architecture may include any number of interconnected buses and bridges, specifically linked together by various circuits of one or more processors represented by the processor 410 and one or more memories represented by the memory 420. The bus architecture may also link various other circuits together, such as peripherals, voltage regulators, and power management circuits, which are well known in the art and therefore will not be further described herein. The bus interface provides an interface. The transceiver 400 may be a plurality of elements, that is, including a transmitter and a receiver, and provides a device for communicating with various other apparatuses over a transmission medium, which includes a transmission medium such as a wireless channel, a wired channel, a fiber optic cable, etc. For different user devices, the user interface may also be an interface capable of connecting externally and internally to a required device, and the connected device includes but not limited to a keypad, a monitor, a speaker, a microphone, a joystick, and the like.

The processor 410 is responsible for managing the bus architecture and usual processing, and the memory 420 may store data used by the processor 410 when performing operations.

The processor 410 may be a CPU (central processing unit), an ASIC (Application Specific Integrated Circuit), a FPGA (Field-Programmable Gate Array), or a CPLD (Complex Programmable Logic Device). The processor may also have a multi-core architecture.

The processor 410 is configured to execute any method provided in the embodiment of the present application according to the obtained executable instruction by calling a computer program stored in the memory 420. The processor 410 and the memory 420 may also be physically separately arranged.

The processor 410 may perform the following operations:

determining whether there exists at least one sounding reference signal (SRS) resource used for multiple usages;

determining, according to a second result, a bit width and/or a coding mode of SRS resource indicator (SRI), where the SRI is used to indicate an SRS resource corresponding to transmission of a physical uplink shared channel (PUSCH); the second result is that there exists at least one SRS resource used for multiple usages, or, there exists no SRS resource used for multiple usages.

In an implementation, the SRS resource corresponding to the transmission of the PUSCH is an SRS resource used to determine an antenna port of the PUSCH. For example, an antenna port of the PUSCH uses the same antenna port as the antenna port of the SRS resource. Further, for example, the terminal uses the antenna port of the SRS resource as an antenna port of the PUSCH.

In an implementation, the SRS resource corresponding to the transmission of the PUSCH is an SRS resource used to determine a number of transmission streams and/or a pre-coding matrix of the PUSCH. In an implementation, the terminal determines the number of transmission streams and the pre-coding matrix of the PUSCH according to the SRS resource.

In an implementation, the SRS resource corresponding to the transmission of the PUSCH is an SRS resource used to determine a spatial filter coefficient of the PUSCH. In an implementation, the terminal uses a spatial filter coefficient of the SRS resource as the spatial filter coefficient of the PUSCH.

In an implementation, the SRS resource corresponding to the transmission of the PUSCH is an SRS resource used to determine a physical antenna of the PUSCH. In an implementation, the terminal sends the PUSCH using the physical antenna used when sending the SRS resource.

In an implementation, the SRS resource corresponding to the transmission of the PUSCH is an SRS resource that realizes the above multiple functions at the same time.

In an implementation, the SRS resource corresponding to the transmission of the PUSCH is an SRS resource used to determine scheduling information of the PUSCH. In an implementation, the terminal uses the SRS resource to determine scheduling information of the PUSCH.

In a possible implementation, the processor 410 may further execute the following operations:

receiving first information from a network device, where the first information is used to indicate a terminal that the at least one SRS resource is used for multiple usages, and the multiple usages include channel state information (CSI) acquisition of a specific type of physical uplink shared channel (PUSCH).

In a possible implementation, the processor 410 may execute the following operations:

receiving configuration information for an SRS resource set from a network device;

where the configuration information includes a usage of the SRS resource set, and the SRS resource set is an SRS resource set including an SRS resource in the at least one SRS resource;

where the first information indicates that the at least one SRS resource is used for the CSI acquisition in addition to the usage of the at least one SRS resource configured in the SRS resource set.

In a possible implementation, the processor 410 may execute the following operations:

receiving configuration information for an SRS resource set from a network device; where there exists in the configuration information a configuration value indicating that the SRS resource set is used for multiple usages, the SRS resource set is an SRS resource set including an SRS resource in the at least one SRS resource, and the first information is the configuration information for the SRS resource set.

In a possible implementation, the processor 410 may execute the following operations:

determining the bit width and/or the coding mode of the SRI according to at least one of a number of SRS resources in a first SRS resource set and a number of SRS resources in a second SRS resource set; where the first SRS resource set is an SRS resource set including an SRS resource in the at least one SRS resource, and the second SRS resource set is an SRS resource set having a usage parameter being only indicated for the CSI acquisition.

In a possible implementation, the bit width of the SRI is a function of a number of SRS resources included in the first SRS resource set and/or a number of SRS resources included in the second SRS resource set; or the bit width of the SRI is a function of a number of SRS resources included in a resource set of the first SRS resource set and/or a number of SRS resources included in a resource set of the second SRS resource set; or the bit width of the SRI is a function of a number of SRS resources included in each of the first SRS resource set and/or a number of SRS resources included in each of the second SRS resource set; or the bit width of the SRI is a function of a maximum value of a number of SRS resources included in the first SRS resource set and a number of SRS resources included in the second SRS resource set; or the bit width of the SRI is a function of a maximum value of a number of SRS resources included in a resource set of the first SRS resource set and a number of SRS resources included in a resource set of the second SRS resource set; or the bit width of the SRI is a function of a maximum value of a number of SRS resources included in each of the first SRS resource set and/or a number of SRS resources included in each of the second SRS resource set.

In a possible implementation, the coding mode of the SRI includes:

the coding mode of the SRI including a reserved state, and any state other than the reserved state being used to indicate an SRS resource in the first SRS resource set; or any state in the coding mode of the SRI being used to indicate an SRS resource in the first SRS resource set; or the coding mode of the SRI including a reserved state, and any state other than the reserved state being used to indicate an SRS resource in the second SRS resource set; or any state in the coding mode of the SRI being used to indicate an SRS resource in the second SRS resource set; or the coding mode of the SRI including a reserved state, and any state other than the reserved state being used to indicate an SRS resource included in both of the first SRS resource set and the second SRS resource set; or any state in the coding mode of the SRI being used to indicate an SRS resource included in both of the first SRS resource set and the second SRS resource set; or the coding mode of the SRI including a reserved state, and any state other than the reserved state being used to indicate an SRS resource included in the first SRS resource set or in the second SRS resource set; or any state in the coding mode of the SRI being used to indicate an SRS resource included in the first SRS resource set or in the second SRS resource set.

In a possible implementation, the bit width of the SRI is $\lceil \log_2 N_1 \rceil$;

or, the bit width of the SRI is $\lceil \log_2 N_2 \rceil$;
or, the bit width of the SRI is $\lceil \log_2 N_3 \rceil$;
or, the bit width of the SRI is $\lceil \log_2 N_4 \rceil$;
or, the bit width of the SRI is $$\left\lceil \log_2 \left( \sum_{k=1}^{min(L_{max}, N_1)} C_{N_1}^k \right) \right\rceil;$$

or, the bit width of the SRI is $$\left\lceil \log_2 \left( \sum_{k=1}^{min(L_{max}, N_2)} C_{N_2}^k \right) \right\rceil;$$

or, the bit width of the SRI is $\max(\lceil \log_2(N_1) \rceil, \lceil \log_2(N_2) \rceil)$;
or, the bit width of the SRI is $\lceil \max(\log_2(N_1), \log_2(N_2)) \rceil$;
or, the bit width of the SRI is $\max(\lceil \log_2(N_3) \rceil, \lceil \log_2(N_4) \rceil)$;
or, the bit width of the SRI is $\lceil \max(\log_2(N_3), \log_2(N_4)) \rceil$;
or, the bit width of the SRI is $\max(\lceil \log_2(N_1) \rceil, \lceil \log_2(N_{2,1}) \rceil, \ldots, \lceil \log_2(N_{2,n}) \rceil)$;
or, the bit width of the SRI is $\lceil \max(\log_2(N_1), \log_2(N_{2,1}), \ldots, \log_2(N_{2,n})) \rceil$;
or, the bit width of the SRI is $\max(\lceil \log_2(N_{1,1}) \rceil, \ldots, \lceil \log_2(N_{1,m}) \rceil, \lceil \log_2(N_2) \rceil)$;
or, the bit width of the SRI is $\lceil \max(\log_2(N_{1,1}), \ldots, \log_2(N_{1,m}), \log_2(N_2)) \rceil$;
or, the bit width of the SRI is $\max(\lceil \log_2(N_{1,1}) \rceil, \ldots, \lceil \log_2(N_{1,m}) \rceil, \lceil \log_2(N_{2,1}) \rceil, \ldots, \lceil \log_2(N_{2,n}) \rceil)$;
or, the bit width of the SRI is $\lceil \max(\log_2(N_{1,1}), \ldots, \log_2(N_{1,m}), \log_2(N_{2,1}), \ldots, \log_2(N_{2,n})) \rceil$;
or, the bit width of the SRI is $\lceil \log_2(N_{SRS}) \rceil$;
or, the bit width of the SRI is $$\left\lceil \log_2 \left( \sum_{k=1}^{min(L_{max}, N_{SRS})} C_{N_{SRS}}^k \right) \right\rceil;$$

where $N_{SRS} = \max(N_1, N_2)$;
or, $N_{SRS} = \max(N_3, N_4)$;
or, $N_{SRS} = \max(N_{1,1}, \ldots, N_{1,m}, N_2)$;
or, $N_{SRS} = \max(N_1, N_{2,1}, \ldots, N_{2,n})$;
or, $N_{SRS} = \max(N_{1,1}, \ldots, N_{1,m}, N_{2,1}, \ldots, N_{2,n})$;
$\max(k,l)$ represents a maximum value of k and l;
$\lceil \ \rceil$ represents rounding up;
$C_x^y$ represents a number of combinations for selecting y elements from x elements;

$N_1$ is a number of SRS resources in the first SRS resource set;

$N_2$ is a number of SRS resources in the second SRS resource set;

$N_3$ is a number of SRS resources included in one SRS resource set of the first SRS resource set when the first SRS resource set includes a plurality of SRS resource sets;

$N_4$ is a number of SRS resources included in one SRS resource set of the second SRS resource set when the second SRS resource set includes a plurality of SRS resource sets;

$L_{max}$ is a maximum number of layers for transmission of a PUSCH configured by a network device for a terminal or a maximum number of layers supported by a terminal for uplink transmission;

m is a number of SRS resource sets included in the first SRS resource set, $N_{1,m}$ isa number of SRS resources included in an m-th SRS resource set of the first SRS resource set, where m is greater than 1;

n is a number of SRS resource sets included in the second SRS resource set, $N_{2,n}$ is a number of SRS resources included in an n-th SRS resource set of the second SRS resource set, where n is greater than 1.

In a possible implementation, the processor 410 may execute the following operations:

determining the bit width and/or the coding mode of the SRI according to a third SRS resource set, where the third SRS resource set is an SRS resource set transmitted in a latest SRS transmission period in the SRS resource set used for CSI acquisition or last triggered in the SRS resource set used for CSI acquisition, before a physical downlink control channel (PDCCH) carrying downlink control information (DCI) of the PUSCH.

In a possible implementation, the coding mode of the SRI includes:

the coding state of the SRI including a reserved state, and any state other than the reserved state being used to indicate an SRS resource in the third SRS resource set; or any state in the coding mode of the SRI being used to indicate an SRS resource in the third SRS resource set.

In a possible implementation, the processor 410 may execute the following operations:

determining the bit width and/or the coding mode of the SRI according to a number and/or a type of SRS resources in the third SRS resource set.

In a possible implementation, when the third SRS resource set is an SRS resource set of the first SRS resource set, the bit width of the SRI is determined according to a number of SRS resources included in both of the third SRS resource set and the second SRS resource set;

where the first SRS resource set is an SRS resource set including an SRS resource in the at least one SRS resource, and the second SRS resource set is an SRS resource set having a usage parameter being only indicated for the CSI acquisition.

In a possible implementation, when the third SRS resource set is an SRS resource set of the second SRS resource set, the bit width of the SRI is determined according to a number of SRS resources included in the third SRS resource set, where the second SRS resource set is an SRS resource set having a usage parameter being only indicated for the CSI acquisition.

In a possible implementation, the processor 410 is configured to execute the following operations: receiving a first signaling from a network device, where the first signaling is used to indicate a bit width of the SRI.

In a possible implementation, the processor 410 may execute the following operations:

receiving indication information of an SRS resource set corresponding to the transmission of the PUSCH sent by a network device;

determining the bit width and/or the coding mode of the SRI according to a number of SRS resources included in the SRS resource set indicated by the indication information of the SRS resource set.

In a possible implementation, the coding mode includes:

a coded bit value i of the SRI representing an (i+1)-th SRS resource in a fourth SRS resource set; or a coded bit value i of the SRI representing an i-th SRS resource in a fourth SRS resource set;

where the fourth SRS resource set is one of the following:

all SRS resource sets in the first SRS resource set; or an SRS resource set of the first SRS resource set; or all SRS resource sets in the second SRS resource set; or an SRS resource set of the second SRS resource set; or the first SRS resource set and the second SRS resource set; or an SRS resource set indicated by a network device; or an SRS resource set corresponding to the transmission of the PUSCH;

i is greater than or equal to 0;

where the first SRS resource set is an SRS resource set including an SRS resource in the at least one SRS resource, and the second SRS resource set is an SRS resource set having a usage parameter being only indicated for the CSI acquisition.

In a possible implementation, numbering of SRS resources in the fourth SRS resource set is determined according to a sequence of transmission of the SRS resources;

or, numbering of SRS resources in the fourth SRS resource set is determined according to sizes of identifiers of the SRS resources;

or, numbering of SRS resources in the fourth SRS resource set is determined according to a sequence in which the SRS resources are configured.

In a possible implementation, the SRS resource set corresponding to the transmission of the PUSCH is determined according to a preset rule.

In a possible implementation, the SRS resource set corresponding to the transmission of the PUSCH is an SRS resource set used to determine an SRS resource set where an SRS resource of an antenna port of the PUSCH is located.

In a possible implementation, the at least one SRS resource is an SRS resource with a specific number in an SRS resource set whose usage parameter is not configured for the CSI acquisition;

or, the at least one SRS resource is an SRS resource in an SRS resource set whose usage parameter is configured for a specific usage;

or, the at least one SRS resource is an SRS resource in an SRS resource set whose usage parameter in a specific time domain type is configured for a specific usage;

or, the at least one SRS resource is an SRS resource included both in an SRS resource set whose usage parameter is configured for a specific usage, and an SRS resource set whose usage is the CSI acquisition.

It should be noted herein that, the above apparatus provided in the present application is capable of implementing all the method steps achieved by the above method embodiment, and is capable of achieving the same effect, and the same parts and beneficial effects of the present embodiment as those in the method embodiment will not be described in detail herein.

Figure 5:
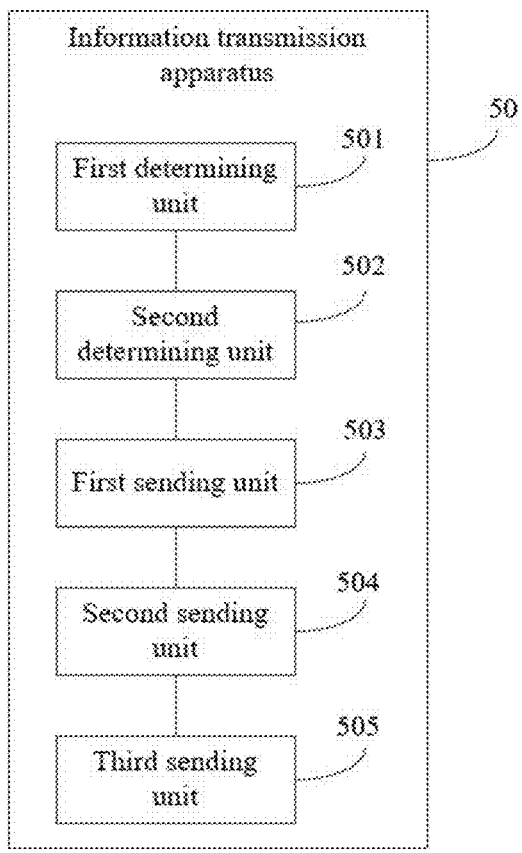
FIG. 5 is a third schematic structural diagram of an information transmission apparatus provided by an embodiment of the present application.

FIG. 5 is a third schematic structural diagram of an information transmission apparatus provided by an embodiment of the present application. As shown in FIG. 5, the information transmission apparatus 50 includes:
- a first determining device 501, configured to determine whether at least one sounding reference signal (SRS) resource is used for multiple usages;
- a second determining device 502, configured to determine, according to a first result, a bit width and/or a coding mode of SRS resource indicator (SRI), where the SRI is used to indicate an SRS resource corresponding to transmission of a physical uplink shared channel (PUSCH); the first result is that the at least one SRS resource is used for multiple usages, or, no SRS resource is used for multiple usages.

In an implementation, the SRS resource corresponding to the transmission of the PUSCH is an SRS resource used to determine an antenna port of the PUSCH. For example, an antenna port of the PUSCH uses the same antenna port as the antenna port of the SRS resource. Further, for example, the terminal uses the antenna port of the SRS resource as an antenna port of the PUSCH.

In an implementation, the SRS resource corresponding to the transmission of the PUSCH is an SRS resource used to determine a number of transmission streams and/or a pre-coding matrix of the PUSCH. In an implementation, the terminal determines the number of transmission streams and the pre-coding matrix of the PUSCH according to the SRS resource.

In an implementation, the SRS resource corresponding to the transmission of the PUSCH is an SRS resource used to determine a spatial filter coefficient of the PUSCH. In an implementation, the terminal uses a spatial filter coefficient of the SRS resource as the spatial filter coefficient of the PUSCH.

In an implementation, the SRS resource corresponding to the transmission of the PUSCH is an SRS resource used to determine a physical antenna of the PUSCH. In an implementation, the terminal sends the PUSCH using the physical antenna used when sending the SRS resource.

In an implementation, the SRS resource corresponding to the transmission of the PUSCH is an SRS resource that realizes the above multiple functions at the same time.

In an implementation, the SRS resource corresponding to the transmission of the PUSCH is an SRS resource used to determine scheduling information of the PUSCH. In an implementation, the terminal uses the SRS resource to determine scheduling information of the PUSCH.

In a possible implementation, the apparatus 50 further includes:
- a first sending device 503, configured to send first information to a terminal, where the first information is used to indicate to the terminal that the at least one SRS resource is used for multiple usages, and the multiple usages include channel state information (CSI) acquisition of a specific type of physical uplink shared channel (PUSCH).

In a possible implementation, the first sending device 503 is further configured to send configuration information for an SRS resource set to the terminal, where the configuration information includes a usage of the SRS resource set, and the SRS resource set is an SRS resource set including an SRS resource in the at least one SRS resource; where the first information indicates that the at least one SRS resource is used for the CSI acquisition in addition to the usage of the at least one SRS resource configured in the SRS resource set.

In a possible implementation, the first sending device 503 is configured to send configuration information for an SRS resource set to the terminal, where there exists in the configuration information a configuration value indicating that the SRS resource set is used for multiple usages, the SRS resource set is an SRS resource set including an SRS resource in the at least one SRS resource, and the first information is the configuration information for the SRS resource set.

In a possible implementation, the second determining device 502 is configured to determine the bit width and/or the coding mode of the SRI according to at least one of a number of SRS resources in a first SRS resource set and a number of SRS resources in a second SRS resource set, where the first SRS resource set is an SRS resource set including an SRS resource in the at least one SRS resource, and the second SRS resource set is an SRS resource set having a usage parameter being only indicated for the CSI acquisition.

In a possible implementation, the bit width of the SRI is a function of a number of SRS resources included in the first SRS resource set and/or a number of SRS resources included in the second SRS resource set; or
- the bit width of the SRI is a function of a number of SRS resources included in a resource set of the first SRS resource set and/or a number of SRS resources included in a resource set of the second SRS resource set; or
- the bit width of the SRI is a function of a number of SRS resources included in each of the first SRS resource set and/or a number of SRS resources included in each of the second SRS resource set; or
- the bit width of the SRI is a function of a maximum value of the number of SRS resources included in the first SRS resource set and the number of SRS resources included in the second SRS resource set; or
- the bit width of the SRI is a function of a maximum value of a number of SRS resources included in a resource set of the first SRS resource set and a number of SRS resources included in a resource set of the second SRS resource set; or
- the bit width of the SRI is a function of a maximum value of a number of SRS resources included in each of the first SRS resource set and/or a number of SRS resources included in each of the second SRS resource set.

In a possible implementation, the coding mode of the SRI includes:
- the coding mode of the SRI including a reserved state, and any state other than the reserved state being used to indicate an SRS resource in the first SRS resource set; or
- any state in the coding mode of the SRI being used to indicate an SRS resource in the first SRS resource set; or
- the coding mode of the SRI including a reserved state, and any state other than the reserved state being used to indicate an SRS resource in the second SRS resource set; or
- any state in the coding mode of the SRI being used to indicate an SRS resource in the second SRS resource set; or
- the coding mode of the SRI including a reserved state, and any state other than the reserved state being used to indicate an SRS resource included in both of the first SRS resource set and the second SRS resource set; or any state in the coding mode of the SRI being used to indicate an SRS resource included in both of the first SRS resource set and the second SRS resource set; or the coding mode of the SRI including a reserved state, and any state other than the reserved state being used to indicate an SRS resource included in the first SRS resource set or in the second SRS resource set; or any state in the coding mode of the SRI being used to indicate an SRS resource included in the first SRS resource set or in the second SRS resource set.

In a possible implementation, the bit width of the SRI is $\lceil \log_2 N_1 \rceil$;

or, the bit width of the SRI is $\lceil \log_2 N_2 \rceil$;
or, the bit width of the SRI is $\lceil \log_2 N_3 \rceil$;
or, the bit width of the SRI is $\lceil \log_2 N_4 \rceil$;
or, the bit width of the SRI is $$\left\lceil \log_2 \left( \sum\nolimits_{k=1}^{\min(L_{max}, N_1)} C_{N_1}^k \right) \right\rceil;$$

or, the bit width of the SRI is $$\left\lceil \log_2 \left( \sum\nolimits_{k=1}^{\min(L_{max}, N_2)} C_{N_2}^k \right) \right\rceil;$$

or, the bit width of the SRI is $\max(\lceil \log_2(N_1) \rceil, \lceil \log_2(N_2) \rceil)$;
or, the bit width of the SRI is $\lceil \max(\log_2(N_1), \log_2(N_2)) \rceil$;
or, the bit width of the SRI is $\max(\lceil \log_2(N_3) \rceil, \lceil \log_2(N_4) \rceil)$;
or, the bit width of the SRI is $\lceil \max(\log_2(N_3), \log_2(N_4)) \rceil$;
or, the bit width of the SRI is
$\max(\lceil \log_2(N_1) \rceil, \lceil \log_2(N_{2,1}) \rceil, \ldots, \lceil \log_2(N_{2,n}) \rceil)$;
or, the bit width of the SRI is
$\lceil \max(\log_2(N_1), \log_2(N_{2,1}), \ldots, \log_2(N_{2,n})) \rceil$;
or, the bit width of the SRI is
$\max(\lceil \log_2(N_{1,1}) \rceil, \ldots, \lceil \log_2(N_{1,m}) \rceil, \lceil \log_2(N_2) \rceil)$;
or, the bit width of the SRI is
$\lceil \max(\log_2(N_{1,1}), \ldots, \log_2(N_{1,m}), \log_2(N_2)) \rceil$;
or, the bit width of the SRI is
$\max(\lceil \log_2(N_{1,1}) \rceil, \ldots, \lceil \log_2(N_{1,m}) \rceil, \lceil \log_2(N_{2,1}) \rceil, \ldots, \lceil \log_2(N_{2,n}) \rceil)$;
or, the bit width of the SRI is
$\lceil \max(\log_2(N_{1,1}), \ldots, \log_2(N_{1,m}), \log_2(N_{2,1}), \ldots, \log_2(N_{2,n})) \rceil$;
or, the bit width of the SRI is $\lceil \log_2(N_{SRS}) \rceil$;
or, the bit width of the SRI is $$\left\lceil \log_2 \left( \sum\nolimits_{k=1}^{\min(L_{max}, N_{SRS})} C_{N_{SRS}}^k \right) \right\rceil;$$

where $N_{SRS} = \max(N_1, N_2)$;
or, $N_{SRS} = \max(N_3, N_4)$;
or, $N_{SRS} = \max(N_{1,1}, \ldots, N_{1,m}, N_2)$;
or, $N_{SRS} = \max(N_1, N_{2,1}, \ldots, N_{2,n})$;
or, $N_{SRS} = \max(N_{1,1}, \ldots, N_{1,m}, N_{2,1}, \ldots, N_{2,n})$;
$\max(k,l)$ represents a maximum value of k and l;
$\lceil \ \rceil$ represents rounding up;
$C_x^y$ represents a number of combinations for selecting y elements from x elements;
$N_1$ is a number of SRS resources in the first SRS resource set;

$N_2$ is a number of SRS resources in the second SRS resource set;

$N_3$ is a number of SRS resources included in one SRS resource set of the first SRS resource set when the first SRS resource set includes a plurality of SRS resource sets;

$N_4$ is a number of SRS resources included in one SRS resource set of the second SRS resource set when the second SRS resource set includes a plurality of SRS resource sets;

$L_{max}$ is a maximum number of layers configured for the terminal to allow transmission of the specific type of PUSCH or a maximum number of layers supported by the terminal for transmission of the specific type of PUSCH;

m is a number of SRS resource sets included in the first SRS resource set, $N_{1,m}$ isa number of SRS resources included in an m-th SRS resource set of the first SRS resource set, where m is greater than 1;

n is a number of SRS resource sets included in the second SRS resource set, $N_{2,n}$ is a number of SRS resources included in an n-th SRS resource set of the second SRS resource set, where n is greater than 1.

In a possible implementation, the second determining device 502 is configured to determine the bit width and/or the coding mode of the SRI according to a third SRS resource set; where the third SRS resource set is an SRS resource set transmitted in a latest transmission period in the SRS resource set used for CSI acquisition or last triggered in the SRS resource set used for CSI acquisition, before a physical downlink control channel (PDCCH) carrying downlink control information (DCI) of the PUSCH.

In a possible implementation, the coding mode of the SRI includes:

the coding mode of the SRI including a reserved state, and any state other than the reserved state being used to indicate an SRS resource in the third SRS resource set; or any state in the coding mode of the SRI being used to indicate an SRS resource in the third SRS resource set.

In a possible implementation, the second determining device 502 is configured to determine the bit width and/or the coding mode of the SRI according to a number and/or a type of SRS resources in the third SRS resource set.

In a possible implementation, when the third SRS resource set is an SRS resource set of the first SRS resource set, the bit width of the SRI is determined according to a number of SRS resources included in both of the third SRS resource set and the second SRS resource set;

where the first SRS resource set is an SRS resource set including an SRS resource in the at least one SRS resource, and the second SRS resource set is an SRS resource set having a usage parameter being only indicated for the CSI acquisition.

In a possible implementation, when the third SRS resource set is an SRS resource set of the second SRS resource set, the bit width of the SRI is determined according to a number of SRS resources included in the third SRS resource set, where the second SRS resource set is an SRS resource set having a usage parameter being only indicated for the CSI acquisition.

In a possible implementation, the apparatus further includes:

a second sending device 504, configured to send indication information of an SRS resource set corresponding to the transmission of the PUSCH to the terminal;

the second determining device 502, configured to determine the bit width and/or the coding mode of the SRI according to a number of SRS resources included in the SRS resource set indicated by the indication information of the SRS resource set.

In a possible implementation, the apparatus 50 further includes:

a third sending device 505, configured to send a first signaling to the terminal, where the first signaling is used to indicate the bit width of the SRI.

In a possible implementation, the coding mode includes:
a coded bit value i of the SRI representing an (i+1)-th SRS resource in a fourth SRS resource set; or
a coded bit value i of the SRI representing an i-th SRS resource in a fourth SRS resource set;
where the fourth SRS resource set is one of the following:
all SRS resource sets in the first SRS resource set; or
an SRS resource set of the first SRS resource set; or
all SRS resource sets in the second SRS resource set; or
an SRS resource set of the second SRS resource set; or
the first SRS resource set and the second SRS resource set; or
an SRS resource set indicated by the network device; or
an SRS resource set corresponding to the transmission of the PUSCH;
i is greater than or equal to 0;
where the first SRS resource set is an SRS resource set including an SRS resource in the at least one SRS resource; and the second SRS resource set is an SRS resource set having a usage parameter being only indicated for the CSI acquisition.

In a possible implementation, numbering of SRS resources in the fourth SRS resource set is determined according to a sequence of transmission of the SRS resources;
or, numbering of SRS resources in the fourth SRS resource set is determined according to sizes of identifiers of the SRS resources;
or, numbering of SRS resources in the fourth SRS resource set is determined according to a sequence in which the SRS resources are configured.

In a possible implementation, the SRS resource set corresponding to the transmission of the PUSCH is determined according to a preset rule.

In a possible implementation, the SRS resource corresponding to the transmission of the PUSCH is an SRS resource used to determine an SRS resource of an antenna port of the PUSCH.

In a possible implementation, the at least one SRS resource is at least one SRS resource with a specific number in an SRS resource set whose usage parameter is not configured for the CSI acquisition;
or, the at least one SRS resource is an SRS resource in an SRS resource set whose usage parameter is configured for a specific usage;
or, the at least one SRS resource is an SRS resource in an SRS resource set whose usage parameter in a specific time domain type is configured for a specific usage;
or, the at least one SRS resource is an SRS resource included both in an SRS resource set whose usage parameter is configured for a specific usage, and an SRS resource set whose usage is the CSI acquisition.

Figure 6:
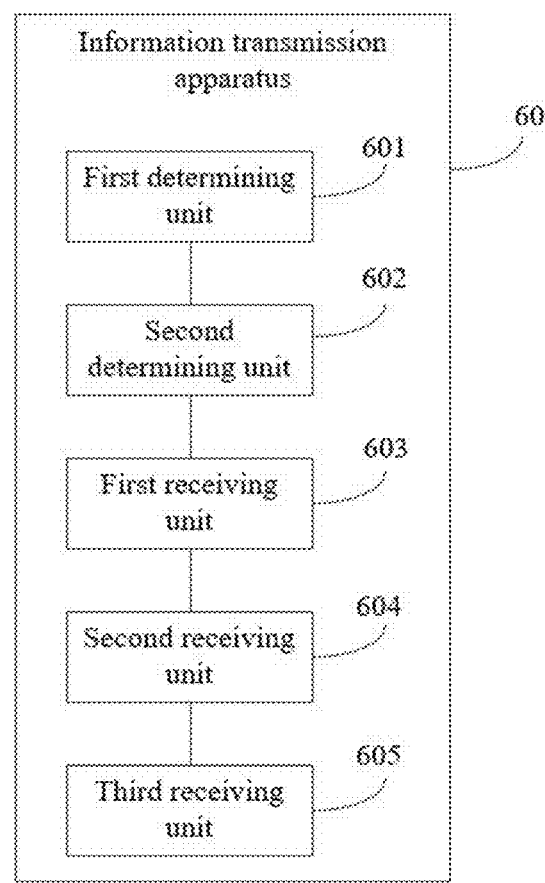
FIG. 6 is a fourth schematic structural diagram of an information transmission apparatus provided by an embodiment of the present application.

FIG. 6 is a fourth schematic structural diagram of an information transmission apparatus provided by an embodiment of the present application. As shown in FIG. 6, the information transmission apparatus 60 includes:

a first determining device 601, configured to determine whether there exists at least one sounding reference signal (SRS) resource used for multiple usages;
a second determining device 602, configured to determine, according to a second result, a bit width and/or a coding mode of SRS resource indicator (SRI), where the SRI is used to indicate an SRS resource corresponding to transmission of a physical uplink shared channel (PUSCH); the second result is that there exists at least one SRS resource used for multiple usages, or, there exists no SRS resource used for multiple usages.

In an implementation, the SRS resource corresponding to the transmission of the PUSCH is an SRS resource used to determine an antenna port of the PUSCH. For example, an antenna port of the PUSCH uses the same antenna port as the antenna port of the SRS resource. Further, for example, the terminal uses the antenna port of the SRS resource as an antenna port of the PUSCH.

In an implementation, the SRS resource corresponding to the transmission of the PUSCH is an SRS resource used to determine a number of transmission streams and/or a pre-coding matrix of the PUSCH. In an implementation, the terminal determines the number of transmission streams and the pre-coding matrix of the PUSCH according to the SRS resource.

In an implementation, the SRS resource corresponding to the transmission of the PUSCH is an SRS resource used to determine a spatial filter coefficient of the PUSCH. In an implementation, the terminal uses a spatial filter coefficient of the SRS resource as the spatial filter coefficient of the PUSCH.

In an implementation, the SRS resource corresponding to the transmission of the PUSCH is an SRS resource used to determine a physical antenna of the PUSCH. In an implementation, the terminal sends the PUSCH using the physical antenna used when sending the SRS resource.

In an implementation, the SRS resource corresponding to the transmission of the PUSCH is an SRS resource that realizes the above multiple functions at the same time.

In an implementation, the SRS resource corresponding to the transmission of the PUSCH is an SRS resource used to determine scheduling information of the PUSCH. In an implementation, the terminal uses the SRS resource to determine scheduling information of the PUSCH.

In a possible implementation, the apparatus 60 further includes:

a first receiving device 603, configured to receive first information from a network device, where the first information is used to indicate a terminal that the at least one SRS resource is used for multiple usages, and the multiple usages include channel state information (CSI) acquisition of a specific type of physical uplink shared channel (PUSCH).

In a possible implementation, the first receiving device 603 is configured to receive configuration information for an SRS resource set from a network device, where the configuration information includes a usage of the SRS resource set, and the SRS resource set is an SRS resource set including an SRS resource in the at least one SRS resource;
where the first information indicates that the at least one SRS resource is used for the CSI acquisition in addition to the usage of the at least one SRS resource configured in the SRS resource set.

In a possible implementation, the first sending device 603 is configured to receive configuration information for an SRS resource set from a network device, where there exists in the configuration information a configuration value indicating that the SRS resource set is used for multiple usages, the SRS resource set is an SRS resource set including an SRS resource in the at least one SRS resource, and the first information is the configuration information for the SRS resource set.

In a possible implementation, the second determining device 602 is configured to determine the bit width and/or the coding mode of the SRI according to at least one of a number of SRS resources in a first SRS resource set and a number of SRS resources in a second SRS resource set, where the first SRS resource set is an SRS resource set including an SRS resource in the at least one SRS resource, and the second SRS resource set is an SRS resource set having a usage parameter being only indicated for the CSI acquisition.

In a possible implementation, the bit width of the SRI is a function of a number of SRS resources included in the first SRS resource set and/or a number of SRS resources included in the second SRS resource set; or the bit width of the SRI is a function of a number of SRS resources included in a resource set of the first SRS resource set and/or a number of SRS resources included in a resource set of the second SRS resource set; or the bit width of the SRI is a function of a number of SRS resources included in each of the first SRS resource set and/or a number of SRS resources included in each of the second SRS resource set; or the bit width of the SRI is a function of a maximum value of the number of SRS resources included in the first SRS resource set and the number of SRS resources included in the second SRS resource set; or the bit width of the SRI is a function of a maximum value of a number of SRS resources included in a resource set of the first SRS resource set and a number of SRS resources included in a resource set of the second SRS resource set; or the bit width of the SRI is a function of a maximum value of a number of SRS resources included in each of the first SRS resource set and/or a number of SRS resources included in each of the second SRS resource set.

In a possible implementation, the coding mode of the SRI includes:

the coding mode of the SRI including a reserved state, and any state other than the reserved state being used to indicate an SRS resource in the first SRS resource set; or any state in the coding mode of the SRI being used to indicate an SRS resource in the first SRS resource set; or the coding mode of the SRI including a reserved state, and any state other than the reserved state being used to indicate an SRS resource in the second SRS resource set; or any state in the coding mode of the SRI being used to indicate an SRS resource in the second SRS resource set; or the coding mode of the SRI including a reserved state, and any state other than the reserved state being used to indicate an SRS resource included in both of the first SRS resource set and the second SRS resource set; or any state in the coding mode of the SRI being used to indicate an SRS resource included in both of the first SRS resource set and the second SRS resource set; or the coding mode of the SRI including a reserved state, and any state other than the reserved state being used to indicate an SRS resource included in the first SRS resource set or in the second SRS resource set; or any state in the coding mode of the SRI being used to indicate an SRS resource included in the first SRS resource set or in the second SRS resource set.

In a possible implementation, the bit width of the SRI is $\lceil \log_2 N_1 \rceil$;

or, the bit width of the SRI is $\lceil \log_2 N_2 \rceil$;
or, the bit width of the SRI is $\lceil \log_2 N_3 \rceil$;
or, the bit width of the SRI is $\lceil \log_2 N_4 \rceil$;
or, the bit width of the SRI is $$\left\lceil \log_2 \left( \sum_{k=1}^{\min(L_{max}, N_1)} C_{N_1}^k \right) \right\rceil;$$

or, the bit width of the SRI is $$\left\lceil \log_2 \left( \sum_{k=1}^{\min(L_{max}, N_2)} C_{N_2}^k \right) \right\rceil;$$

or, the bit width of the SRI is $\max(\lceil \log_2(N_1) \rceil, \lceil \log_2(N_2) \rceil)$;
or, the bit width of the SRI is $\lceil \max(\log_2(N_1), \log_2(N_2)) \rceil$;
or, the bit width of the SRI is $\max(\lceil \log_2(N_3) \rceil, \lceil \log_2(N_4) \rceil)$;
or, the bit width of the SRI is $\lceil \max(\log_2(N_3), \log_2(N_4)) \rceil$;
or, the bit width of the SRI is
$\max(\lceil \log_2(N_1) \rceil, \lceil \log_2(N_{2,1}) \rceil, \ldots, \lceil \log_2(N_{2,n}) \rceil)$;
or, the bit width of the SRI is
$\lceil \max(\log_2(N_1), \log_2(N_{2,1}), \ldots, \log_2(N_{2,n})) \rceil$;
or, the bit width of the SRI is
$\max(\lceil \log_2(N_{1,1}) \rceil, \ldots, \lceil \log_2(N_{1,m}) \rceil, \lceil \log_2(N_2) \rceil)$;
or, the bit width of the SRI is
$\lceil \max(\log_2(N_{1,1}), \ldots, \log_2(N_{1,m}), \log_2(N_2)) \rceil$;
or, the bit width of the SRI is
$\max(\lceil \log_2(N_{1,1}) \rceil, \ldots, \lceil \log_2(N_{1,m}) \rceil, \lceil \log_2(N_{2,1}) \rceil, \ldots, \lceil \log_2(N_{2,n}) \rceil)$;
or, the bit width of the SRI is
$\lceil \max(\log_2(N_{1,1}), \ldots, \log_2(N_{1,m}), \log_2(N_{2,1}), \ldots, \log_2(N_{2,n})) \rceil$;
or, the bit width of the SRI is $\lceil \log_2(N_{SRS}) \rceil$;
or, the bit width of the SRI is $$\left\lceil \log_2 \left( \sum_{k=1}^{\min(L_{max}, N_{SRS})} C_{N_{SRS}}^k \right) \right\rceil;$$

where $N_{SRS} = \max(N_1, N_2)$;
or, $N_{SRS} = \max(N_3, N_4)$;
or, $N_{SRS} = \max(N_{1,1}, \ldots, N_{1,m}, N_2)$;
or, $N_{SRS} = \max(N_1, N_{2,1}, \ldots, N_{2,n})$;
or, $N_{SRS} = \max(N_{1,1}, \ldots, N_{1,m}, N_{2,1}, \ldots, N_{2,n})$;
max(k,l) represents a maximum value of k and l;
$\lceil \ \rceil$ represents rounding up;
$C_x^y$ represents a number of combinations for selecting y elements from x elements;
$N_1$ is a number of SRS resources in the first SRS resource set;
$N_2$ is a number of SRS resources in the second SRS resource set;
$N_3$ is a number of SRS resources included in one SRS resource set of the first SRS resource set when the first SRS resource set includes a plurality of SRS resource sets;

$N_4$ is a number of SRS resources included in one SRS resource set of the second SRS resource set when the second SRS resource set includes a plurality of SRS resource sets;

$L_{max}$ is a maximum number of layers for transmission of a PUSCH configured by a network device for a terminal or a maximum number of layers supported by a terminal for uplink transmission;

m is a number of SRS resource sets included in the first SRS resource set, $N_{1,m}$ isa number of SRS resources included in an m-th SRS resource set of the first SRS resource set, where m is greater than 1;

n is a number of SRS resource sets included in the second SRS resource set, $N_{2,n}$ is a number of SRS resources included in an n-th SRS resource set of the second SRS resource set, where n is greater than 1.

In a possible implementation, the second determining device 602 is configured to determine the bit width and/or the coding mode of the SRI according to a third SRS resource set, where the third SRS resource set is an SRS resource set transmitted in a latest SRS transmission period in the SRS resource set used for CSI acquisition or last triggered in the SRS resource set used for CSI acquisition, before a physical downlink control channel (PDCCH) carrying downlink control information (DCI) of the PUSCH.

In a possible implementation, the coding mode of the SRI includes:

the coding state of the SRI including a reserved state, and any state other than the reserved state being used to indicate an SRS resource in the third SRS resource set; or any state in the coding mode of the SRI being used to indicate an SRS resource in the third SRS resource set.

In a possible implementation, the second determining device 602 is configured to determine the bit width and/or the coding mode of the SRI according to a number and/or a type of SRS resources in the third SRS resource set.

In a possible implementation, when the third SRS resource set is an SRS resource set of the first SRS resource set, the bit width of the SRI is determined according to a number of SRS resources included in both of the third SRS resource set and the second SRS resource set;

where the first SRS resource set is an SRS resource set including an SRS resource in the at least one SRS resource, and the second SRS resource set is an SRS resource set having a usage parameter being only indicated for the CSI acquisition.

In a possible implementation, when the third SRS resource set is an SRS resource set of the second SRS resource set, the bit width of the SRI is determined according to a number of SRS resources included in the third SRS resource set, where the second SRS resource set is an SRS resource set having a usage parameter being only indicated for the CSI acquisition.

In a possible implementation, the apparatus 60 further includes:

a third receiving device 605, configured to receive a first signaling from a network device, where the first signaling is used to indicate a bit width of the SRI.

In a possible implementation, the apparatus further includes:

a second receiving device 604, configured to receive indication information of an SRS resource set corresponding to the transmission of the PUSCH sent by a network device;

the second determining device 602, configured to determine the bit width and/or the coding mode of the SRI according to a number of SRS resources included in the SRS resource set indicated by the indication information of the SRS resource set.

In a possible implementation, the coding mode includes:

a coded bit value i of the SRI representing an (i+1)-th SRS resource in a fourth SRS resource set; or a coded bit value i of the SRI representing an i-th SRS resource in a fourth SRS resource set;

where the fourth SRS resource set is one of the following:

all SRS resource sets in the first SRS resource set; or an SRS resource set of the first SRS resource set; or all SRS resource sets in the second SRS resource set; or an SRS resource set of the second SRS resource set; or the first SRS resource set and the second SRS resource set; or an SRS resource set indicated by the network device; or an SRS resource set corresponding to the transmission of the PUSCH;

i is greater than or equal to 0;

where the first SRS resource set is an SRS resource set including an SRS resource in the at least one SRS resource; and the second SRS resource set is an SRS resource set having a usage parameter being only indicated for the CSI acquisition.

In a possible implementation, numbering of SRS resources in the fourth SRS resource set is determined according to a sequence of transmission of the SRS resources;

or, numbering of SRS resources in the fourth SRS resource set is determined according to sizes of identifiers of the SRS resources;

or, numbering of SRS resources in the fourth SRS resource set is determined according to a sequence in which the SRS resources are configured.

In a possible implementation, the SRS resource set corresponding to the transmission of the PUSCH is determined according to a preset rule.

In a possible implementation, the SRS resource set corresponding to the transmission of the PUSCH is an SRS resource set used to determine an SRS resource set where an SRS resource of an antenna port of the PUSCH is located.

In a possible implementation, the at least one SRS resource is an SRS resource with a specific number in an SRS resource set whose usage parameter is not configured for the CSI acquisition;

or, the at least one SRS resource is an SRS resource in an SRS resource set whose usage parameter is configured for a specific usage;

or, the at least one SRS resource is an SRS resource in an SRS resource set whose usage parameter in a specific time domain type is configured for a specific usage;

or, the at least one SRS resource is an SRS resource included both in an SRS resource set whose usage parameter is configured for a specific usage, and an SRS resource set whose usage is the CSI acquisition.

It should be noted that the division of the devices in the embodiments of the present application is schematic and is only a logical functional division. In an actual implementation, there may be other division manners. In addition, each functional device in each embodiment of the present application may be integrated in a single processing device, or each device may be physically present separately, or two or more devices may be integrated in a single device. The above integrated devices can be implemented either in the form of hardware or in the form of software functional devices.

The integrated devices may be stored in a processor-readable storage medium when implemented in the form of software function devices and sold or used as an independent product. Based on this understanding, the present application is essentially, or the part which makes contribution to the prior art, or all or part of the embodiments can be embodied in the form of a software product. The computer software product may be stored in a storage medium, including several instructions for enabling a computer device (which may be a personal computer, a server, or a network device, etc.) or a processor to execute all or part of the steps of the methods in the various embodiments of the present application. The aforementioned storage media includes: a U disk, a mobile hard disk, a read-only memory (ROM), a random access memory (RAM), a magnetic disk or an optical disk and other medium that can store program codes.

It should be noted herein that, the above apparatus provided in the present application is capable of implementing all the method steps achieved by the above method embodiment, and is capable of achieving the same effect, and the same parts and beneficial effects of the present embodiment as those in the method embodiment will not be described in detail herein.

The present application provides a processor-readable storage medium, where the processor-readable storage medium has a computer program stored thereon, and the computer program is used to cause the processor to execute the method according to any method implemented by the network device in the foregoing embodiments.

The present application provides a processor-readable storage medium, where the processor-readable storage medium has a computer program stored thereon, and the computer program is used to cause the processor to execute the method according to any method any method implemented by the terminal in the foregoing embodiments.

The processor-readable storage medium may be any available medium or data storage device that can be accessed by the processor, including but not limited to a magnetic storage (such as a floppy disk, a hard disk, a magnetic tape, a magneto-optical disk (MO), etc.), an optical storage (such as CD, DVD, BD, HVD, etc.), and a semiconductor storage (such as ROM, EPROM, EEPROM, a non-volatile memory (NAND FLASH), a solid state disk (SSD)), etc.

Embodiments of the present application may be provided as methods, systems, or computer program products. Accordingly, the present application may take the form of an entirely hardware embodiment, an entirely software embodiment or an embodiment combining software and hardware aspects. The present application may take the form of a computer program product embodied on one or more computer-usable storage mediums (including but not limited to a disk storage and an optical storage, etc.) having a computer-usable program code stored thereon.

The present application is described with reference to flowcharts and/or block diagrams of methods, apparatus (systems), and computer program products according to embodiments of the present application. It should be understood that each procedure and/or block in the flowchart and/or block diagrams, and combinations of procedures and/or blocks in the flowchart and/or block diagrams can be implemented by the computer-executable instruction. These computer-executable instructions may be provided to a processor of a general-purpose computer, a specialized computer, an embedded processor, or other programmable data processor to produce a machine, and an apparatus for implementing a function specified in one or more processes of the flowchart and/or one or more blocks of the block diagram may be produced via the instructions executed by the processor of the computer or other programmable data processor.

These processor-executable instructions may also be stored in a processor-readable memory capable of directing a computer or other programmable data processors to operate in a specific manner, and the instructions stored in the processor-readable memory produce a manufacturing product including an instruction apparatus, where the instruction apparatus realizes the function specified in one or more procedures of the flow chart and/or one or more blocks of the block diagram.

These processor-executable instructions may also be loaded onto a computer or other programmable data processing device, and a series of operational steps may be performed on the computer or other programmable device to produce computer-implemented processing. Therefore, the instructions executed on the computer or other programmable device provide steps for implementing the functions specified in one or more processes of the flowchart and/or one or more blocks of the block diagram.

The invention claimed is:

1. An information transmission method, comprising:
   determining whether at least one sounding reference signal (SRS) resource is used for multiple usages;
   determining, according to the at least one SRS resource is used for multiple usages or no SRS resource is used for multiple usages, a bit width and a coding mode of SRS resource indicator (SRI).

2. The method according to claim 1, wherein the method further comprises:
   sending first information to a terminal, wherein the first information is used to indicate to the terminal that the at least one SRS resource is used for multiple usages, and the multiple usages comprise channel state information (CSI) acquisition of a specific type of physical uplink shared channel (PUSCH).

3. The method according to claim 2, wherein the first information comprises configuration information for an SRS resource set, or the first information indicates that the at least one SRS resource is used for the CSI acquisition in addition to the usage of the at least one SRS resource configured in the SRS resource set;
   in a case that the first information comprises configuration information for an SRS resource set, there exists in the configuration information a configuration value indicating that the SRS resource set is used for multiple usages, the SRS resource set is an SRS resource set comprising an SRS resource in the at least one SRS resource;
   in a case that the first information indicates that the at least one SRS resource is used for the CSI acquisition in addition to the usage of the at least one SRS resource configured in the SRS resource set, the method further comprises:
   sending configuration information for an SRS resource set to the terminal, wherein the configuration information comprises a usage of the SRS resource set, and the SRS resource set is an SRS resource set comprising an SRS resource in the at least one SRS resource.

4. The method according to claim 1, wherein determining the bit width and the coding mode of the SRI comprises:
   determining the bit width and the coding mode of the SRI according to at least one of a number of SRS resources in a first SRS resource set and a number of SRS resources in a second SRS resource set, wherein the first SRS resource set is an SRS resource set comprising an SRS resource in the at least one SRS resource, and the second SRS resource set is an SRS resource set having a usage parameter being only indicated for the CSI acquisition.

5. The method according to claim 1, wherein determining the bit width and the coding mode of the SRI comprises:
determining the bit width and the coding mode of the SRI according to a third SRS resource set, wherein the third SRS resource set is an SRS resource set transmitted in a latest transmission period in the SRS resource set used for CSI acquisition or last triggered in the SRS resource set used for CSI acquisition, before a physical downlink control channel (PDCCH) carrying downlink control information (DCI) of the PUSCH.

6. The method according to claim 1, wherein the method further comprises:
sending indication information of an SRS resource set corresponding to the transmission of the PUSCH to a terminal;
wherein determining the bit width and the coding mode of the SRI comprises:
determining the bit width and the coding mode of the SRI according to a number of SRS resources comprised in the SRS resource set indicated by the indication information of the SRS resource set.

7. An information transmission method, comprising:
determining whether there exists at least one sounding reference signal (SRS) resource used for multiple usages;
determining, according to there exists at least one SRS resource used for multiple usages or there exists no SRS resource used for multiple usages, a bit width and a coding mode of SRS resource indicator (SRI).

8. The method according to claim 7, wherein the method further comprises:
receiving first information from a network device, wherein the first information is used to indicate a terminal that the at least one SRS resource is used for multiple usages, and the multiple usages comprise channel state information (CSI) acquisition of a specific type of physical uplink shared channel (PUSCH).

9. The method according to claim 8, wherein the first information comprises configuration information for an SRS resource set, or the first information indicates that the at least one SRS resource is used for the CSI acquisition in addition to the usage of the at least one SRS resource configured in the SRS resource set;
in a case that the first information comprises configuration information for an SRS resource set, there exists in the configuration information a configuration value indicating that the SRS resource set is used for multiple usages, the SRS resource set is an SRS resource set comprising an SRS resource in the at least one SRS resource;
in a case that the first information indicates that the at least one SRS resource is used for the CSI acquisition in addition to the usage of the at least one SRS resource configured in the SRS resource set, the method further comprises:
receiving configuration information for an SRS resource set from a network device, wherein the configuration information comprises a usage of the SRS resource set, and the SRS resource set is an SRS resource set comprising an SRS resource in the at least one SRS resource.

10. The method according to claim 7, wherein determining the bit width and the coding mode of the SRI comprises:
determining the bit width and the coding mode of the SRI according to at least one of a number of SRS resources in a first SRS resource set and a number of SRS resources in a second SRS resource set, wherein the first SRS resource set is an SRS resource set comprising an SRS resource in the at least one SRS resource, and the second SRS resource set is an SRS resource set having a usage parameter being only indicated for the CSI acquisition.

11. The method according to claim 10, wherein
the bit width of the SRI is determined based on at least one of a number of SRS resources comprised in the first SRS resource set or a number of SRS resources comprised in the second SRS resource set; or
the bit width of the SRI determined based on at least one of a number of SRS resources comprised in a resource set of the first SRS resource set or a number of SRS resources comprised in a resource set of the second SRS resource set; or
the bit width of the SRI is determined based on at least one of a number of SRS resources comprised in each of the first SRS resource set or a number of SRS resources comprised in each of the second SRS resource set; or
the bit width of the SRI is determined based on a maximum value of a number of SRS resources comprised in the first SRS resource set and a number of SRS resources comprised in the second SRS resource set; or
the bit width of the SRI is determined based on a maximum value of a number of SRS resources comprised in a resource set of the first SRS resource set and a number of SRS resources comprised in a resource set of the second SRS resource set; or
the bit width of the SRI is determined based on at least one of a maximum value of a number of SRS resources comprised in each of the first SRS resource set or a number of SRS resources comprised in each of the second SRS resource set.

12. The method according to claim 10, wherein the coding mode of the SRI comprises:
the coding mode of the SRI comprising a reserved state, and any state other than the reserved state being used to indicate an SRS resource in the first SRS resource set; or
any state in the coding mode of the SRI being used to indicate an SRS resource in the first SRS resource set; or
the coding mode of the SRI comprising a reserved state, and any state other than the reserved state being used to indicate an SRS resource in the second SRS resource set; or
any state in the coding mode of the SRI being used to indicate an SRS resource in the second SRS resource set; or
the coding mode of the SRI comprising a reserved state, and any state other than the reserved state being used to indicate an SRS resource comprised in both of the first SRS resource set and the second SRS resource set; or
any state in the coding mode of the SRI being used to indicate an SRS resource comprised in both of the first SRS resource set and the second SRS resource set; or
the coding mode of the SRI comprising a reserved state, and any state other than the reserved state being used to indicate an SRS resource comprised in the first SRS resource set or in the second SRS resource set; or any state in the coding mode of the SRI being used to indicate an SRS resource comprised in the first SRS resource set or in the second SRS resource set.

13. The method according to claim 11, wherein
the bit width of the SRI is $\lceil \log_2 N_1 \rceil$;
or, the bit width of the SRI is $\lceil \log_2 N_2 \rceil$;
or, the bit width of the SRI is $\lceil \log_2 N_3 \rceil$;
or, the bit width of the SRI is $\lceil \log_2 N_4 \rceil$;
or, the bit width of the SRI is $$\left\lceil \log_2\left(\sum_{k=1}^{min(L_{max},N_1)} C_{N_1}^k\right) \right\rceil;$$

or, the bit width of the SRI is $$\left\lceil \log_2\left(\sum_{k=1}^{min(L_{max},N_1)} C_{N_1}^k\right) \right\rceil;$$

or, the bit width of the SRI is $\max(\lceil \log_2(N_1) \rceil, \lceil \log_2(N_2) \rceil)$;
or, the bit width of the SRI is $\lceil \max(\log_2(N_1), \log_2(N_2)) \rceil$;
or, the bit width of the SRI is $\max(\lceil \log_2(N_3) \rceil, \lceil \log_2(N_4) \rceil)$;
or, the bit width of the SRI is $\lceil \max(\log_2(N_3), \log_2(N_4)) \rceil$;
or, the bit width of the SRI is
$\max(\lceil \log_2(N_1) \rceil, \lceil \log_2(N_{2,1}) \rceil, \ldots, \lceil \log_2(N_{2,n}) \rceil)$;
or, the bit width of the SRI is
$\lceil \max(\log_2(N_1), \log_2(N_{2,1}), \ldots, \log_2(N_{2,n})) \rceil$;
or, the bit width of the SRI is
$\max(\lceil \log_2(N_{1,1}) \rceil, \lceil \log_2(N_{2,1}) \rceil, \ldots, \lceil \log_2(N_{2,n}) \rceil)$;
or, the bit width of the SRI is
$\lceil \max(\log_2(N_{1,1}), \ldots, \log_2(N_{1,m}), \log_2(N_{2,1}), \ldots, \log_2(N_{2,n})) \rceil$;
or, the bit width of the SRI is $\lceil \log_2(N_{SRS}) \rceil$;
or, the bit width of the SRI is $$\left\lceil \log_2\left(\sum_{k=1}^{min(L_{max},N_{SRS})} C_{N_{SRS}}^k\right) \right\rceil;$$

wherein $N_{SRS} = \max(N_1, N_2)$;
or, $N_{SRS} = \max(N_3, N_4)$;
or, $N_{SRS} = \max(N_{1,1}, \ldots, N_{1,m}, N_2)$;
or, $N_{SRS} = \max(N_1, N_{2,1}, \ldots, N_{2,n})$;
or, $N_{SRS} = \max(N_{1,1}, \ldots, N_{1,m}, N_{2,1}, \ldots, N_{2,n})$;
max(k,l) represents a maximum value of k and l;
$\lceil \ \rceil$ represents rounding up;
$C_x^y$ represents a number of combinations for selecting y elements from x elements;
$N_1$ is a number of SRS resources in the first SRS resource set;
$N_2$ is a number of SRS resources in the second SRS resource set;
$N_3$ is a number of SRS resources comprised in one SRS resource set of the first SRS resource set when the first SRS resource set comprises a plurality of SRS resource sets;
$N_4$ is a number of SRS resources comprised in one SRS resource set of the second SRS resource set when the second SRS resource set comprises a plurality of SRS resource sets;
$L_{max}$ is a maximum number of layers for transmission of a PUSCH configured by a network device for the terminal or a maximum number of layers supported by the terminal for uplink transmission;
m is a number of SRS resource sets comprised in the first SRS resource set, $N_{1,m}$ is a number of SRS resources comprised in an m-th SRS resource set of the first SRS resource set, wherein m is greater than 1;
n is a number of SRS resource sets comprised in the second SRS resource set, $N_{2,n}$ is a number of SRS resources comprised in an n-th SRS resource set of the second SRS resource set, wherein n is greater than 1.

14. The method according to claim 7, wherein determining the bit width and the coding mode of the SRI comprises:
determining the bit width and the coding mode of the SRI according to a third SRS resource set, wherein the third SRS resource set is an SRS resource set transmitted in a latest SRS transmission period in the SRS resource set used for CSI acquisition or last triggered in the SRS resource set used for CSI acquisition, before a physical downlink control channel (PDCCH) carrying downlink control information (DCI) of the PUSCH.

15. The method according to claim 14, wherein the coding mode of the SRI comprises:
coding states of the SRI comprising a reserved state, and any state other than the reserved state being used to indicate an SRS resource in the third SRS resource set; or
any state in the coding mode of the SRI being used to indicate an SRS resource in the third SRS resource set.

16. The method according to claim 14, wherein determining the bit width and the coding mode of the SRI according to the third SRS resource set comprises:
determining the bit width and the coding mode of the SRI according to a number and/or a type of SRS resources in the third SRS resource set;
wherein when the third SRS resource set is an STS resource set in the first SRS resource set, the bit width of the SRI is determined according to a number of SRS resources comprised in both of the third SRS resource and the second SRS resource set; and/or
when the third SRS resource set is an SRS resource set of the second SRS resource set, the bit width of the SRI is determined according to a number of SRS resources comprised in the third SRS resource set;
wherein the first SRS resource set is an SRS resource set comprising an SRS resource in the at least one SRS resource, and the second SRS resource set is an SRS resource set having a usage parameter being only indicated for the CSI acquisition.

17. The method according to claim 7, wherein the coding mode comprises:
a coded bit value i of the SRI representing an (i+1)-th SRS resource in the SRS resource set corresponding to the transmission of the PUSCH; or
a coded bit value i of the SRI representing an i-th SRS resource in a fourth SRS resource set;
wherein the fourth SRS resource set is one of the following:
all SRS resource sets in the first SRS resource set; or
an SRS resource set of the first SRS resource set; or
all SRS resource sets in the second SRS resource set; or
an SRS resource set of the second SRS resource set; or
the first SRS resource set and the second SRS resource set; or
an SRS resource set indicated by the network device; or
an SRS resource set corresponding to the transmission of the PUSCH;
i is greater than or equal to 0;
the first SRS resource set is an SRS resource set comprising an SRS resource in the at least one SRS resource, and the second SRS resource set is an SRS resource set having a usage parameter being only indicated for the CSI acquisition.

18. A non-transitory processor-readable storage medium, wherein the processor-readable storage medium has a computer program stored thereon, and the computer program is used to cause the processor to execute the method according to claim 7.

19. An information transmission apparatus, comprising a memory, a transceiver, and a processor;

wherein the memory is configured to store a computer program; the transceiver is configured to send and receive data under control of the processor; and the processor is configured to read the computer program in the memory and execute following operations:

determining whether at least one sounding reference signal SRS resource is used for multiple usages;

determining, according to the at least one SRS resource is used for multiple usages or no SRS resource is used for multiple usages, a bit width and a coding mode of SRS resource indicator (SRI).

20. An information transmission apparatus, comprising a memory, a transceiver, and a processor;

wherein the memory is configured to store a computer program; the transceiver is configured to send and receive data under control of the processor; and the processor is configured to read the computer program in the memory and execute following operations:

determining whether there exists at least one sounding reference signal SRS resource used for multiple usages;

determining, according to there exists at least one SRS resource used for multiple usages or there exists no SRS resource used for multiple usages, a bit width and the coding mode of SRS resource indication information (SRI).

* * * * *